United States Patent
Cardarelli

(10) Patent No.: US 10,947,630 B2
(45) Date of Patent: Mar. 16, 2021

(54) METALLURGICAL AND CHEMICAL PROCESSES FOR RECOVERING VANADIUM AND IRON VALUES FROM VANADIFEROUS TITANOMAGNETITE AND VANADIFEROUS FEEDSTOCKS

(71) Applicant: Vanadiumcorp Resources Inc., Surrey (CA)

(72) Inventor: François Cardarelli, Montreal (CA)

(73) Assignee: Vanadiumcorp Resources Inc., Surrey (CA)

( * ) Notice: Subject to any disclaimer, the term of this patent is extended or adjusted under 35 U.S.C. 154(b) by 0 days.

(21) Appl. No.: 16/322,642

(22) PCT Filed: Feb. 21, 2018

(86) PCT No.: PCT/CA2018/050196
§ 371 (c)(1),
(2) Date: Feb. 1, 2019

(87) PCT Pub. No.: WO2018/152628
PCT Pub. Date: Aug. 30, 2018

(65) Prior Publication Data
US 2020/0157696 A1     May 21, 2020

Related U.S. Application Data

(60) Provisional application No. 62/582,060, filed on Nov. 6, 2017, provisional application No. 62/463,411, filed on Feb. 24, 2017.

(51) Int. Cl.
*C25C 1/06* (2006.01)
*C01B 33/12* (2006.01)
(Continued)

(52) U.S. Cl.
CPC ............... *C25C 1/06* (2013.01); *C01B 33/12* (2013.01); *C01G 23/008* (2013.01);
(Continued)

(58) Field of Classification Search
None
See application file for complete search history.

(56) References Cited

U.S. PATENT DOCUMENTS

| 2,278,709 A | 4/1942 | Moran |
| 4,786,567 A | 11/1988 | Skyllas-Kazacos et al. |
| 8,658,124 B1 | 2/2014 | Horne |

FOREIGN PATENT DOCUMENTS

| GB | 157555 | 1/1921 |
| WO | WO2003008335 A1 | 1/2003 |

(Continued)

OTHER PUBLICATIONS

International Search Report in International Application No. PCT/CA2018/050196 dated May 9, 2018, 4 pages.

*Primary Examiner* — Melissa S Swain
(74) *Attorney, Agent, or Firm* — Lee & Hayes, P.C.

(57) ABSTRACT

The present disclosure broadly relates to a process for recovering vanadium, iron, titanium and silica values from vanadiferous feedstocks. More specifically, but not exclusively, the present disclosure relates to a metallurgical process in which vanadium, iron, titanium and silica values are recovered from vanadiferous feedstocks such as vanadiferous titanomagnetite, iron ores, vanadium slags and industrial wastes and by-products containing vanadium. The process broadly comprises digesting the vanadiferous feedstocks into sulfuric acid thereby producing a sulfation cake; dissolving the sulfation cake and separating insoluble solids thereby producing a pregnant solution; reducing the pregnant solution thereby producing a reduced pregnant solution; and crystallizing ferrous sulfate hydrates from the reduced (Continued)

pregnant solution, producing an iron depleted reduced solution. The process further comprises removing titanium compounds from the iron depleted reduced solution thereby producing a vanadium-rich pregnant solution; concentrating vanadium and recovering vanadium products and/or a vanadium electrolyte.

33 Claims, 15 Drawing Sheets

(51) Int. Cl.
| | |
|---|---|
| *C01G 23/00* | (2006.01) |
| *C01G 23/047* | (2006.01) |
| *C01G 31/00* | (2006.01) |
| *C01G 31/02* | (2006.01) |
| *C01G 49/14* | (2006.01) |
| *C25C 7/02* | (2006.01) |

(52) U.S. Cl.
CPC ....... *C01G 23/0475* (2013.01); *C01G 31/003* (2013.01); *C01G 31/006* (2013.01); *C01G 31/02* (2013.01); *C01G 49/14* (2013.01); *C25C 7/02* (2013.01)

(56) References Cited

FOREIGN PATENT DOCUMENTS

| | | |
|---|---|---|
| WO | WO2008028244 A1 | 3/2008 |
| WO | WO2011143689 A1 | 11/2011 |
| WO | WO2017010437 A1 | 1/2017 |

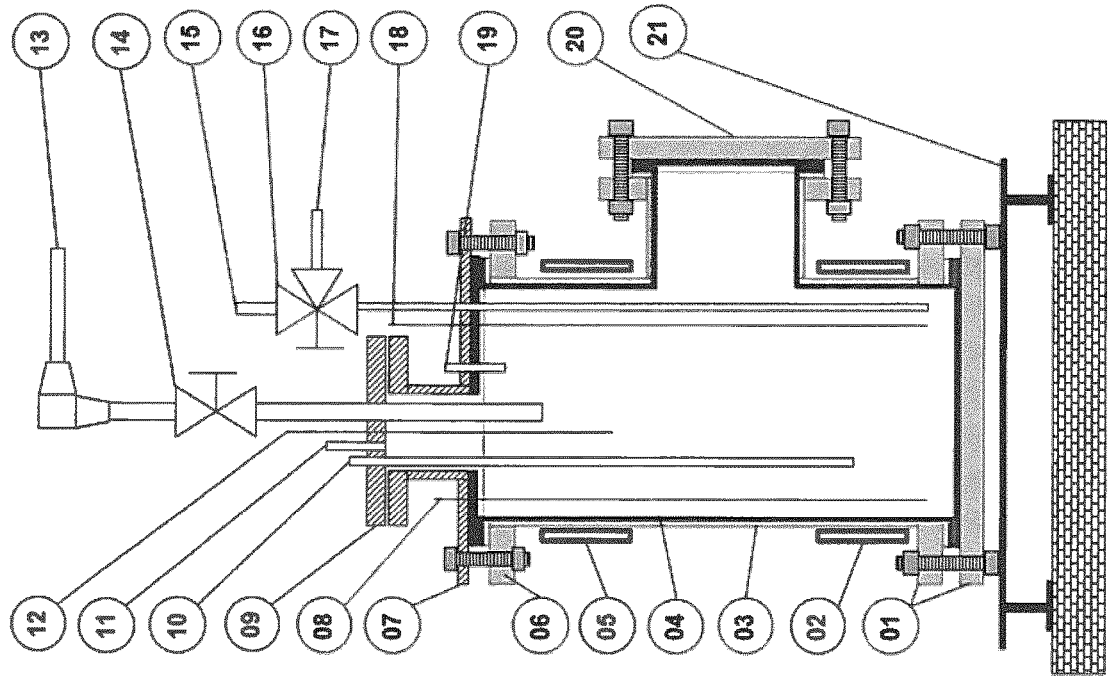

01 — BOTTOM CAST IRON FLANGES
02 — LOWER ELECTRIC BAND HEATER
03 — DUCTILE CAST IRON SHELL
04 — PTFE ¾-in INNER LINER
05 — UPPER ELECTRIC BAND HEATER
06 — TOP CAST IRON FLANGE
07 — TOP STAINLESS STEEL FLANGE
08 — THERMOCOUPLE PROBE #1
09 — AUXILIARY STAINLESS FLANGES
10 — INLET FEED PIPE
11 — PRESSURE RELIEVE VALVE
12 — THERMOCOUPLE PROBE #2
13 — STEAM/FUMES EXHAUST PIPE
14 — BALL VALVE
15 — GAS INJECTION LINE
16 — THREE-WAY VALVE
17 — WATER INJECTION LINE
18 — THERMOCOUPLE PROBE #3
19 — PRESSURE GAUGE PROBE
20 — SIDE MANHOLE
21 — SUPPORTING STEEL FRAME

FIG. 6

METALLURGICAL AND CHEMICAL PROCESSES FOR RECOVERING VANADIUM AND IRON VALUES FROM VANADIFEROUS TITANOMAGNETITE AND VANADIFEROUS FEEDSTOCKS

CROSS REFERENCE TO RELATED APPLICATIONS

This application is a U.S. National Phase Application of International Application No. PCT/CA2018/050196, filed Feb. 21, 2018, which The present application claims the benefit of priority from U.S. provisional applications Nos. 62/463,411 and 62/582,060 filed on Feb. 24, 2017 and Nov. 6, 2017 respectively, the contents of which are incorporated herein by reference in their entirety.

FIELD

The present disclosure broadly relates to a process for recovering at least one of vanadium, iron, titanium or silica values from vanadiferous feedstocks. More specifically, but not exclusively, the present disclosure relates to metallurgical and chemical processes for recovering at least one of vanadium, iron, titanium or silica values from vanadiferous feedstocks. In an aspect, the present disclosure relates to metallurgical and chemical processes for recovering at least one of vanadium, iron, titanium or silica values from vanadiferous feedstocks including vanadiferous titanomagnetite, iron ores, vanadium slags, industrial wastes and/or industrial by-products.

BACKGROUND

Vanadium redox flow batteries (VRB), pioneered as power sources by Maria Skyllas-Kazacos et al. (U.S. Pat. No. 4,786,567), are widely used commercially with large installations in Europe, Asia and North America. The technology consists of an electrochemical stack comprising a divided electrolyzer with electrodes, membranes and circulating electrolytes employing the V(III)/V(IV) and V(IV)/V(V) redox vanadium couples dissolved in sulfuric acid as the negative and positive half-cell electrolytes respectively. As a result of their wide acceptance as stationary energy storage and uninterruptible power supplies, the demand for vanadium compounds for use as precursors for the preparation of electrolytes, particularly vanadium pentoxide ($V_2O_5$), has greatly increased. Accordingly, the search for new ore deposits as well as the need for improved technologies providing for a more efficient and affordable extraction of the vanadium values has also intensified. In accordance with today's environmental concerns, any new extraction technology should not adversely impact the environment or leave as little an imprint as possible.

Presently, the main source of vanadiferous feedstocks for preparing vanadium pentoxide consists essentially of vanadiferous titanomagnetite (VTM) occurring in magmatic layered gabbroic complexes such as the Bushveld complex found in the Republic of South-Africa; the yet untapped Lac Doré complex in the Chibougamau district (Quebec, Canada) with an inferred resource of 99.1 million tons of VTM containing 0.43 wt. % $V_2O_5$; and the Iron-T vanadium project in the Matagami area (Quebec, Canada) with an inferred resource of 14.38 million tons of VTM containing 0.42 wt. % $V_2O_5$. Additionally, some production originates from the processing of uranium ores such as carnotite from weathered sandstone deposits; the processing of phosphate ores; the petrochemical processing of bottom crude oils from Venezuela and Mexico; and the processing of vanadium-rich by-products from tar sands.

Presently, most of the vanadium pentoxide ($V_2O_5$) produced worldwide is derived from the mining of vanadiferous titanomagnetite (VTM) concentrates, which typically contain 1.2 to 2.0 wt. % $V_2O_5$ with vanadium being locked in the spinel phase coulsonite ($FeV_2O_4$), which forms a solid solution with ulvospinel ($Fe_2TiO_4$), and also in hematite phase ($\alpha$-$Fe_2O_3$). The first step consists in the open pit mining from which the run-of-mine (RoM) is crushed, ground, screened and finally beneficiated by wet low intensity magnetic separation (WLIMS) in order to remove both silicates (e.g., Ca-plagioclase feldspars, pyroxenes) and sulfidic gangue minerals. The resulting VTM concentrate comprises an average chemical composition including 56-65 wt. % total iron (Fe), 8-12 wt. % $TiO_2$, and 0.8-1.4 wt. % $V_2O_5$. The resulting VTM is then typically processed by conventional pyrometallurgical and hydrometallurgical routes namely: (1) the soda ash process or salt roasting process ("Vametco Process"); and (2) the combination of smelting and slagging followed by soda ash roasting ("Highveld Process").

In the "Vametco process", used in South Africa, the vanadiferous titanomagnetite concentrate is mixed with sodium sulfate ($Na_2SO_4$) and sodium carbonate ($Na_2CO_3$). The charge was then roasted inside a rotary kiln at about 850° C. The hot clinker, discharged from the kiln, is quenched in cold water to produce a pregnant solution while the water leached calcine, containing most of the original iron, is disposed-off and landfilled. After the removal of sodium silicate using magnesium and aluminum sulfates (desilication), vanadium is precipitated as ammonium polyvanadate [$(NH_4)_2V_6O_{16}$] (APV) by adding ammonium sulfate at acidic pH or ammonium metavanadate ($NH_4VO_3$) (AMV) in accordance with the following reactions:

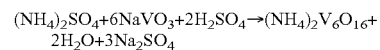

$(NH_4)_2SO_4 + 6NaVO_3 + 2H_2SO_4 \rightarrow (NH_4)_2V_6O_{16} + 2H_2O + 3Na_2SO_4$

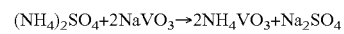

$(NH_4)_2SO_4 + 2NaVO_3 \rightarrow 2NH_4VO_3 + Na_2SO_4$

After filtration, the precipitate is either calcined to produce red calcined vanadium pentoxide or further melted at temperatures above 690° C. followed by cooling in a drum flaker to yield black flakes with a metallic luster of fused vanadium pentoxide $V_2O_5$. Both products have a purity greater than 99.5 wt. % $V_2O_5$. The spent liquid effluents by-produced during these operations are evaporated in large sealed dams and the ammonium and sodium sulfate values are recycled back to the process.

Contrary to the "Vametco process", the first step in the "Highveld Process" consists in the smelting/slagging of the VTM followed by soda ash roasting. More precisely, the VTM concentrate is pre-reduced using a rotary kiln fed with pulverized coal. The pre-reduced material is then smelted inside a submerged AC arc furnace ("slagging process") with carbon electrodes and anthracite coal to produce pig iron with 3.5 wt. % C and about 1.2 wt. % V. The tapped smelter slag contained 32 wt. % $TiO_2$ and 0.9 wt. % $V_2O_5$. The smelter gas (i.e., a mixture of CO and $H_2$) is typically reused elsewhere in the plant, but in fine the combustible gas ends up burned releasing $CO_2$ into the atmosphere.

The hot metal is subsequently transferred molten inside shaking ladles to a steel making plant and converted into steel in a basic oxygen furnace (BOF) where oxygen gas is injected together with suitable fluxes to decarburize and remove the vanadium from the molten metal. A low carbon steel of excellent commercial value and a vanadium-rich slag containing up to 20-25 wt. % $V_2O_5$ are obtained. However, the steel making process is energy intensive as the specific energy consumption for producing a slab of steel including the smelting, the refining and hot rolling is on average 6.38 MWh per tonne of steel slab. Moreover, the associated greenhouse gas emissions (GHGs) are on average 1.8 tonnes of carbon dioxide (Fruehan, R. J.; Fortoni, O.; Paxton, H. W.; Brindle, R. (2000)—*Theoretical Minimum Energies to Produce Steel for Selected Conditions.*—Carnegie Mellon University, Pittsburgh, Pa.).

The vanadium rich slag, eventually diluted with some smelter slag, is subsequently subjected to soda ash and/or salt roasting inside a brick-lined rotary kiln with direct heating using pulverized coal. The hot clinker is discharged from the kiln and quenched with water to yield a pregnant leach solution (PLS). The remaining steps resemble the "Vametco process" in that a desilication using magnesium and aluminum sulfates is performed, followed by the precipitation of vanadium as ammonium metavanadate ($NH_4VO_3$) by adding ammonium sulfate, and calcination to yield vanadium pentoxide. The specific energy consumption for producing vanadium pentoxide from pig iron is estimated as being about 3.0 MWh per tonne of vanadium pentoxide, including the crushing, grinding, and one or more of the following: roasting-leaching, roasting in a rotary-kiln, electric smelting, shaking-ladle, and basic oxygen furnace burning (Bleiwas, D. I. (2011)'*Estimates of electricity requirements for the recovery of mineral commodities, with examples applied to sub-Saharan Africa.*—US Geological Survey (USGS), Open-file report 2011-1253, Reston, Va.).

Despite the Vametco Process and the Highveld Process having gained worldwide industrial acceptance, especially the Highveld process because all the iron values are reported and recovered as high quality steel suitable for the most demanding industrial applications such as the production of High Strength Low Alloying Steels (HSLA), their main drawbacks are the following: (1) the large consumption of carbonaceous reductants that yield significant volumes of greenhouse gas (GHG) emissions during both pre-reduction, iron smelting/slagging, and steel making processes; (2) the significant consumption of expensive reductants such as anthracite coal and graphite electrodes during the arc smelting process; and (3) the high capital expenditures related to the building of the pre-reduction, arc smelting and roasting plants.

Recently, the TIVAN® metallurgical process, performing hot atmospheric acid leaching of a magnetite concentrate mined and beneficiated from the Mount Peak iron ore deposit (Northern Territory, Australia) was disclosed in WO 2011/143689 A1. Hydrochloric acid, with a concentration ranging from 20 to 32 wt. % HCl, was selected for dissolving the magnetite concentrate. Vanadium is recovered from the chloride pregnant leach liquor by solvent extraction (SX) using an organic extractant such as Cyanex 923™. Any deleterious impurities are removed by scrubbing followed by stripping the vanadium using mildly concentrated hydrochloric acid. The vanadium is subsequently precipitated as ammonium metavanadate prior to being calcined, and flaked into high purity vanadium pentoxide. Finally, iron is stripped from the barren liquor using diluted hydrochloric acid. Hydrochloric acid is regenerated from the spent acidic solutions by pyro-hydrolysis, by-producing iron (III) oxide ($Fe_2O_3$) that is sold as red pigment. Insoluble residues, left behind following the atmospheric acid leaching, are disclosed as consisting of more than 90 wt. % titanium dioxide.

The TIVAN® process however exhibits several major drawbacks. As an initial matter, the process relies heavily on the utilization of hydrochloric acid, an expensive chemical commercially available with a maximum concentration of 37 wt. % HCl. However, it is not readily available industrially at mining locations when compared to sulfuric acid which is largely available in concentrated form (93-98 wt. % $H_2SO_4$) without the requirement of having to transport water. This is particularly the case in North America where a large oversupply of concentrated sulfuric acid is readily available from nearby zinc, nickel or copper smelters with a network of railroads for rapid delivery. Secondly, the regeneration of hydrochloric acid of sufficient strength necessitates the pyro-hydrolysis of the spent solutions, an energy demanding (700 to 1,395 kWh/m$^3$) and capital intensive recycling process that also has a negative environmental impact as per the inherent combustion process that supplies the necessary heat with various stack emissions (e.g., CO, $NO_x$, HCl, $Cl_2$). Thirdly, the efficient recovery of vanadium and iron utilizes a solvent extraction (SX) process operating with hazardous organic solvents and extractants, posing serious occupational, health and safety risks. Moreover, traces of the organic solvents and extractants in the spent solution to be recycled could lead to the production of dioxins and furans during the subsequent pyrohydrolysis step posing an environmental risk. Furthermore, the SX process represents a capital intensive technology having high operating costs such that it becomes economically feasible only when separating high value metals (e.g., nickel from cobalt; niobium from tantalum; zirconium from hafnium, rare earths, and actinides).

A process pertaining to the preparation of ferric sulfate was disclosed in U.S. Pat. No. 8,658,124. The process entailed the preparation of a suspension of hematite or magnetite with water in a pressure vessel to form a pulp. Concentrated sulfuric acid is subsequently introduced into the vessel leading to the exothermic hydration of the sulfuric acid with temperatures and pressures reaching 300° F. (149° C.) and 20-90 psig (138 kPa to 621 kPa) respectively, due to the evolution of steam and the expansion of gases in the head space. Moreover, oxygen gas is required in order to oxidize the iron into ferric iron. The process, however, exhibits several major drawbacks as to its applicability for the processing of vanadiferous titanomagnetite, iron ores, vanadium-slags and vanadium containing wastes and/or industrial by-products. As an initial matter, the overall yield and efficiency as regarding the dissolution of the hematite or magnetite is not disclosed. To that effect, substantially all of the iron values should end up in the solution with dissolution efficiencies of greater than 95%, compatible with a large tonnage operation. Secondly, because the iron is essentially present as Fe(III) in hematite, the sulfation reaction is not as exothermic as with Fe(II) resulting in the reaction not being self-sustaining from an energy perspective. Thirdly, all the iron ends up as ferric sulfate which requires large consumptions of reductant to reduce it back to ferrous sulfate. Fourthly, the strong oxidizing conditions prevailing inside the autoclave, especially after the introduction of oxygen gas, has an adverse impact on the dissolution of vanadium in view of the formation of a vanadium (V) species having a lower solubility than that of V(IV) and V(III).

Finally, the well-known sulfate process from the National Lead Company (U.S. Pat. No. 2,278,709), used extensively in the titanium pigment industry, specifically the processing of titaniferous feedstocks such as ilmenite and sulfate titania slags with concentrated sulfuric acid. These feedstocks typically have a titanium dioxide content ranging from 55 wt. % to 85 wt. % $TiO_2$ whereas the vanadiferous titanomagnetite (VTM) feedstocks usually contain only 6 to 10 wt. % $TiO_2$. Indeed, the aim of the sulfate process is the efficient recovery of the titanium dioxide values by dissolving most of the titanium as titanyl sulfate. Moreover, the sulfate process does not address the difficulties associated with the recovery of vanadium and elevated concentrations of iron such as typically encountered in vanadiferous titanomagnetite.

The present disclosure refers to a number of documents, the contents of which are specifically incorporated herein by reference in their entirety.

SUMMARY

In an aspect, the present disclosure broadly relates to a process for recovering vanadium, and/or iron, and/or titanium and/or silica values from vanadiferous feedstocks. More specifically, but not exclusively, the present disclosure relates to metallurgical and chemical processes for recovering vanadium, and/or iron, and/or titanium and/or silica values from vanadiferous feedstocks. The present disclosure relates to metallurgical and chemical processes for recovering vanadium, and/or iron, and/or titanium and/or silica values from vanadiferous feedstocks including vanadiferous titanomagnetite, iron ores, vanadium slags, industrial wastes and/or industrial by-products.

In an aspect, the present disclosure relates to a process for recovering vanadium, iron, titanium and silica values from vanadiferous feedstocks, the process comprising: digesting the vanadiferous feedstocks into sulfuric acid thereby producing a sulfation cake; dissolving the sulfation cake and separating insoluble solids thereby producing a pregnant solution; reducing the pregnant solution thereby producing a reduced pregnant solution; crystallizing ferrous sulfate hydrates from the reduced pregnant solution, producing an iron depleted reduced solution; and removing titanium compounds from the iron depleted reduced solution thereby producing a vanadium-rich pregnant solution.

In an aspect, the present disclosure relates to a process for recovering vanadium, iron, titanium and silica values from vanadiferous feedstocks, the process comprising: digesting the vanadiferous feedstocks into sulfuric acid thereby producing a sulfation cake; dissolving the sulfation cake and separating insoluble solids thereby producing a pregnant solution; reducing the pregnant solution thereby producing a reduced pregnant solution; crystallizing ferrous sulfate hydrates from the reduced pregnant solution, producing an iron depleted reduced solution; removing titanium compounds from the iron depleted reduced solution thereby producing a vanadium-rich pregnant solution; and treating the vanadium-rich pregnant solution to recover vanadium products and/or a vanadium electrolyte.

In an embodiment of the present disclosure, the vanadiferous feedstocks comprise materials containing vanadium in various oxidation states. Non-limiting examples of vanadiferous feedstocks comprise vanadiferous titanomagnetite, iron ores, industrial wastes and/or industrial by-products. Non-limiting examples of iron ores comprise hematite, magnetite, wustite, siderite, ankerite and/or taconite. Non-limiting examples of by-products comprise vanadium bearing metallurgical slags and/or residues from iron making and/or steel making.

In an embodiment of the present disclosure, the sulfuric acid digestion comprises using an aqueous solution of sulfuric acid having a mass percentage from about 5 wt. % $H_2SO_4$ to about 100 wt. % $H_2SO_4$. In a further embodiment of the present disclosure, the aqueous solution of sulfuric acid has a mass percentage from about 15 wt. % $H_2SO_4$ to about 99 wt. % $H_2SO_4$. In yet a further embodiment of the present disclosure, the aqueous solution of sulfuric acid has a mass percentage from about 30 wt. % $H_2SO_4$ to about 98 wt. % $H_2SO_4$. In yet a further embodiment of the present disclosure, the sulfuric acid digestion further comprises the use of oleum. In yet a further embodiment of the present disclosure, the sulfuric acid digestion further comprises the addition of ammonium or alkali-metal sulfates of general formula $M_2SO_4$ to the sulfuric acid, wherein M is $NH_4^+$, $Li^+$, $Na^+$ or $K^+$.

In an embodiment of the present disclosure, the vanadiferous feedstocks are ground to a particle size of less than about 0.500 millimeter. In a further embodiment of the present disclosure, the vanadiferous feedstocks are ground to a particle size of less than about 0.125 millimeter. In yet a further embodiment of the present disclosure, the vanadiferous feedstocks are ground to a particle size of less than about 0.050 millimeter.

In an embodiment of the present disclosure, the vanadiferous feedstocks are oven dried prior to sulfuric acid digestion to remove residual moisture content.

In an embodiment of the present disclosure, the vanadiferous feedstocks are fed into the sulfuric acid at a temperature ranging from 20° C. to 400° C. and stirred. In a further embodiment of the present disclosure, the vanadiferous feedstocks are mixed with the sulfuric acid to produce a suspension, a slurry or a paste and heating the suspension, slurry or paste to a temperature ranging from 50° C. to 250° C. In yet a further embodiment of the present disclosure, the vanadiferous feedstocks are mixed with the sulfuric acid to produce a suspension, a slurry or a paste and water and/or steam are injected into the suspension, slurry or paste to raise the temperature of the suspension, slurry or paste to a temperature ranging from 50° C. to 250° C.

In an embodiment of the present disclosure, the sulfuric acid digestion is performed at temperatures ranging from about 20° C. to about 400° C. In a further embodiment of the present disclosure, the sulfuric acid digestion is performed at temperatures ranging from about 50° C. to about 300° C. In yet a further embodiment of the present disclosure, the sulfuric acid digestion is performed at temperatures from about 75° C. to about 250° C.

In an embodiment of the present disclosure, the vanadiferous feedstocks are pre-reduced using a thermal reduction process prior to the sulfuric acid digestion. In a further embodiment of the present disclosure, the thermal reduction process comprises the use of a reductant chosen from at least one of anthracite, sub-bituminous coal, bunker oil, natural gas, methane, carbon monoxide, hydrogen gas, water gas or smelter gas.

In an embodiment of the present disclosure, the vanadiferous feedstocks are pre-oxidized or roasted using a thermal process prior to the sulfuric acid digestion. In a further embodiment of the present disclosure, the thermal process is performed in air or oxygen enriched air. In a further embodiment of the present disclosure, the vanadiferous feedstocks are pre-oxidized followed by a pre-reduction using a thermal process prior to the sulfuric acid digestion.

In an embodiment of the present disclosure, the sulfuric acid digestion is performed with a solution of sulfuric acid (L) and a mass of vanadiferous feedstocks (S) having a mass ratio (L-to-S) not exceeding twenty to one (20:1 or 20 kg/kg). In a further embodiment of the present disclosure, the mass ratio (L-to-S) is not exceeding ten to one (10:1 or 10 kg/kg). In a further embodiment of the present disclosure, the mass ratio (L-to-S) is not exceeding five to one (5:1 or 5 kg/kg). In yet a further embodiment of the present disclosure, the mass ratio (L-to-S) is not exceeding two to one (2:1 or 2 kg/kg).

In an embodiment of the present disclosure, the sulfuric acid digestion is performed with a mass of pure sulfuric acid (100 wt. % $H_2SO_4$) (A) and a mass of vanadiferous feedstocks (S) having a mass ratio (A-to-S) not exceeding twenty to one (20:1 or 20 kg/kg). In a further embodiment of the present disclosure, the mass ratio (A-to-S) is not exceeding five to one (5:1 or 5 kg/kg). In a further embodiment of the present disclosure, the mass ratio (A-to-S) is not exceeding three to one (3:1 or 3 kg/kg). In yet a further embodiment of the present disclosure, the mass ratio (A-to-S) is not exceeding two to one (2:1 or 2 kg/kg). In yet a further embodiment of the present disclosure, the sulfuric acid digestion is performed autogenously by injecting water or steam into a mixture comprising the sulfuric acid and the vanadiferous feedstocks pre-heated at a temperature ranging from about 40° C. to about 110° C.

In an embodiment of the present disclosure, the sulfuric acid digestion is performed over a period ranging from about five (5) minutes up to about twenty-four (24) hours. In a further embodiment of the present disclosure, the sulfuric acid digestion is performed over a period ranging from about ten (10) minutes up to about fifteen (15) hours. In a further embodiment of the present disclosure, the sulfuric acid digestion is performed over a period ranging from about fifteen (15) minutes up to about ten (10) hours. In yet a further embodiment of the present disclosure, the sulfuric acid digestion is performed over a period ranging from about thirty (30) minutes up to about six (6) hours.

In an embodiment of the present disclosure, the sulfation cake obtained following sulfuric acid digestion is dissolved into at least one of water, acidified water or weak sulfuric acid. In a further embodiment of the present disclosure, the weak sulfuric acid comprises from about 1 g/L to about 300 g/L of $H_2SO_4$. In yet a further embodiment of the present disclosure, the weak sulfuric acid comprises from about 5 g/L to about 150 g/L of $H_2SO_4$. In yet a further embodiment of the present disclosure, the dissolution of the sulfation cake is performed at a temperature ranging from about 20° C. to about 100° C.

In an embodiment of the present disclosure, the sulfation cake obtained following sulfuric acid digestion is dissolved into at least one of water, acidified water or weak sulfuric acid. In a further embodiment of the present disclosure, the dissolution of the sulfation cake obtained following sulfuric acid digestion is performed with a mass of the at least one of water, acidified water or weak sulfuric acid (W) and a mass of sulfation cake (B) having a mass ratio (W-to-B) not exceeding twenty to one (20:1 or 20 kg/kg). In a further embodiment of the present disclosure, the mass ratio (W-to-B) is not exceeding ten to one (10:1 or 10 kg/kg). In yet a further embodiment of the present disclosure, the mass ratio (W-to-B) is not exceeding five to one (5:1 or 5 kg/kg). In yet a further embodiment of the present disclosure, the mass ratio (W-to-B) is not exceeding two to one (2:1 or 2 kg/kg).

In an embodiment of the present disclosure, the sulfation cake obtained following sulfuric acid digestion is dissolved into at least one of water, acidified water or weak sulfuric acid. In a further embodiment of the present disclosure, the dissolution of the sulfation cake obtained following sulfuric acid digestion is performed with a mass of the at least one of water, acidified water or weak sulfuric acid (W) and a mass of sulfation cake (B) having a mass ratio (W-to-B) of two to one (2:1 or 2 kg/kg).

In an embodiment of the present disclosure, silica and/or titanium dioxide values are recovered from the filter cake obtained following the separation of the insoluble solids from the pregnant solution.

In an embodiment of the present disclosure, reducing the pregnant solution comprises reacting the pregnant solution with at least one of metallic iron, aluminum, magnesium, zinc or alloys thereof. In an embodiment of the present disclosure, the metallic iron, aluminum, magnesium, zinc or alloys thereof comprise scrap, powder, flakes or turnings.

In an embodiment of the present disclosure, reducing the pregnant solution comprises reacting the pregnant solution with sulfur dioxide gas.

In an embodiment of the present disclosure, reducing the pregnant solution comprises electrochemically reducing the pregnant solution. In an embodiment of the present disclosure, the electrochemical reduction is performed using an undivided electrolyzer comprising a cathode and a sacrificial anode. In a further embodiment of the present disclosure, the sacrificial electrode comprises iron, steel, aluminum, zinc or alloys thereof. In a further embodiment of the present disclosure, the cathode comprises a metallic cathode. In yet a further embodiment of the present disclosure, the metallic cathode comprises at least one of iron, iron alloys, nickel, nickel alloys, copper, copper alloys, zinc, zinc alloys, titanium, titanium alloys, zirconium, zirconium alloys, lead, lead alloys, or austenitic stainless steels.

In an embodiment of the present disclosure, reducing the pregnant solution comprises electrochemically reducing the pregnant solution. In an embodiment of the present disclosure, the electrochemical reduction is performed using a divided electrolyzer. In an embodiment of the present disclosure, the electrochemical reduction is performed using a divided electrolyzer comprising a catholyte consisting of the pregnant solution. In yet a further embodiment of the present disclosure, the divided electrolyzer comprises a separator and mixed metal oxides (MMO) anodes or hydrogen depolarized anodes (HAD). In yet a further embodiment of the present disclosure, the divided electrolyzer comprises a separator comprising a diaphragm or an ion exchange membrane.

In an embodiment of the present disclosure, the process for recovering vanadium, iron, titanium and silica values from vanadiferous feedstocks further comprises concentrating the reduced pregnant solution. In an embodiment of the present disclosure, the process for recovering vanadium, iron, titanium and silica values from vanadiferous feedstocks further comprises concentrating the reduced pregnant solution and cooling the concentrated pregnant solution to a temperature not exceeding about 10° C. producing crystallized ferrous sulfate hydrates. In a further embodiment of the present disclosure, the concentrated pregnant solution is cooled to a temperature not exceeding about 5° C. In a further embodiment of the present disclosure, the concentrated pregnant solution is cooled to a temperature not exceeding about 0° C. In yet a further embodiment of the present disclosure, the cooling is performed using a crystallizer. In yet a further embodiment of the present disclosure, the crystallized ferrous sulfate hydrates are isolated by solid-liquid separation producing an iron depleted reduced solution.

In an embodiment of the present disclosure, the process for recovering vanadium, iron, titanium and silica values from vanadiferous feedstocks further comprises heating the iron depleted reduced solution and adding an alkaline material to the iron depleted reduced solution to precipitate the titanium compounds. In an embodiment of the present disclosure, the alkaline material comprises at least one of an alkali-metal carbonate or sulfate, an ammonium carbonate or an ammonium sulfate. In an embodiment of the present disclosure, the pH of the iron depleted reduced solution is adjusted to values ranging from about 0.5 to about 2.5. In yet a further embodiment of the present disclosure, the titanium compounds comprise compounds of at least formulas $MTi_3(SO_4)_4(OH)_6$ and $[Ti_2(SO_4)_3]_x[H_2SO_4]_y$, wherein M is selected from the group consisting of $H^+$, $NH_4^+$, $Na^+$ and $K^+$; and x and y are independently selected integers ranging from 1 to 10. In yet a further embodiment of the present disclosure, the precipitate of titanium compounds is oxidized and leached to produce a titanium dioxide product.

In an embodiment of the present disclosure, the process for recovering vanadium, iron, titanium and silica values from vanadiferous feedstocks further comprises removing any residual titanium values from the vanadium-rich pregnant solution. In an embodiment of the present disclosure, the residual titanium values are removed by boiling and hydrolysis.

In an embodiment of the present disclosure, the process for recovering vanadium, iron, titanium and silica values from vanadiferous feedstocks further comprises recovering vanadium values from the vanadium-rich pregnant solution. In a further embodiment of the present disclosure, the vanadium values are recovered by crystallization. In a further embodiment of the present disclosure, the vanadium values are recovered by chemical precipitation of vanadium compounds. In a further embodiment of the present disclosure, the vanadium values are recovered by chemical precipitation of hydrated oxides and/or hydroxides of vanadium (IV). In yet a further embodiment of the present disclosure, the vanadium values are recovered by oxidation of the precipitated hydrated oxides and/or hydroxides of vanadium (IV) to vanadium (V) and caustic or alkaline leaching to extract vanadium (V) as a soluble alkali-metal vanadate. In yet a further embodiment of the present disclosure, the vanadium values are recovered by oxidation of the vanadium-rich pregnant solution followed by chemical precipitation of oxides and/or hydroxides of vanadium (V) and iron (III). In yet a further embodiment of the present disclosure, the vanadium values are recovered by electrolysis.

In an embodiment of the present disclosure, the process for recovering vanadium, iron, titanium and silica values from vanadiferous feedstocks further comprises purifying the vanadium-rich pregnant solution producing a vanadium electrolyte. In an embodiment of the present disclosure, the vanadium-rich pregnant solution is purified by ion exchange, solvent extraction, electrolysis, or electrodialysis.

In an aspect, the present disclosure relates to a process for recovering vanadium and iron values from vanadiferous feedstocks, the process comprising digesting the vanadiferous feedstocks using sulfuric acid, producing vanadium pentoxide, and preparing a vanadium electrolyte. In an embodiment of the present disclosure, the sulfuric acid digestion is performed at temperatures ranging from room temperature up to 400° C. In an embodiment of the present disclosure, the process further comprises grinding the vanadiferous feedstock to a particle size below 0.500 millimeter. In an embodiment of the present disclosure, the process further comprises drying the vanadiferous feedstock prior to being processed for recovering vanadium and iron values. In yet a further embodiment of the present disclosure, the ground and oven dried vanadiferous feedstock is mixed with sulfuric acid in order to produce a suspension, a slurry or a paste and the temperature of the mixture is raised by heating the mixture until the operating temperature is reached. In yet a further embodiment of the present disclosure, the vanadiferous feedstocks comprise materials containing vanadium in various oxidation states or a mixture thereof including vanadiferous titanomagnetite, iron ores such as hematite, magnetite, wustite, siderite, ankerite, taconite, vanadium slags, industrial wastes and by-products containing vanadium such as metallurgical slags from iron and steel making.

Also disclosed in the context of the present disclosure are embodiments 1 to 142. Embodiment 1 is a process for recovering vanadium, iron, titanium and silica values from vanadiferous feedstocks, the process comprising: digesting the vanadiferous feedstocks into sulfuric acid thereby producing a sulfation cake; dissolving the sulfation cake and separating insoluble solids thereby producing a pregnant solution; reducing the pregnant solution thereby producing a reduced pregnant solution; crystallizing ferrous sulfate hydrates from the reduced pregnant solution, producing an iron depleted reduced solution; and removing titanium compounds from the iron depleted reduced solution thereby producing a vanadium-rich pregnant solution. Embodiment 2 is the process of embodiment 1, further comprising treating the vanadium-rich pregnant solution to recover vanadium products and/or a vanadium electrolyte. Embodiment 3 is the process of embodiment 1 or 2, wherein the vanadiferous feedstocks comprise materials containing vanadium in various oxidation states. Embodiment 4 is the process of any one of embodiments 1 to 3, wherein the vanadiferous feedstocks comprise vanadiferous titanomagnetite, iron ores, industrial wastes and/or industrial by-products. Embodiment 5 is the process of embodiment 4, wherein the iron ores comprise hematite, magnetite, wustite, siderite, ankerite and/or taconite. Embodiment 6 is the process of embodiment 4, wherein the by-products comprise vanadium bearing metallurgical slags and/or residues from iron making and/or steel making. Embodiment 7 is the process of any one of embodiments 1 to 6, wherein the sulfuric acid digestion comprises using an aqueous solution of sulfuric acid having a mass percentage from about 5 wt. % $H_2SO_4$ to about 100 wt. % $H_2SO_4$. Embodiment 8 is the process of embodiment 7, wherein the aqueous solution of sulfuric acid has a mass percentage from about 15 wt. % $H_2SO_4$ to about 99 wt. % $H_2SO_4$. Embodiment 9 is the process of embodiment 7 or 8, wherein the aqueous solution of sulfuric acid has a mass percentage from about 30 wt. % $H_2SO_4$ to about 98 wt. % $H_2SO_4$. Embodiment 10 is the process of any one of embodiments 1 to 9, wherein the sulfuric acid digestion further comprises the use of oleum. Embodiment 11 is the process of embodiment 10, wherein the oleum comprises substantially 100 wt. % $H_2SO_4$ and an excess of up to 65 wt. % of dissolved $SO_3$. Embodiment 12 is the process of any one of embodiments 1 to 11, wherein the sulfuric acid digestion further comprises the addition of ammonium or alkali-metal sulfates of general formula $M_2SO_4$ to the sulfuric acid, wherein M is $NH_4^+$, $Li^+$, $Na^+$ or $K^+$. Embodiment 13 is the process of any one of embodiments 1 to 6, wherein the vanadiferous feedstocks are ground to a particle size of less than about 0.500 millimeter. Embodiment 14 is the process of embodiment 13, wherein the vanadiferous feedstocks are ground to a particle size of less than about 0.125 millimeter. Embodiment 15 is the process of embodiment 13 or 14, wherein the vanadiferous feedstocks are ground to a particle size of less than about 0.050 millimeter. Embodiment 16 is the process of any one of embodiments 1 to 15, wherein the vanadiferous feedstocks are oven dried prior to being processed to remove residual moisture. Embodiment 17 is the process of embodiment 16, wherein the vanadiferous feedstocks are fed into the sulfuric acid at a temperature ranging from 20° C. to 400° C. and stirred. Embodiment 18 is the process of embodiment 16, wherein the vanadiferous feedstocks are mixed with the sulfuric acid to produce a suspension, a slurry or a paste and heating the suspension, slurry or paste to a temperature ranging from 50° C. to 250° C. Embodiment 19 is the process of embodiment 16, wherein the vanadiferous feedstocks are mixed with the sulfuric acid to produce a suspension, a slurry or a paste and water and/or steam are injected into the suspension, slurry or paste to raise the temperature of the suspension, slurry or paste to a temperature ranging from 50° C. to 250° C. Embodiment 20 is the process of embodiment 15, wherein the vanadiferous feedstocks comprise a moisture content from about 0.5 wt. % up to about 60 wt. %. Embodiment 21 is the process of embodiment 20, wherein the vanadiferous feedstocks are fed into the sulfuric acid and stirred. Embodiment 22 is the process of any one of embodiments 1 to 21, wherein the sulfuric acid digestion is performed at temperatures ranging from about 20° C. to about 400° C. Embodiment 23 is the process of embodiment 22, wherein the sulfuric acid digestion is performed at temperatures ranging from about 50° C. to about 300° C. Embodiment 24 is the process of embodiment 22 or 23, wherein the sulfuric acid digestion is performed at temperatures from about 75° C. to about 250° C. Embodiment 25 is the process of embodiment 1, wherein the vanadiferous feedstocks are pre-reduced using a thermal reduction process prior to the sulfuric acid digestion. Embodiment 26 is the process of embodiment 25, wherein the thermal reduction process comprises the use of a reductant chosen from at least one of anthracite, sub-bituminous coal, bunker oil, natural gas, methane, carbon monoxide, hydrogen gas, water gas or smelter gas. Embodiment 27 is the process of embodiment 1, wherein the vanadiferous feedstocks are pre-oxidized or roasted using a thermal process prior to the sulfuric acid digestion. Embodiment 28 is the process of embodiment 27, wherein the thermal process is performed in air or oxygen enriched air. Embodiment 29 is the process of embodiment 1, wherein the sulfuric acid digestion is performed with a solution of sulfuric acid (L) and a mass of vanadiferous feedstocks (S) having a mass ratio (L-to-S) not exceeding twenty to one (20:1 or 20 kg/kg). Embodiment 30 is the process of embodiment 29, wherein the mass ratio (L-to-S) is not exceeding ten to one (10:1 or 10 kg/kg). Embodiment 31 is the process of embodiment 29 or 30, wherein the mass ratio (L-to-S) is not exceeding five to one (5:1 or 5 kg/kg). Embodiment 32 is the process of any one of embodiments 29 to 31, wherein the mass ratio (L-to-S) is not exceeding two to one (2:1 or 2 kg/kg). Embodiment 33 is the process of embodiment 1, wherein the sulfuric acid digestion is performed with a mass of pure sulfuric acid (100 wt. % $H_2SO_4$) (A) and a mass of vanadiferous feedstocks (S) having a mass ratio (A-to-S) not exceeding twenty to one (20:1 or 20 kg/kg). Embodiment 34 is the process of embodiment 33, wherein the mass ratio (A-to-S) is not exceeding five to one (5:1 or 5 kg/kg). Embodiment 35 is the process of embodiment 33 or 34, wherein the mass ratio (A-to-S) is not exceeding three to one (3:1 or 3 kg/kg). Embodiment 36 is the process of any one of embodiments 33 to 35, wherein the mass ratio (A-to-S) is not exceeding two to one (2:1 or 2 kg/kg). Embodiment 37 is the process of embodiment 1, wherein the sulfuric acid digestion is performed with pure sulfuric acid (100 wt. % $H_2SO_4$) (A) and a mass of vanadiferous feedstocks (S) having a mass ratio (A-to-S) of two to one (2:1 or 2 kg/kg). Embodiment 38 is the process of embodiment 1, wherein the sulfuric acid digestion is performed over a period ranging from about five (5) minutes up to about twenty-four (24) hours. Embodiment 39 is the process of embodiment 38, wherein the sulfuric acid digestion is performed over a period ranging from about ten (10) minutes up to about fifteen (15) hours. Embodiment 40 is the process of embodiment 38 or 39, wherein the sulfuric acid digestion is performed over a period ranging from about fifteen (15) minutes up to about ten (10) hours. Embodiment 41 is the process of any one of embodiments 38 to 40, wherein the sulfuric acid digestion is performed over a period ranging from about thirty (30) minutes up to about six (6) hours. Embodiment 42 is the process of embodiment 1, wherein the sulfuric acid digestion is performed in air. Embodiment 43 is the process of embodiment 1, wherein the sulfuric acid digestion is performed under an inert atmosphere. Embodiment 44 is the process of embodiment 1, wherein the sulfuric acid digestion is performed at atmospheric pressure. Embodiment 45 is the process of embodiment 1, wherein the sulfuric acid digestion is performed under pressure. Embodiment 46 is the process of embodiment 45, wherein the sulfuric acid digestion is performed in an autoclave. Embodiment 47 is the process of embodiment 1, wherein the sulfuric acid digestion is performed batch wise. Embodiment 48 is the process of embodiment 47, wherein the sulfuric acid digestion is performed using a brick-lined digester or a corrosion resistant vessel. Embodiment 49 is the process of embodiment 1, wherein the sulfuric acid digestion is performed semi-continuously or continuously. Embodiment 50 is the process of embodiment 1, wherein the sulfuric acid digestion is performed using a rotary kiln or a rotary heart furnace. Embodiment 51 is the process of embodiment 22, wherein external heating is provided. Embodiment 52 is the process of embodiment 51, wherein the external heating is provided using a jacketed vessel comprising a hot circulation fluid, indirect flame heating, gas fired burners, gas heaters or electrical heaters. Embodiment 53 is the process of embodiment 22, wherein internal heating is provided. Embodiment 54 is the process of embodiment 53, wherein the internal heating is provided using direct flame heating, gas fired burners, radiant gas heaters, internal electrical heaters or Joule heating using immersed AC or DC electrodes. Embodiment 55 is the process of embodiment 22, wherein the sulfuric acid digestion is performed autogenously by injecting water or steam into a mixture comprising the sulfuric acid and the vanadiferous feedstocks pre-heated at a temperature ranging from about 40° C. to about 110° C. Embodiment 56 is the process of embodiment 1, wherein the sulfuring acid digestion comprises agitating a mixture comprising the sulfuric acid and the vanadiferous feedstocks. Embodiment 57 is the process of embodiment 56, wherein the agitating is performed mechanically using motor-driven impellers. Embodiment 58 is the process of embodiment 56, wherein the agitating is performed by injecting compressed gas into the mixture. Embodiment 59 is the process of embodiment 58, wherein the injection of the compressed gas is performed through nozzles or porous plugs located at a bottom portion of a digester, a corrosion resistant vessel, a rotary kiln or a rotary heart furnace. Embodiment 60 is the process of embodiment 58, wherein the injection of the compressed gas is performed using a lance. Embodiment 61 is the process of embodiment 1, wherein the sulfuring acid digestion is performed in a temperature and corrosion resistant containment vessel or a digester. Embodiment 62 is the process of embodiment 61, wherein the containment vessel or digester comprises bulk metals or alloys. Embodiment 63 is the process of embodiment 62, wherein the bulk metals or alloys include high silicon cast iron or high nickel-alloys. Embodiment 64 is the process of embodiment 63, wherein the high silicon cast iron is Duriron®. Embodiment 65 is the process of embodiment 63, wherein the high nickel-alloys are Hastelloy® B2, or Hastelloy® C-276. Embodiment 66 is the process of embodiment 61, wherein the containment vessel or digester comprises composite metallic materials. Embodiment 67 is the process of embodiment 66, wherein the composite metallic materials include cast iron, steel, heat resistant stainless steels and high nickel alloys clad with an inner liner made of a corrosion resistant material. Embodiment 68 is the process of embodiment 67, wherein the corrosion resistant material includes tantalum, enamel, glass, or a polymeric material. Embodiment 69 is the process of embodiment 68, wherein the polymeric material includes at least one of TFE, PVDF, PTFE or PFA. Embodiment 70 is the process of embodiment 61, wherein the digester comprises a steel shell lined with at least one impervious layer and at least one refractory layer. Embodiment 71 is the process of embodiment 70, wherein the impervious layer comprises plastics, elastomers, lead or lead alloys. Embodiment 72 is the process of embodiment 70, wherein the refractory layer comprises high silica bricks assembled with an acid resistant mortar comprising silica and/or potassium silicate. Embodiment 73 is the process of embodiment 1, wherein the sulfation cake is dissolved into at least one of water, acidified water or weak sulfuric acid. Embodiment 74 is the process of embodiment 73, wherein the weak sulfuric acid comprises from about 1 g/L to about 300 g/L of $H_2SO_4$. Embodiment 75 is the process of embodiment 73 or 74, wherein the weak sulfuric acid comprises from about 5 g/L to about 150 g/L of $H_2SO_4$. Embodiment 76 is the process of any one of embodiments 73 to 75, wherein the dissolution of the sulfation cake is performed at a temperature ranging from about 20° C. to about 100° C. Embodiment 77 is the process of any one of embodiments 73 to 76, wherein the dissolution of the sulfation cake is performed in multistage concurrent mode. Embodiment 78 is the process of any one of embodiments 73 to 76, wherein the dissolution of the sulfation cake is performed in multistage countercurrent mode. Embodiment 79 is the process of any one of embodiments 73 to 76, wherein the dissolution of the sulfation cake is performed in batch concurrent multiple contact mode. Embodiment 80 is the process of any one of embodiments 73 to 76, wherein the dissolution of the sulfation cake is performed in batch countercurrent multiple contact mode. Embodiment 81 is the process of embodiment 1, wherein the pregnant solution is at a pH below 2.0. Embodiment 82 is the process of embodiment 1, wherein the pregnant solution is kept at a temperature ranging from about 20° C. to about 80° C. Embodiment 83 is the process of embodiment 73, wherein the dissolution of the sulfation cake is performed with a mass of the at least one of water, acidified water or weak sulfuric acid (W) and a mass of sulfation cake (B) having a mass ratio (W-to-B) not exceeding twenty to one (20:1 or 20 kg/kg). Embodiment 84 is the process of embodiment 83, wherein the mass ratio (W-to-B) is not exceeding ten to one (10:1 or 10 kg/kg). Embodiment 85 is the process of embodiment 83 or 84, wherein the mass ratio (W-to-B) is not exceeding five to one (5:1 or 5 kg/kg). Embodiment 86 is the process of any one of embodiments 83 to 85, wherein the mass ratio (W-to-B) is not exceeding two to one (2:1 or 2 kg/kg). Embodiment 87 is the process of embodiment 73, wherein the dissolution of the sulfation cake is performed with a mass of the at least one of water, acidified water or weak sulfuric acid (W) and a mass of sulfation cake (B) having a mass ratio (W-to-B) of two to one (2:1 or 2 kg/kg). Embodiment 88 is the process of embodiment 1, wherein the insoluble residues are separated from the pregnant solution by solid-liquid separation techniques producing a filter cake. Embodiment 89 is the process of embodiment 88, further comprising recovering silica and/or titanium dioxide values from the filter cake. Embodiment 90 is the process of embodiment 1, wherein reducing the pregnant solution comprises reacting the pregnant solution with at least one of metallic iron, aluminum, magnesium, zinc or alloys thereof. Embodiment 91 is the process of embodiment 90, wherein the metallic iron, aluminum, magnesium, zinc or alloys thereof comprise scrap, powder, flakes or turnings. Embodiment 92 is the process of embodiment 1, wherein reducing the pregnant solution comprises reacting the pregnant solution with sulfur dioxide gas. Embodiment 93 is the process of embodiment 1, wherein reducing the pregnant solution comprises electrochemically reducing the pregnant solution. Embodiment 94 is the process of embodiment 93, wherein the electrochemical reduction is performed using an undivided electrolyzer comprising a cathode and a sacrificial anode. Embodiment 95 is the process of embodiment 94, wherein the sacrificial electrode comprises iron, steel, aluminum, zinc or alloys thereof. Embodiment 96 is the process of embodiment 94, wherein the cathode comprises a metallic cathode. Embodiment 97 is the process of embodiment 96, wherein the metallic cathode comprises at least one of iron, iron alloys, nickel, nickel alloys, copper, copper alloys, zinc, zinc alloys, titanium, titanium alloys, zirconium, zirconium alloys, lead, lead alloys, or austenitic stainless steels. Embodiment 98 is the process of embodiment 93, wherein the electrochemical reduction is performed using a divided electrolyzer. Embodiment 99 is the process of embodiment 98, wherein the divided electrolyzer comprises a catholyte consisting of the pregnant solution. Embodiment 100 is the process of embodiment 98 or 99, wherein the divided electrolyzer comprises a separator and mixed metal oxides (MMO) anodes or hydrogen depolarized anodes (HAD). Embodiment 101 is the process of embodiment 100, wherein the separator comprises a diaphragm or an ion exchange membrane. Embodiment 102 is the process of embodiment 1, further comprising concentrating the reduced pregnant solution. Embodiment 103 is the process of embodiment 102, further comprising cooling the concentrated pregnant solution to a temperature not exceeding about 10° C. producing the crystallized ferrous sulfate hydrates. Embodiment 104 is the process of embodiment 102, wherein the concentrated pregnant solution is cooled to a temperature not exceeding about 5° C. Embodiment 105 is the process of embodiment 103 or 104, wherein the concentrated pregnant solution is cooled to a temperature not exceeding about 0° C. Embodiment 106 is the process of any one of embodiments 103 to 105, wherein the cooling is performed using a crystallizer. Embodiment 107 is the process of any one of embodiments 103 to 106, wherein the crystallized ferrous sulfate hydrates are isolated by solid-liquid separation producing the iron depleted reduced solution. Embodiment 108 is the process of embodiment 107, wherein the crystalline ferrous sulfate hydrates are rinsed with sulfuric acid. Embodiment 109 is the process of embodiment 1, further comprising heating the iron depleted reduced solution and adding an alkaline material to the iron depleted reduced solution to precipitate the titanium compounds. Embodiment 110 is the process of embodiment 109, wherein the alkaline material comprises at least one of an alkali-metal carbonate or sulfate, an ammonium carbonate or an ammonium sulfate. Embodiment 111 is the process of embodiment 109 or 110, wherein the pH of the iron depleted reduced solution is adjusted to values ranging from about 0.5 to about 2.5. Embodiment 112 is the process of any one of embodiments 109 to 111, wherein the titanium compounds comprise compounds of at least formulas $MTi_3(SO_4)_4(OH)_6$ and $[Ti_2(SO_4)_3]_x[H_2SO_4]_y$, wherein M is selected from the group consisting of $H^+$, $NH_4^+$, $Na^+$ and $K^+$; and x and y are independently selected integers ranging from 1 to 10. Embodiment 113 is the process of embodiment 112, wherein seeds of the compounds of formula $MTi_3(SO_4)_4(OH)_6$ are added to the iron depleted reduced solution to trigger the precipitation. Embodiment 114 is the process of any one of embodiments 109 to 113, wherein the precipitate is isolated by solid-liquid separation producing the vanadium-rich pregnant solution. Embodiment 115 is the process of embodiment 114, further comprising washing and drying the precipitate. Embodiment 116 is the process of embodiment 115, further comprising oxidizing the precipitate. Embodiment 117 is the process of embodiment 116, further comprising leaching the precipitate using sulfuric acid producing a titanium dioxide product. Embodiment 118 is the process of embodiment 1, further comprising removing any residual titanium values from the vanadium-rich pregnant solution. Embodiment 119 is the process of embodiment 114, further comprising removing any residual titanium values from the vanadium-rich pregnant solution. Embodiment 120 is the process of embodiment 118 or 119, wherein the residual titanium values are removed by boiling and hydrolysis. Embodiment 121 is the process of embodiment 1, further comprising recovering vanadium values from the vanadium-rich pregnant solution. Embodiment 122 is the process of embodiment 120, further comprising recovering vanadium values from the vanadium-rich pregnant solution. Embodiment 123 is the process of embodiment 121 or 122, wherein the vanadium values are recovered by crystallization. Embodiment 124 is the process of embodiment 121 or 122, wherein the vanadium values are recovered by chemical precipitation of vanadium compounds. Embodiment 125 is the process of embodiment 121 or 122, wherein the vanadium values are recovered by chemical precipitation of hydrated oxides and/or hydroxides of vanadium (IV). Embodiment 126 is the process of embodiment 125, wherein the vanadium values are recovered by oxidation of the precipitated hydrated oxides and/or hydroxides of vanadium (IV) to vanadium (V) and caustic or alkaline leaching to extract vanadium (V) as a soluble alkali-metal vanadate. Embodiment 127 is the process of embodiment 121 or 122, wherein the vanadium values are recovered by oxidation of the vanadium-rich pregnant solution followed by chemical precipitation of oxides and/or hydroxides of vanadium (V) and iron (III). Embodiment 128 is the process of embodiment 127, further comprising caustic or alkaline leaching to extract vanadium (V) as a soluble alkali-metal vanadate. Embodiment 129 is the process of embodiment 121 or 122, wherein the vanadium values are recovered by removal of any remaining iron (II) by oxidation to iron (III) using ammonium persulfate and precipitation of the oxidized iron as natrojarosite or other jarosite type solids. Embodiment 130 is the process of embodiment 126 or 127, further comprising precipitating ammonium metavanadate ($NH_4VO_3$). Embodiment 131 is the process of embodiment 121 or 122, wherein the vanadium values are recovered by electrolysis. Embodiment 132 is the process of embodiment 1, further comprising purifying the vanadium-rich pregnant solution producing a vanadium electrolyte. Embodiment 133 is the process of embodiment 118, further comprising purifying the vanadium-rich pregnant solution producing a vanadium electrolyte. Embodiment 134 is the process of embodiment 119, further comprising purifying the vanadium-rich pregnant solution producing a vanadium electrolyte. Embodiment 135 is the process of any one of embodiments 126 to 133, wherein the vanadium-rich pregnant solution is purified by ion exchange, solvent extraction, electrolysis, or electrodialysis.

Embodiment 136 is a process for recovering vanadium and iron values from vanadiferous feedstocks comprising digesting the vanadiferous feedstocks using sulfuric acid, producing vanadium pentoxide, and preparing a vanadium electrolyte. Embodiment 137 is the process of embodiment 136, wherein the sulfuric acid digestion is performed at temperatures ranging from room temperature up to 400° C. Embodiment 138 is the process of embodiment 136 or 137, wherein the vanadiferous feedstock is ground to a particle size below 0.500 millimeter. Embodiment 139 is the process of any one of embodiments 136 to 138, wherein the vanadiferous feedstock is oven dried prior to being processed for removing the residual moisture. Embodiment 140 is the process of embodiment 139, wherein the ground and oven dried vanadiferous feedstock is mixed with sulfuric acid in order to produce a suspension, a slurry or a paste and the temperature of the mixture is raised by heating the mixture until the operating temperature is reached. Embodiment 141 is the process of any one of embodiments 136 to 140, wherein the sulfuric acid digestion is performed in air or inert atmosphere. Embodiment 142 is the process of any one of embodiments 136 to 140, wherein the sulfuric acid digestion is performed at atmospheric pressure or under pressures in excess of atmospheric pressure. Embodiment 143 is the process of any one of embodiments 136 to 142, wherein the vanadiferous feedstocks comprise materials containing vanadium in various oxidation states or a mixture thereof including vanadiferous titanomagnetite, iron ores such as hematite, magnetite, wustite, siderite, ankerite, taconite, vanadium slags, industrial wastes and by-products containing vanadium such as metallurgical slags from iron and steel making.

The foregoing and other objects, advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

Figure 5:
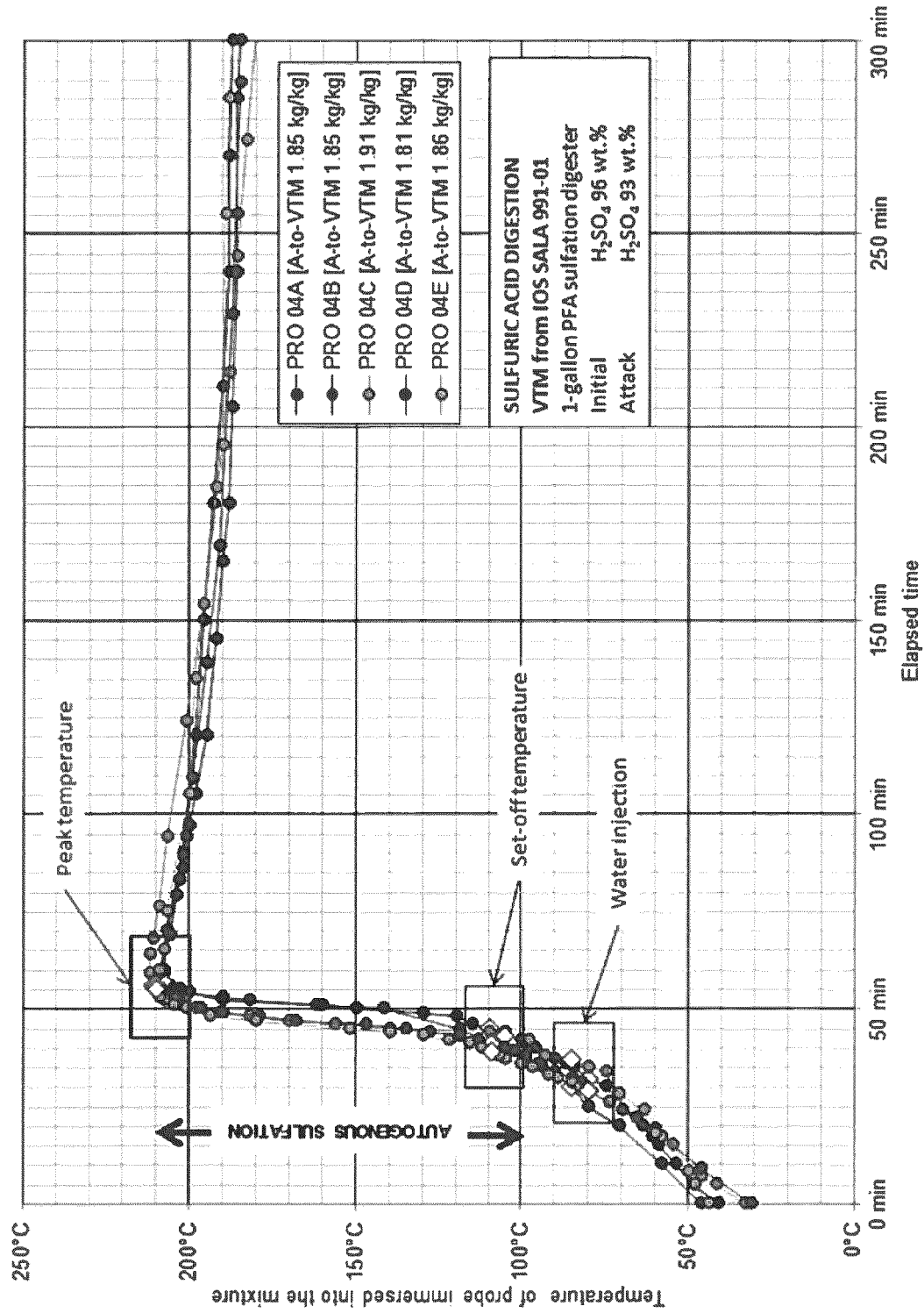

FIG. 5 is an illustration of various experimental plots illustration the variations of the temperature as recorded by a thermocouple probe immersed in a sulfation mixture as a function of sulfation time, in accordance with various embodiments of the present disclosure. The temperature variations were recorded during the sulfuric acid digestion of four batches of titanomagnetite using a one-gallon digester and by injecting water to trigger the autogenous sulfation reaction.

FIG. 6 is an illustration of a schematic drawing illustrating a custom made 15-gallon sulfation digester used for pre-forming the sulfuric acid digestion of various vanadiferous feedstocks, in accordance with various embodiments of the present disclosure.

Figure 7:
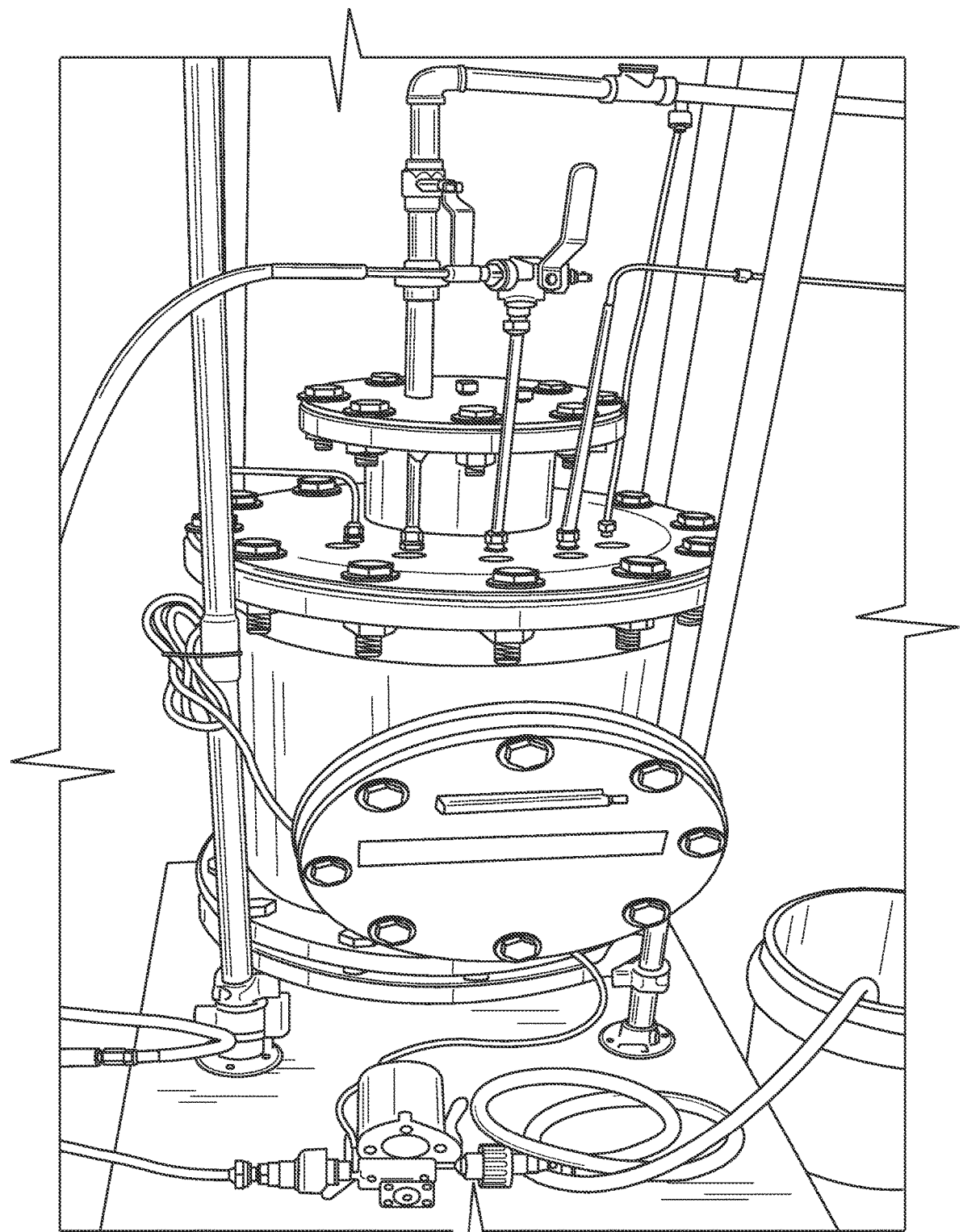

FIG. 7 is a photograph illustrating the custom made 15-gallon sulfation digester of FIG. 6.

Figure 8:
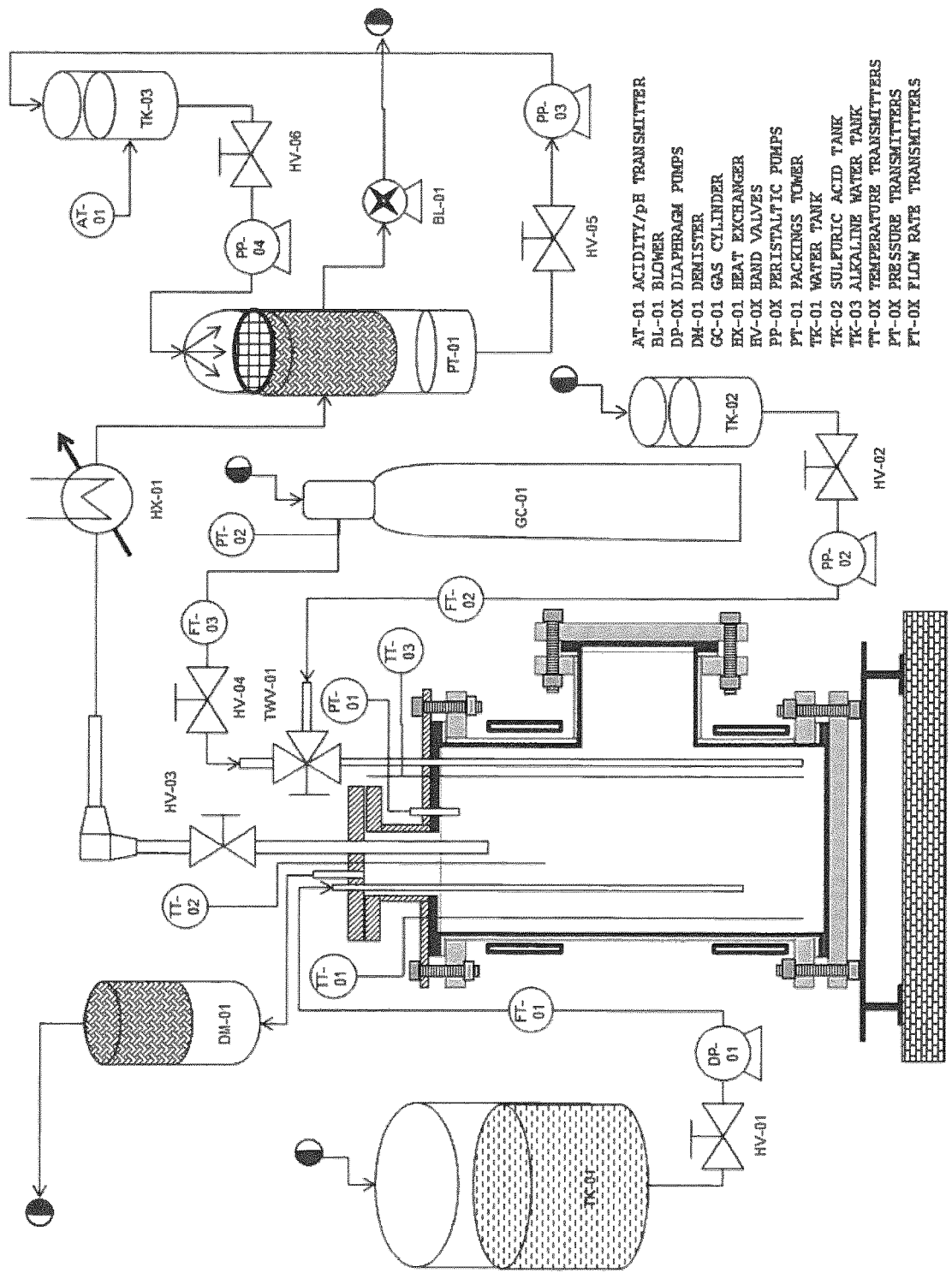

FIG. 8 is an illustration of a schematic process flow diagram (PFD) illustrating the custom made 15-gallon sulfation digester of FIGS. 6 and 7 in operation, in accordance with various embodiments of the present disclosure.

Figure 9:
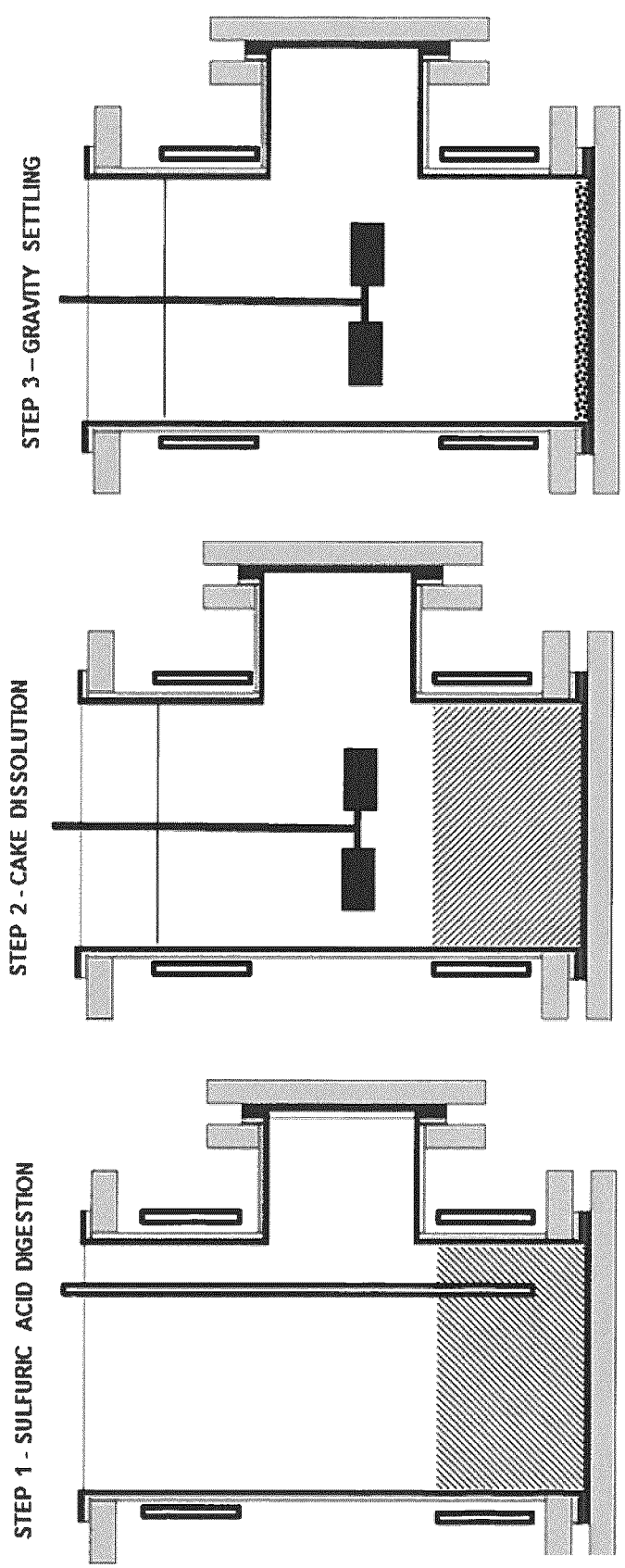

FIG. 9 is a side cross-sectional view of an interior portion of the custom made 15-gallon sulfation digester of FIGS. 6 and 7 during sulfuric acid digestion, cake dissolution and gravity settling, in accordance with various embodiments of the present disclosure.

Figure 10:
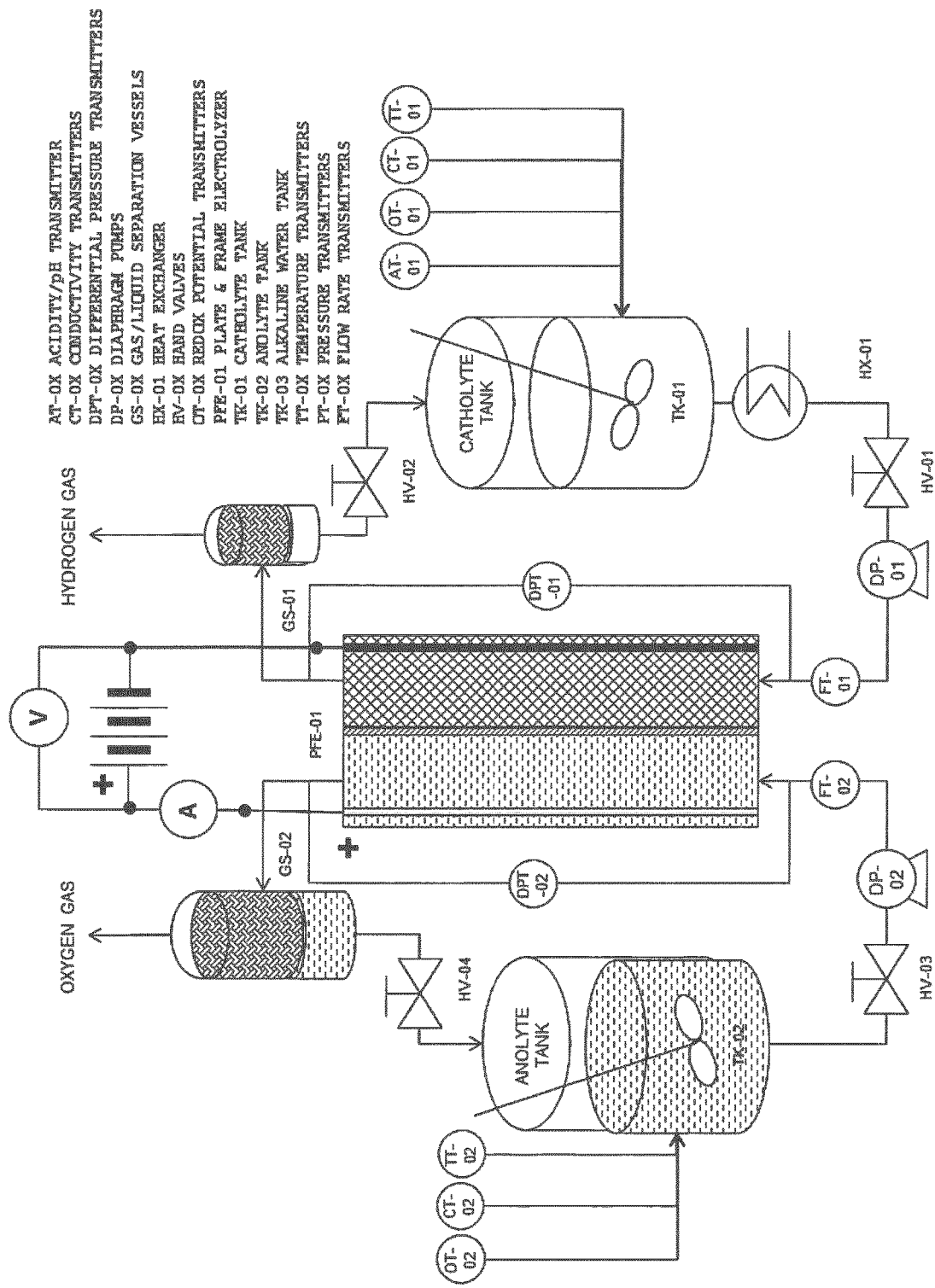

FIG. 10 is an illustration of a schematic process flow diagram (PFD) illustrating the electrochemical setup for reducing the pregnant solution, effecting the electro-reduction of Fe(III) into Fe(II) using a divided electrolyzer in accordance with an embodiment of the present disclosure.

Figure 11:
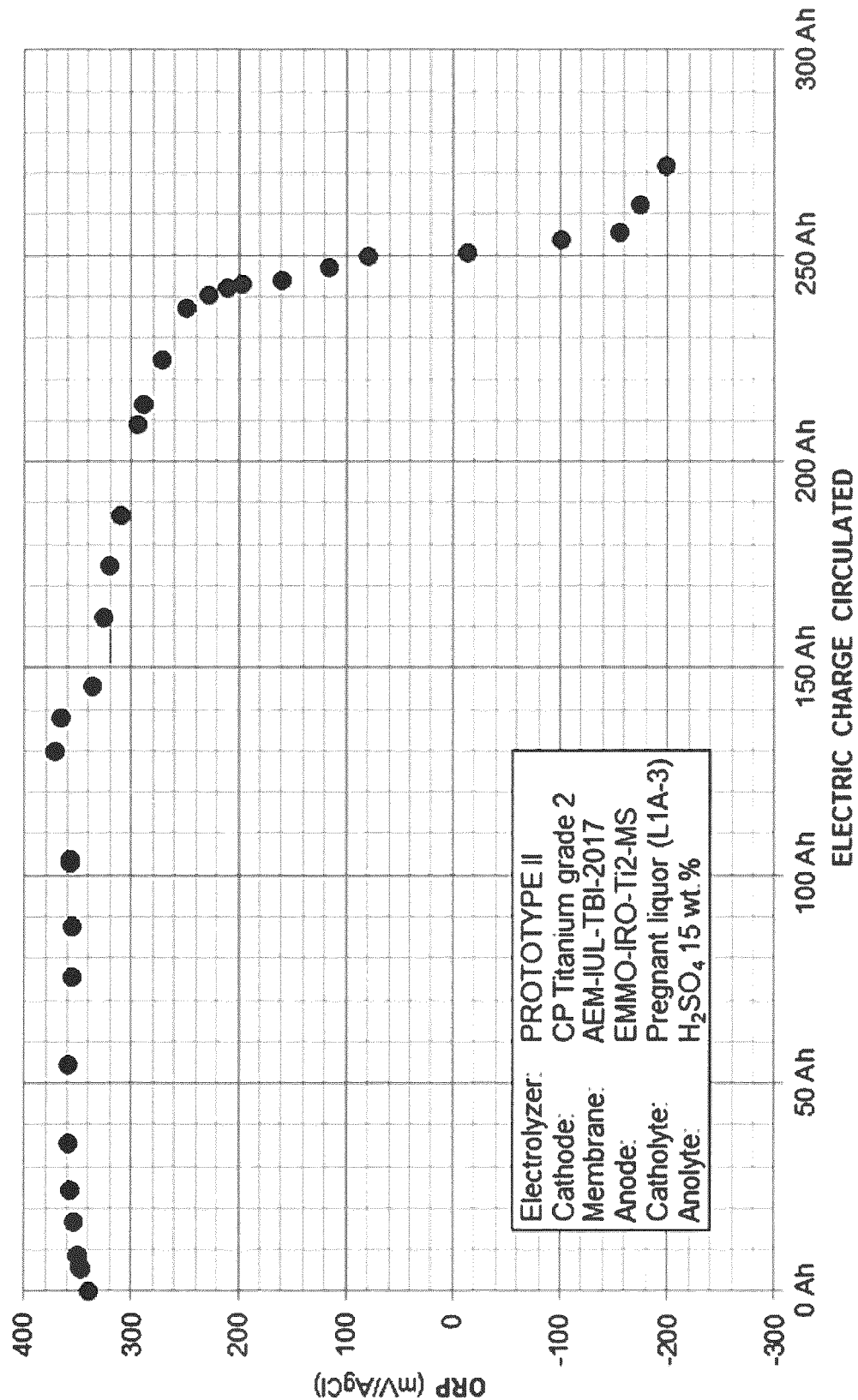

FIG. 11 is an illustration of an experimental plot illustrating the oxidation-reduction potential (ORP) measured in the cathode compartment of a PROTYPE II divided electrolyzer during the electrochemical reduction of the pregnant solution obtained after dissolution of the sulfation cake, in accordance with an embodiment of the present disclosure.

Figure 12:
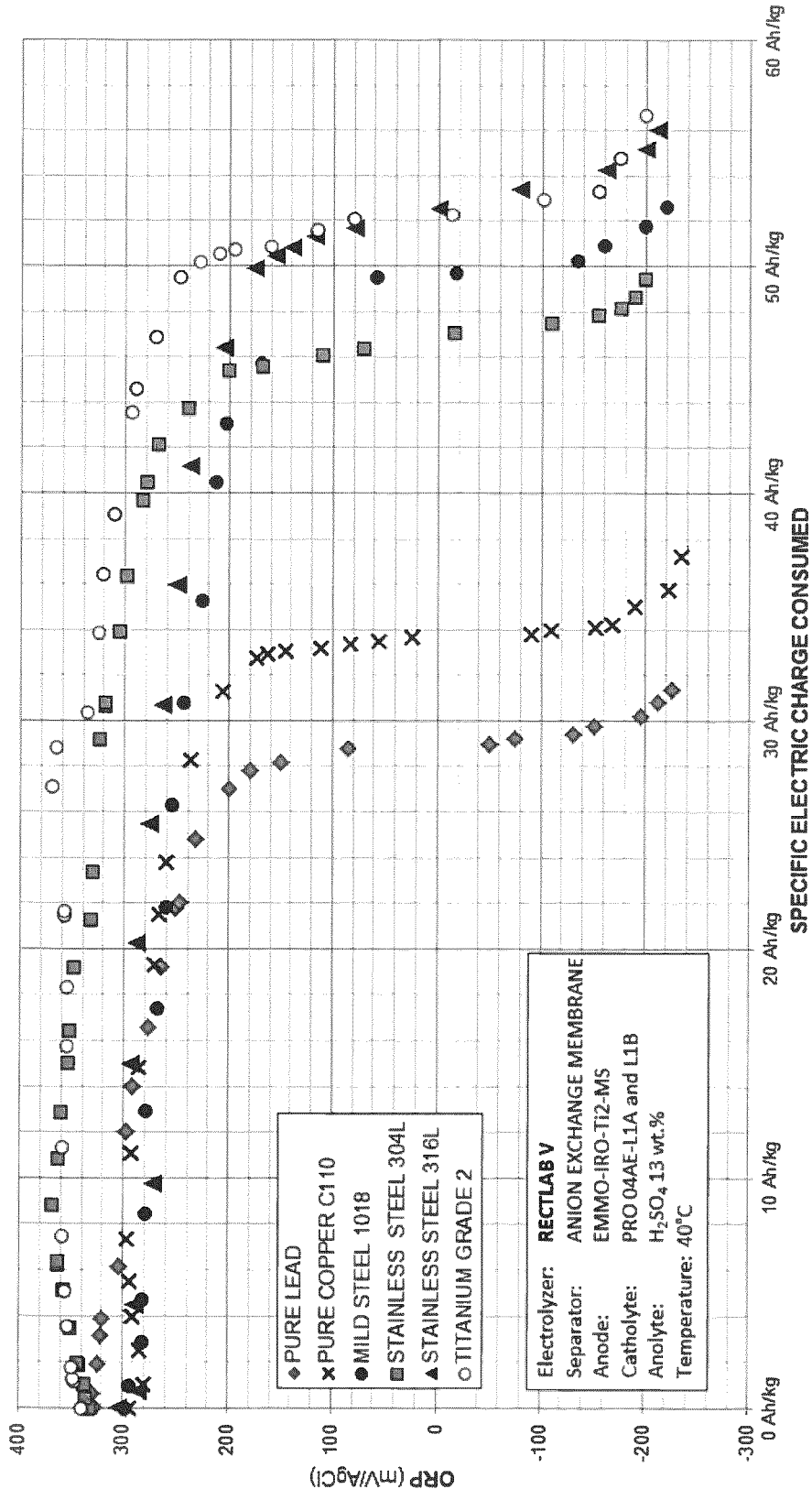

FIG. 12 is an illustration of various normalized plots illustrating the oxidation-reduction potential (ORP) as a function of specific charge measured in the cathode compartment of a RECTLAB V divided electrolyzer for several cathode materials (e.g. pure electrolytic copper C110, pure chemical lead, mild steel AISI 1018, stainless steel grades AISI 304 and AISI 316 and titanium grade 2) during the electrochemical reduction of the pregnant solution obtained after dissolution of the sulfation cake, in accordance with various embodiments of the present disclosure.

Figure 13:
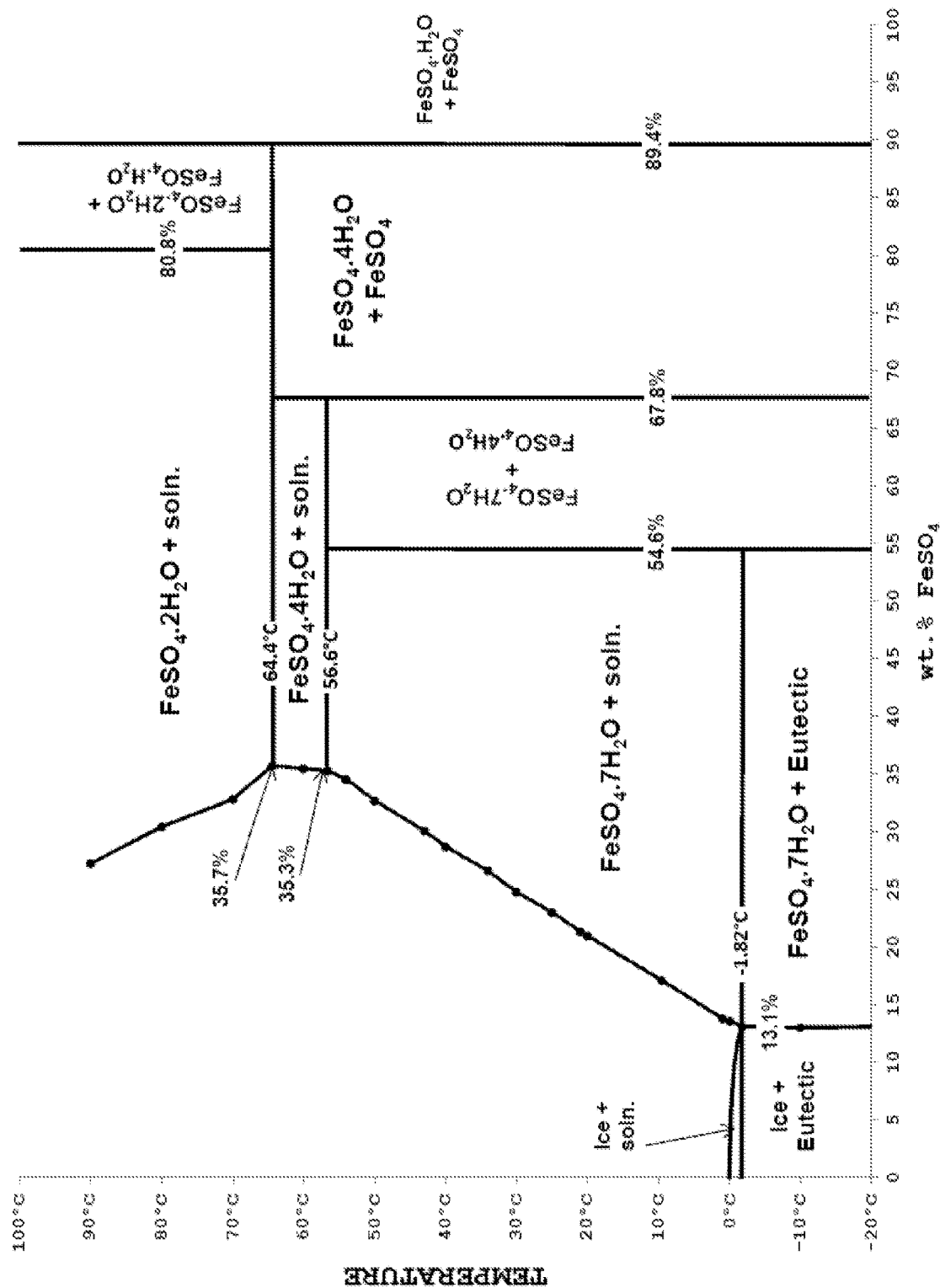

FIG. 13 is an illustration of a binary phase diagram of aqueous solutions of water and iron (II) sulfate ($H_2O$—$FeSO_4$) at atmospheric pressure, in accordance with an embodiment of the present disclosure.

Figure 14:
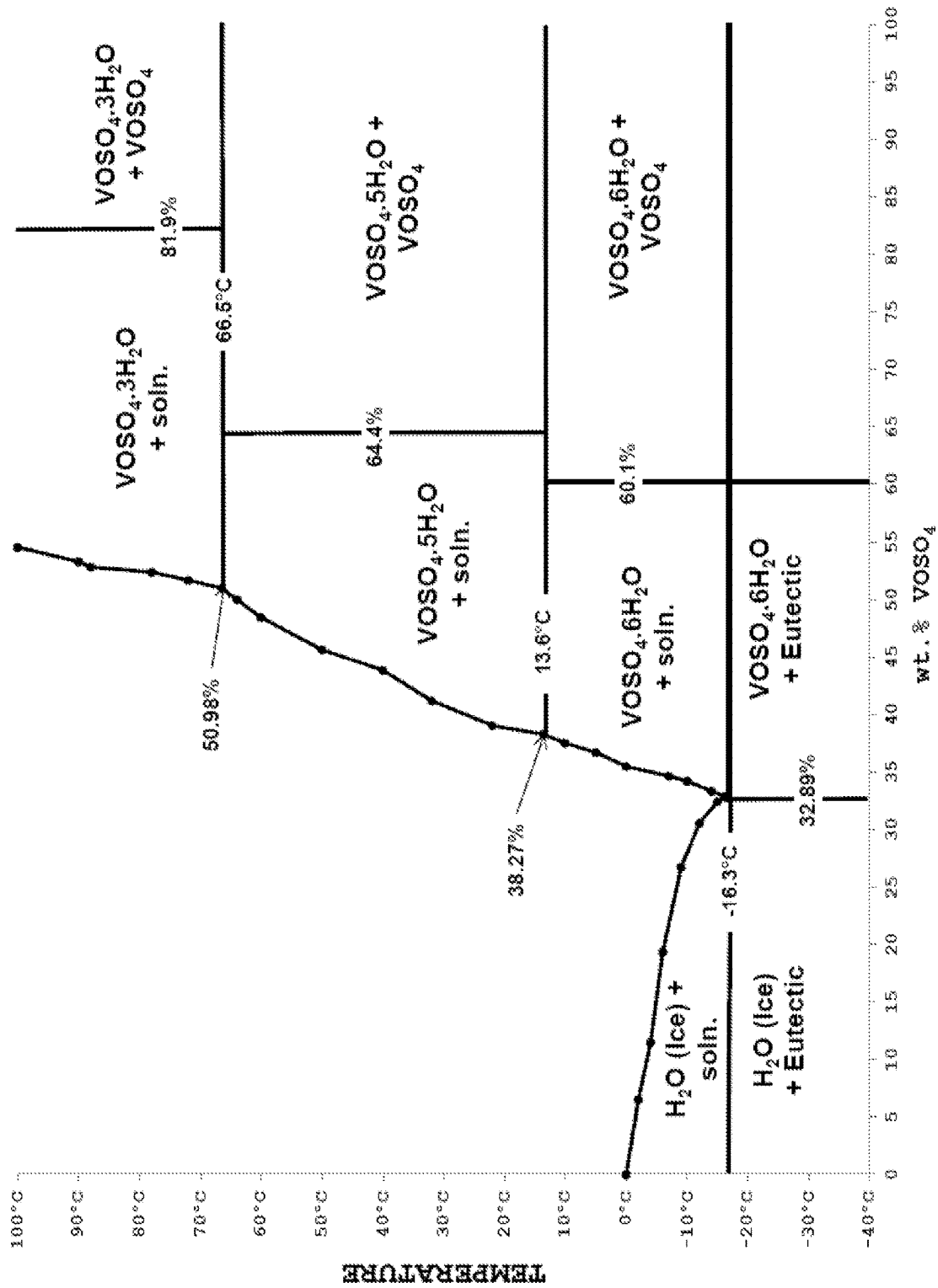

FIG. 14 is an illustration of a binary phase diagram of aqueous solutions of water and vanadyl sulfate ($H_2O$—$VOSO_4$) at atmospheric pressure, in accordance with an embodiment of the present disclosure.

DETAILED DESCRIPTION

Glossary

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Unless otherwise indicated, the definitions and embodiments described in this and other sections are intended to be applicable to all embodiments and aspects of the application herein described for which they are suitable as would be understood by a person skilled in the art.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±17o of the modified term if this deviation would not negate the meaning of the word it modifies.

As used herein, the term "vanadiferous feedstocks" refers to a range of materials containing vanadium in various oxidation states: V(V), V(IV), V(III), V(II) and vanadium metal such as but not restricted to vanadiferous titanomagnetite, iron ores such as hematite, magnetite, wustite, siderite, ankerite, taconite, vanadium slags, industrial wastes and by-products containing vanadium such as metallurgical slags from iron making and steel making.

As used herein, the term "concentrate" or "ore concentrate" refers to a mineral product obtained after mineral dressing and beneficiation and from which most of the gangue minerals and waste rock have been removed and discarded as tailings. The concentrate is frequently the raw material for further metallurgical and chemical treatments such as roasting, leaching and smelting.

As used herein, the term "sulfuric acid digestion" broadly refers to the digestion of a solid with sulfuric acid having a concentration ranging from 5 wt. % to 100 wt. %.

As used herein, the term "sulfation acid baking" (SAB) refers to the mixing of a solid and concentrated sulfuric acid having a concentration ranging from 60 wt. % to 100 wt. %, heating the mixture at a temperature remaining below the boiling point of the original acid, but high enough to start the exothermic sulfation reaction, continue heating after the peak temperature has been passed and the reaction mass yields a solid mass or sulfation cake and then perform the baking of the sulfation cake from several minutes up to several hours at the pre-set temperature.

The term "sulfuric acid roasting" is a particular case of sulfuric acid digestion used to indicate the mixing of a solid and sulfuric acid with a concentration ranging from 5 wt. % up to 100 wt. % and then roasting the mixture in air at a high temperature that could be above the boiling point of the sulfuric acid with the thermal decomposition of some metal sulfates.

The term "high pressure acid leaching" (HPAL) is used to indicate the sulfuric acid leaching performed under pressure above atmospheric pressure that allows operating inside an autoclave.

The term "Hot Atmospheric acid leaching" (HAL) is used to indicate the sulfuric acid leaching performed under atmospheric pressure below the boiling point of the acid.

The term "substantially" as used herein with reference to the process steps disclosed herein means that the process steps proceed to an extent that conversion or recovery of the material is maximized. For example, with reference to recovery of a given metallic value, recovery means that at least 90% of the value is recovered.

The present disclosure broadly relates to the combination of metallurgical and chemical processes for recovering vanadium, iron, titanium and silica values from vanadiferous feedstocks such vanadiferous titanomagnetite, iron ores, vanadium slags, industrial wastes and metallurgical by-products containing vanadium with the concurrent separation of iron as ferrous sulfate heptahydrate and removal of titanium, calcium and silica as insoluble solid residues.

In a further embodiment of the present disclosure, the vanadiferous feedstocks refer to materials containing vanadium in various oxidation states: V(V), V(IV), V(III), V(II) and vanadium metal such as vanadiferous titanomagnetite, iron ores: hematite, magnetite, wustite, siderite, ankerite, taconite, vanadium slags, calcine, industrial wastes and by-products containing vanadium such as metallurgical slags from iron making and steel making.

In an embodiment the present disclosure relates to a process comprising sulfuric acid digestion, sulfation acid baking or sulfuric acid roasting of vanadiferous feedstocks. In an embodiment, the mass percentage of sulfuric acid used during this step ranges from 5 wt. % $H_2SO_4$ to 100 wt. % $H_2SO_4$. In a further embodiment, the mass percentage of sulfuric acid ranges from 15 wt. % $H_2SO_4$ to 99 wt. % $H_2SO_4$. In yet a further embodiment, the mass percentage of sulfuric acid ranges from 30 wt. % $H_2SO_4$ to 98 wt. % $H_2SO_4$.

In an embodiment of the present disclosure, pyrosulfuric acid ($H_2S_2O_7$) or "oleum" consisting of 100 wt. % concentrated sulfuric acid with an excess of dissolved sulfur trioxide ($SO_3$) up to 65 wt. % $SO_3$ which is dissolved, can be added to improve the reaction rate and the process efficiency.

In an embodiment of the present disclosure, if the initial wettability or rheology during the mixing conditions needs to be adjusted, the addition of the ammonium or alkali-metal sulfates with the general chemical formula $M_2SO_4$ (with $M=NH_4^+$, $Li^+$, $Na^+$, $K^+$) such as lithium sulfate ($Li_2SO_4$), potassium sulfate ($K_2SO_4$) or sodium sulfate ($Na_2SO_4$) can be added to the mixture in order to improve the mixing properties of the charge or by lowering the operating temperature of the sulfation reactions, and also by modifying the consistency and porosity of the sulfation cake.

In a further embodiment of the present disclosure, the vanadiferous feedstock can be dried prior to performing the sulfuric acid digestion in order to drive-off substantially all residual moisture and hydration water and eventually cooled down before further processing.

In a further embodiment of the present disclosure, the vanadiferous feedstock can be processed wet with a moisture content ranging from 0.5 wt. % up to 60 wt. % prior to performing the sulfuric acid digestion in order to produce a malleable paste or fluid suspension and benefit from the exothermic hydration reaction occurring when mixing with concentrated sulfuric acid.

In a further embodiment of the present disclosure, the vanadiferous feedstock can be pre-reduced by means of a thermal process using a suitable reductant such as anthracite, sub-bituminous coal, bunker oil, natural gas, methane, carbon monoxide, hydrogen gas, water gas, or smelter gas or a mixture thereof, prior to performing the sulfuric acid digestion in order to improve the dissolution of beneficial elements such as iron (Fe), and vanadium (V) while substantially preventing deleterious impurities to be dissolved including but not restricted to titanium (Ti), chromium (Cr), silicon (Si), manganese (Mn).

In a further embodiment of the present disclosure, the vanadiferous feedstock can be pre-oxidized or roasted in air or oxygen-enriched air by means of a thermal process prior to performing the sulfuric acid digestion in order to promote the dissolution of beneficial elements such as iron (Fe) and vanadium (V) while substantially preventing deleterious impurities to be dissolved including but not restricted to titanium (Ti), chromium (Cr), silicon (Si), manganese (Mn).

In a further embodiment of the present disclosure, the vanadium feedstock can be pre-oxidized or roasted in air or oxygen-enriched air and then pre-reduced by means of a thermal process using a suitable reductant such as anthracite, sub-bituminous coal, bunker oil, natural gas, methane, carbon monoxide, hydrogen gas, water gas, or smelter gas or a mixture thereof, prior to performing the sulfuric acid digestion in order to promote the dissolution of beneficial elements such as iron (Fe) and vanadium (V) while preventing deleterious impurities to be dissolved including but not restricted to titanium (Ti), chromium (Cr), silicon (Si), manganese (Mn).

In an embodiment of the present disclosure, if iron in the vanadiferous feedstock is predominantly present in the oxidized form Fe(III) such as in hematite, calcine and/or if the titanium dioxide content is too low for compensating the lower level of FeO, the material can be blended with other feedstock such as magnetite, ilmenite or metallurgical slags in order to benefit from the exothermic reaction during sulfation. In a further embodiment of the present disclosure, the vanadiferous feedstock can be blended with other feedstock having a high content of ferrous oxide and/or titanium oxides such as magnetite, ilmenite or metallurgical slags in order to improve the exothermic reaction during sulfation.

In a further embodiment of the present disclosure the vanadiferous feedstocks are ground to a particle size distribution below 0.500 millimeter, in an embodiment below 0.125 millimeter, in a further embodiment equal or lower than 0.050 millimeter, but extremely fine grinding below 0.005 millimeter is not necessary in order to prevent excessive dusting during further processing.

In a further embodiment of the present disclosure, the ground and oven dried vanadiferous feedstocks is fed directly into hot sulfuric acid once the desired operating temperature is reached and stirred continuously.

In a further embodiment of the present disclosure, the ground and oven dried vanadiferous feedstocks are mixed intimately with an amount of sulfuric acid sufficient to obtain a suspension, a slurry or a paste and the temperature is raised by heating the charge until the set temperature is reached.

In a further embodiment of the present disclosure the wet vanadiferous feedstock is mixed intimately with an amount of sulfuric acid sufficient to obtain a suspension, a slurry, or a paste and the temperature is raised either by heating the charge until the set temperature is reached or simply by releasing exothermically the heat of hydration when using concentrated sulfuric acid.

In a further embodiment, the sulfuric acid digestion is performed with a mass ratio of the sulfuric acid solution (L) to the mass vanadiferous feedstocks, (S), denoted (L-to-S) not exceeding twenty to one (20:1 or 20 kg/kg). In a further embodiment the (L-to-S) mass ratio is not exceeding ten to one (10:1 or 10 kg/kg). In a further embodiment the (L-to-S) mass ratio is not exceeding five to one (5:1 or 5 kg/kg). In yet a further embodiment the (L-to-S) mass ratio is not exceeding two to one (2:1 or 2 kg/kg) in order to maintain a suitable pulp density, proper wettability and rheology while allowing the full dissolution of the products.

In yet a further embodiment, the sulfuric acid digestion is performed with a "sulfuric acid number" or simply "acid number", that is, the mass ratio of pure sulfuric acid (100 wt. % $H_2SO_4$) (A) which is contained in the solution of sulfuric acid to the mass of vanadiferous feedstocks, (S) denoted (A-to-S). Theoretically, the sulfuric acid number could be calculated from the stoichiometric consumption of sulfuric acid for the sulfation of each reactive metal oxide contained in the vanadiferous feedstock (Table 1). However, in practice, the actual acid number must take into account an excess of sulfuric acid which is always required to compensate for the loss of sulfuric acid by evaporation, by decomposition or by absorption by inert or unreacted solids. Therefore, the acid number in the present disclosure is not exceeding twenty to one (20:1 or 20 kg/kg), in a further embodiment not exceeding ten to one (10:1 or 10 kg/kg), in a further embodiment not exceeding five to one (5:1 or 5 kg/kg), in a further embodiment not exceeding three to one (3:1 or 3 kg/kg) and in a further embodiment not exceeding two to one (2:1 or 2 kg/kg) in order to maintain a suitable pulp density, proper wettability and rheology and allows the full dissolution of the products.

TABLE 1

Stoichiometric consumption of 100% sulfuric acid.

| Sulfation chemical reactions | Stoichiometric consumption of 100% sulfuric acid per unit mass of single oxide (kg/ton) |
|---|---|
| $Fe_3O_4 + 4H_2SO_4 \rightarrow Fe_2(SO_4)_3 + FeSO_4 + 4H_2O(g)$ | 1,694 |
| $Fe_2O_3 + 3H_2SO_4 \rightarrow Fe_2(SO_4)_3 + 3H_2O(g)$ | 1,843 |
| $FeO + H_2SO_4 \rightarrow FeSO_4 + H_2O(g)$ | 1,365 |
| $Al_2O_3 + 3H_2SO_4 \rightarrow Al_2(SO_4)_3 + 3H_2O(g)$ | 2.886 |
| $Cr_2O_3 + 3H_2SO_4 \rightarrow Cr_2(SO_4)_3 + 3H_2O(g)$ | 1,939 |
| $TiO_2 + H_2SO_4 \rightarrow TiOSO_4 + H_2O(g)$ | 1,228 |
| $MnO + H_2SO_4 \rightarrow MnSO_4 + H_2O(g)$ | 1,383 |
| $CaO + H_2SO_4 \rightarrow CaSO_4 + H_2O(g)$ | 1,749 |
| $V_2O_3 + 3H_2SO_4 \rightarrow V_2(SO_4)_3 + 3H_2O(g)$ | 1,963 |
| $V_2O_5 + H_2SO_4 \rightarrow (VO_2)_2SO_4 + 3H_2O(g)$ | 539 |

In yet a further embodiment of the present disclosure, the sulfuric acid digestion is performed at temperatures ranging from room temperature to about 400° C., in a further embodiment from 50° C. to 300° C. and in a further embodiment from 75° C. to 250° C. Usually, the initial reaction above a certain operating temperature (set-off temperature) proceeds exothermically, reaching a peak temperature due to the rapid release of the enthalpy of sulfation of the metal oxides accompanied with evolution of steam and fumes.

In yet a further embodiment of the present disclosure, the sulfuric acid digestion is started by injecting water or steam into the pre-heated mixture held at a temperature ranging from 50° C. to 90° C. in order to reach the set-off temperature by releasing the hydration enthalpy of the sulfuric acid and then trigger the exothermic sulfation reaction that carries on autogenously.

Once the mixture is pre-heated from 50° C. to 90° C., water or live steam is injected into the mixture and due to the sudden release of the hydration enthalpy of sulfuric acid, the mixture temperature rises to 110° C.-120° C., the so-called set-off point. This triggers the sulfation reaction that starts and proceeds exothermically reaching a peak temperature ranging from 200° C. to 230° C. within 10-15 minutes depending on the tenors of Fe(II), V(IV) and Ti(IV) in the feed material, the acid-to-solid mass ratio and final sulfuric acid strength due to the rapid release of the enthalpy of sulfation of the metal oxides (TABLE 2). This is accompanied by a sudden evolution of steam and fumes. Because of the significant amounts of heat that are released, if the digester vessel is properly insulated, such as is the case with industrial and brick-lined digesters, the large scale process is self-sustaining and fully autogenous and hence it does not require any external heat to be supplied until completion of the reaction. However, if the vessel is not well insulated, such as is the case with small installations or pilot plants, it is sometimes necessary when the peak temperature has been reached to maintain the operating temperature at a minimum level in order to compensate for ubiquitous heat losses and hence keep the charge at the desired temperature. After the peak temperature has been reached, the charge remains at a baking temperature ranging from 180° C. to 200° C. for several hours (the baking period). The proper baking temperature is dictated by: (1) preventing the decomposition of the metal sulfates formed and evolution of sulfur oxides fumes; (2) avoiding the losses of sulfuric acid by decomposition and intense evaporation, and (3) limiting the number of corrosion resistant materials commercially available for containing such corrosive mixtures under harsh conditions.

TABLE 2

Summary of sulfation reactions, specific enthalpy of sulfation, and minimum and energetic decomposition temperatures of the metal sulfates formed.

| Sulfation chemical reaction schemes | Specific enthalpy of sulfation per unit mass of oxide at 180° C. (kJ/kg) | Decomposition temperature | |
|---|---|---|---|
| | | Minimum | Energetic |
| $Fe_3O_4 + 4H_2SO_4 \rightarrow Fe_2(SO_4)_3 + FeSO_4 + 4H_2O(g)$ | −1,832 | 492° C. 167° C. | 560° C. 480° C. |
| $Fe_2O_3 + 3H_2SO_4 \rightarrow Fe_2(SO_4)_3 + 3H_2O(g)$ | −418 | 492° C. | 560° C. |
| $FeO + H_2SO_4 \rightarrow FeSO_4 + H_2O(g)$ | −1,895 | 167° C. | 480° C. |
| $Al_2O_3 + 3H_2SO_4 \rightarrow Al_2(SO_4)_3 + 3H_2O(g)$ | −665 | 590° C. | 639° C. |
| $Cr_2O_3 + 3H_2SO_4 \rightarrow Cr_2(SO_4)_3 + 3H_2O(g)$ | −2,286 | n.a. | n.a. |
| $TiO_2 + H_2SO_4 \rightarrow TiOSO_4 + H_2O(g)$ | −2,078 | n.a. | n.a. |
| $MnO + H_2SO_4 \rightarrow MnSO_4 + H_2O(g)$ | −2,097 | 699° C. | 790° C. |
| $CaO + H_2SO_4 \rightarrow CaSO_4 + H_2O(g)$ | −4,839 | 1200° C. | n.a. |
| $V_2O_3 + 3H_2SO_4 \rightarrow V_2(SO_4)_3 + 3H_2O(g)$ | −2,480 | n.a. | n.a. |
| $V2O_5 + H_2SO_4 \rightarrow (VO_2)_2SO_4 + 3H_2O(g)$ | −2,656 | n.a. | n.a. |

In a further embodiment of the present disclosure, the sulfation acid baking, the sulfuric acid roasting, and the sulfuric acid digestion is performed for a period ranging from five (5) minutes up to twenty four (24) hours, in a further embodiment from ten (10) minutes up to fifteen (15) hours, in a further embodiment from fifteen (15) minutes up to ten (10) hours, and in a further embodiment from thirty (30) minutes up to six (6) hours.

In an embodiment of the present disclosure, the sulfuric acid digestion, the sulfation acid baking, or the sulfuric acid roasting, is performed in air or under inert atmosphere.

In an embodiment of the present disclosure, the sulfuric acid digestion, the sulfation acid baking, or the sulfuric acid roasting, is performed under atmospheric pressure.

In an embodiment of the present disclosure, the sulfuric acid digestion, the sulfation acid baking, or the sulfuric acid roasting, is performed under pressure inside an autoclave.

In an embodiment of the present disclosure, the sulfuric acid digestion, the sulfation acid baking, or the sulfuric acid roasting, is performed either batch wise using a brick-lined digester or another suitable corrosion resistant vessel or it is performed continuously using a rotary kiln or a rotary hearth furnace. Other suitable apparatuses are known in the art, and are within the capacity of a skilled technician. The purposes of the industrial digester vessel are several: (1) robust structural design capable of handling charges over 80 tons per batch which is usually achieved with a heavy gauge steel shell; (2) highly corrosion resistant in order to cope with the harsh conditions occurring during the sulfation and not contaminating the products (typically accomplished by using a rubber or lead lining); and (3) thermally insulated for maintaining the inner temperature of the sulfation mixture constant during the baking period, (typically achieved using an additional layer of refractory silica bricks).

In yet a further embodiment of the present disclosure, the external heating is provided by means of jacketed vessel comprising a hot circulating fluid, indirect flame heating, gas fired burners, gas heaters, or electrical heaters.

In yet a further embodiment of the present disclosure, the internal heating is provided by means of direct flame heating, inner radiant gas heaters, immersed electrical heaters or Joule heating using immersed AC or DC electrodes.

In yet a further embodiment of the present disclosure, the temperature of the charge is raised by injecting water or steam directly into the mixture in order to benefit from the exothermic release of heat corresponding to the enthalpy of hydration of the sulfuric acid.

In yet a further embodiment of the present disclosure, the agitation of the mixture during sulfuric acid digestion is typically performed mechanically with motor-driven impellers, or provided by injecting compressed air or over gases directly into the charge through nozzles or porous plugs at the bottom of the vessel or by means of a lance.

In yet a further embodiment of the present disclosure, the sulfuric acid digestion is performed inside a containment vessel or digester constructed of materials capable of withstanding both the high temperatures and elevate corrosiveness of the sulfuric acid without contaminating the products by releasing deleterious metallic impurities. Non-limiting examples of corrosion resistant construction materials include high silicon cast iron with 14 wt. % Si (Duriron®), high nickel-alloys such as Hastelloy® B2, Hastelloy® C-276, carbon steels coated with a coating of enamel, or glass, or with an inert, protective and impervious polymer lining made of a highly corrosion resistant materials such as enamel, tantalum or glass, or polymers. Non-limiting protective lining materials include TFE, PVDF, PTFE, PFA or a combination thereof. Another solution extensively used industrially consists in the use of digesters made of a carbon steel shell lined internally with a first impervious layer made of plastics, elastomers or lead metal acting as a protective membrane and protected from the heat and abrasion of the sulfation reaction with a second lining of refractory brick such as but not restricted to high silica bricks that are assembled with an acid resistant mortar made of silica and potassium silicate.

In a further embodiment of the present disclosure, once the sulfuric acid digestion is completed, that is, after a given reaction time has elapsed (ranging between several minutes to several hours depending on the acid number and the operating temperature) all the iron, and vanadium values initially contained in the ore or concentrate have been entirely reacted, forming the related metal sulfates while some titanium, and most of the calcium and silica remain in the insoluble residues, the heating is stopped and the cake formed is allowed to cool down to room temperature for several hours.

In a further embodiment of the present disclosure, the reacted mass or sulfation cake once cooled and still inside the digester is dissolved in water or weak sulfuric acid.

In a further embodiment of the present disclosure, the reacted mass or cake is discharged "quenched" while hot directly "as is" but with extreme caution in water or acidified water.

In a further embodiment of the present disclosure, the mode of operation for the dissolution of the cake, in order to minimize the consumption of water, is performed in a multistage concurrent (parallel) mode during which the fresh solution and solid cake are mixed in the first stage, the underflow (solid residues) from the first stage is sent to the second stage where it is contacted with more fresh solution and the operation is repeated until the underflow is exhausted.

In a further embodiment of the present disclosure, the mode of operation for the dissolution of the sulfation cake, in order to minimize the consumption of water, is performed in a multistage countercurrent mode during which the underflow (solids) and overflow (solution) circulate counter currently from each over yielding a final concentrated overflow (pregnant leach solution) and an exhausted underflow (insoluble solid residue).

In a further embodiment of the present disclosure, the mode of operation for the dissolution of the sulfation cake, in order to minimize the consumption of water, is performed in a batch countercurrent with multiple contacts mode with the number of digester batch units arranged in a circle or in a row called a battery during which the solid charge inside the digester remains stationary while it undergoes multiple contacts with the solution that flows from digester to digester with the exhausted solids being in contact with the incoming fresh solution while the pregnant leach solution leaves after contacting the fresh cake.

In a further embodiment of the present disclosure, the dissolution of sulfation cake is performed with water, acidified water or weak sulfuric acid, having a temperature ranging from room temperature to 100° C., in another embodiment from 30° C. to 90° C., and yet in another embodiment from 40° C. to 80° C.

In a further embodiment of the present disclosure, the dissolution of the sulfation cake is performed with slightly acidified water, or even weak sulfuric acid recycled from the downstream process containing between 1 g/L and 300 g/L of $H_2SO_4$, in another embodiment containing between 5 g/L and 200 g/L of $H_2SO_4$ and in another embodiment containing between 10 g/L and 150 g/L of $H_2SO_4$.

In a further embodiment of the present disclosure, the final pH of the resulting acidic pregnant solution is kept below 2.0 at all times, preferably below 1.5 at all times and more preferably below 1.0 at all times in order to slow down the air oxidation of Fe(II) and V(IV) and to prevent the hydrolysis of vanadium, iron and titanium cations.

In a further embodiment of the present disclosure, the temperature of the acidic pregnant solution is kept at a temperature ranging from room temperature to the boiling point, in another embodiment from 30° C. to 90° C., and in another embodiment from 40° C. to 80° C.

In a further embodiment of the present disclosure, the dissolution of the sulfation cake is performed with a dimensionless mass ratio of water or acidified water or weak acid solution (W) to the mass of sulfation cake, (B), denoted (W-to-B) not exceeding twenty to one (20:1 or 20 kg/kg), in another embodiment not exceeding ten to one (10:1 or 10 kg/kg), in another embodiment not exceeding five to one (5:1 or 5 kg/kg) and in another embodiment not exceeding two to one (2:1 or 2 kg/kg) in order to maintain a suitable rheology while allowing the full dissolution of the metal sulfates and the production of dense and concentrated solutions.

In a further embodiment of the present disclosure, the resulting dark brown to yellowish green pregnant solution still contains a suspension of non-dissolved solids and particulates and is thus subjected to a common clarification step using well known solid-liquid separation techniques, such as for instance but not restricted to coagulation, flocculation followed by gravity settling by means of settlers, thickeners and clarifiers, cross-flow or tangential filtration using rotary drum filter, or centrifugation, in order to remove the insoluble solid residues. The grayish solid residues removed consist essentially of coarser grains of unreacted feed, insoluble compounds of titanium, and in a lesser extent of compounds of calcium, and silicon that are not soluble under the acidic conditions prevailing in the solution. These compounds consist mainly of unreacted coarser titanomagnetite, ilmenite ($FeTiO_3$), newly formed rutile and anatase ($TiO_2$), calcium hemi-hydrate ($CaSO_4.0.5H_2O$), gypsum ($CaSO_4.2H_2O$), quartz, amorphous silica and unreacted silicates, and possibly jarosite-type mineral phases [$MFe_3(SO_4)_2(OH)_6$ with M=$H^+$, $Na^+$, $K^+$] if some sodium or potassium salts are either present in the feed material or are used as additives upstream in the process.

In yet a further embodiment of the present disclosure, the filter cake of insoluble solid residues obtained is used as a by-product for the recovery of its titanium dioxide and silica values by technologies known in the prior art.

In a further embodiment of the present disclosure, the clear pregnant solution obtained after clarification contains both ferric and ferrous iron with vanadium, titanium, and in a lesser extent some manganese and traces of chromium as metal sulfates. In order to fully reduce all the ferric iron [Fe(III)] into ferrous iron [Fe(II)], and the titanium (IV) and vanadium (IV) into Ti(III) and V(III) respectively, the acidic pregnant solution is reacted with metallic iron (e.g., scrap iron, powder, flakes, turnings, etc.) or by injecting sulfur dioxide gas or in certain cases where aluminum, magnesium or zinc species are not deleterious for the further processing of the pregnant solution, it is also possible to perform a chemical reduction utilizing either aluminum metal, magnesium metal, or zinc metal or their respective alloys in the form of scrap, turnings, granules, flakes, or powder to achieve the same results. The targeted oxidation redox potential (ORP) indicating the completion of the reduction usually ranges from −50 mV/AgCl to −500 mV/AgCl. Moreover, it is beneficial to ensure that at the end of the chemical reduction the presence of a minimum concentration of Ti(III) usually ranging from 0.5 g/L to 3 g/L $Ti^{3+}$ and a pH below 1.5 prevails. These conditions keep the solution fully reduced with respect to Fe(II) by preventing air oxidation of the ferrous cations. Under such conditions, the chemical stability of the reduced solution lasts over long periods ranging from several weeks to even months. The specific consumptions of most common industrial agents for reducing Fe(III) into Fe(II) are reported in TABLE 3.

TABLE 3

Specific consumption of reducing agents.

| Reducing agent | Chemical reaction | Specific consumption (kg/ton $Fe^{3+}$) |
|---|---|---|
| Zinc | $Zn(s) + 2Fe^{3+} = Zn^{2+} + 2Fe^{2+}$ | 1170 |
| Sulfur dioxide | $SO_2(g) + 2H_2O + 2Fe^{3+} = SO_4^{2-} + 4H^+ + 2Fe^{2+}$ | 573 |
| Iron | $Fe(s) + 2Fe^{3+} = 3Fe^{2+}$ | 500 |
| Magnesium | $Mg(s) + 2Fe^{3+} = Mg^{2+} + 2Fe^{2+}$ | 217 |
| Aluminum | $Al(s) + 3Fe^{3+} = Al^{3+} + 3Fe^{2+}$ | 161 |

In yet a further embodiment of the present disclosure, the clear pregnant solution obtained after clarification, is reduced electrochemically by performing electrolysis. The electrochemical reduction offers several technical advantages over chemical reduction as follows: (i) it can be performed continuously, (ii) it does not consume significant amounts of scrap iron used largely in excess to the stoichiometric amount required, (iii) it can be operated in galvanostatic mode (i.e., constant current) which allows to control precisely the completion of the reduction of all the iron into ferrous iron together with traces of Ti(III).

In yet a further embodiment of the present disclosure, the electrochemical reduction is performed in order to reduce all the iron (III) into iron (II) and also titanium (IV) and vanadium (IV) into Ti(III) and V(III) respectively, at an acidic pH below 2, in another embodiment below pH 1.5. The acidic conditions prevent the precipitation of hydroxides and/or electrodeposition of reducible metals at the cathode and also promote, to some extent, the discharge of protons with evolution of nascent hydrogen gas acting as a reducing agent and also providing a reducing protective blanket. As for the chemical reduction, the targeted oxidation redox potential (ORP) indicating the completion of the reduction usually ranges from −50 mV/AgCl to −500 mV/AgCl. Moreover, it is beneficial to ensure that at the end of the electrochemical reduction the presence of a minimum concentration of Ti(III), usually ranging from 0.5 g/L to 3 g/L $Ti^{3+}$, and an acidic pH below 1.5 prevails. These conditions keep the solution fully reduced with respect to Fe(II) by preventing air oxidation of the ferrous cations. Under such circumstances, the chemical stability of the reduced solution lasts over long periods ranging from several weeks to even months. The theoretical electric charge required to prepare a fully reduced pregnant solution depends on the concentrations of Fe(III), Ti(IV), and V(IV) and their specific electrochemical equivalents that are reported in TABLE 4. From TABLE 4, showing the standard electrode potentials, the electrolysis will reduce Fe(III) prior to reducing Ti(IV) and finally V(IV).

TABLE 4

Specific electrochemical equivalents.

| Cation | Half redox reaction | Standard electrode potential ($E°_{298K}$/v vs. SHE) | Specific electrochemical equivalent (Ah/kg) |
|---|---|---|---|
| Fe(III) | $Fe^{3+} = Fe^{2+} + e^-$ | +0.770 | 480 |
| Ti(IV) | $TiO^{2+} + 2H^+ + e^- = Ti^{3+} + H_2O$ | +0.100 | 562 |
| V(IV) | $VO^{2+} + 2H^+ + e^- = V^{3+} + H_2O$ | +0.337 | 526 |

In yet a further embodiment of the present disclosure, the electrochemical reduction is performed by means of an undivided electrolyzer with a consumable or sacrificial anode made of iron, steel, aluminum, or zinc or their alloys and a metallic cathode made of iron and its alloys, nickel and its alloys, austenitic stainless steels, copper and its alloys, zinc and its alloys, titanium and its alloys, zirconium and its alloys, lead and its alloys.

In yet a further embodiment of the present disclosure, the electrochemical reduction is performed using a divided electrolyzer. The pregnant solution is the catholyte and it circulates inside the cathode compartment. An aqueous solution of sulfuric acid or a solution of sulfuric acid containing also a depolarizing substance (e.g., $Fe^{2+}$) circulates inside the anode compartment. The separator is either a diaphragm or an ion exchange membrane (i.e., anion or cation exchange membrane). The electrolyzer comprises either a sacrificial anode (e.g., iron, steel, aluminum, zinc) or mixed metal oxides (MMO) anode or a hydrogen depolarized anode (HDA) and a metallic cathode made of: iron and its alloys, nickel and its alloys, austenitic stainless steels, copper and its alloys, zinc and its alloys, titanium and its alloys, zirconium and its alloys, lead and its alloys.

In a further embodiment of the present disclosure, when performing the electrochemical reduction, the temperature of the pregnant solution is maintained between room temperature and 65° C. in order to prevent the premature hydrolysis of the Ti(IV) species, if present. If large currents are, used resulting in Joule's heating of the solution over time, cooling of the pregnant solution is performed by using immersed cooling coils, or circulating the solution through heat exchangers in order to maintain the temperature within this range.

In a further embodiment of the present disclosure, the reduced pregnant solution is further concentrated by evaporation under reduced pressure or vacuum in order to increase the concentration of the ferrous sulfate above its saturation concentration, when measured at room temperature.

In a further embodiment of the present disclosure, the reduced and concentrated pregnant solution is cooled inside a crystallizer at a temperature below 10° C., in another embodiment below 5° C., and yet in another embodiment below 0° C. to favor the crystallization of ferrous sulfate heptahydrate (copperas). The suspension of crystals or slush produced is centrifuged leading to the separation of copperas crystals producing an iron-depleted solution. The copperas crystals are rinsed with sulfuric acid which is returned back to the dissolution process.

In yet a further embodiment of the present disclosure, the removal of dissolved titanium from the reduced pregnant liquor obtained following the removal of copperas is performed by selective precipitation. The titanium (HI) is selectively precipitated from a reduced solution having an ORP ranging from −400 mV/AgCl to −170 mV/AgCl, by first heating the reduced solution to a temperature ranging from 40° C. to 100° C., then adjusting incrementally the pH up to 2.00 by neutralization using either ammonia, alkali-metal hydroxides (MOH, M=Li, Na, K) or alkali-metal carbonates ($M_2CO_3$, M=Li, Na, K) and eventually adding sulfates of ammonia, sodium, and potassium in order to produce a precipitate containing titanium (III) such as jarosite-type phase [$MTi_3(SO_4)_4(OH)_6$ with M=$H^+$, $NH_4^+$, $Na^+$, $K^+$]. Seeds of jarosite can also be introduced to trigger the precipitation. The titanium (III) precipitate settles rapidly and it is easy to filter allowing the clarification of the solution and the final pH decreases again after completion of the precipitation.

In another embodiment, the titanium bearing jarosite precipitate is filtered, thoroughly and washed with acidified water. The tan precipitate is then oven-dried, air oxidized and dissolved in sulfuric acid resulting in a titanium dioxide product and the regeneration of the ammonium or alkali metal sulfate to be reused. The resulting bluish or green solution depleted in iron and titanium still contains all the initial vanadium values.

In another embodiment, the titanium (III) is precipitated as a compound of addition with sulfuric acid such as [$Ti_2(SO_4)_3]_x[H_2SO_4]_y$, wherein x and y are independently selected numerical values ranging from 1 to 10.

In another embodiment of the present disclosure, the remaining amount of titanium is removed by selective oxidation of the residual amount of Ti(III) into Ti(IV) either chemically using various oxidizing species such as ammonium or alkali-metal peroxodisulfates ($M_2S_2O_8$ with M=$NH_4^+$, $Li^+$, $Na^+$, $K^+$), permonosulfuric acid (Caro's acid, $H_2SO_5$), peroxodisulfuric acid (Marshall's acid, $H_2S_2O_8$), hydrogen peroxide ($H_2O_2$), nitric acid ($HNO_3$), alkali-metal chlorates ($MClO_3$ with M=$NH_4^+$, $Li^+$, $Na^+$, $K^+$), chlorine gas, nascent oxygen gas and ceric sulfate or electrochemically inside the anode compartment of a divided electrolyzer and then boiling the solution to trigger the hydrolysis of Ti(IV) thus precipitating hydrated titania which is removed by solid-liquid separation. Eventually, the filtered solution can be chilled to remove the produced salts. The vanadium-bearing solution produced is then ready for the further concentration and recovery of vanadium.

In yet a further embodiment of the present disclosure, the acidic and reduced vanadium-bearing solution, which contains vanadium as V(IV), iron as Fe(II) with small traces of Fe(III) can be further concentrated in vanadium (IV) by performing a series of evaporation, chilling and crystallization steps. This allows for the removal of impurities such as iron, magnesium and aluminum. The solution is then reduced electrochemically or chemically prior to chilling to ensure that all of the iron occurs only as Fe(II). The acidic and reduced vanadium-bearing solution is first evaporated producing steam while its volume is reduced in order to reach the maximum solubility of ferrous sulfate according to the binary phase diagram of the system $H_2O$—$FeSO_4$ (FIG. 13). The warm and concentrated solution is then chilled slightly above 0° C. during several hours to crystallize ferrous sulfate heptahydrate crystals settling at the bottom of the tank while the flaky ice crystals formed float or remain suspended into a deep blue solution containing vanadyl sulfate ($VOSO_4$). The deep blue solution is then carefully separated from the three phase mixture after scooping/dripping the ice crystals from the slush and then removing the copperas crystals by decanting and filtration. The ice flakes are further carefully dripped to recover the entrapped vanadyl solution until they become colorless. The advantage of this approach, in addition to removing ferrous cations, is to efficiently remove water concurrently in three different ways: (1) as steam during evaporation, (2) as hydration molecules during the crystallization of copperas, and (3) as ice. Moreover, the increasing concentration of free sulfuric acid that builds-up during evaporation significantly reduces the solubility of ferrous sulfate and this improves the crystallization of copperas by salting-out. This allows to reach a residual concentration of Fe(II) much lower than the one predicted by the $H_2O$—$FeSO_4$ binary diagram. This sequence of evaporation/chilling/crystallization can be repeated several times until reaching a targeted concentration of $VOSO_4$ in the deep blue solution usually below 30 wt. % $VOSO_4$. The minimum freezing temperature is dictated by the eutectic point (−16.3° C.) and the composition of the related cryohydrate of 32.9 wt. % $VOSO_4$ as indicated by the binary phase diagram for the system $H_2O$—$VOSO_4$ (FIG. 14). For aqueous solutions with a concentration of vanadyl sulfate lower than the composition of the cryohydrate and at temperature above the eutectic temperature, upon performing the chilling of the solution, only water and copperas crystallize as indicated by their freezing curves. As long as the temperature of the mixture is maintained above the eutectic point, the solution concentrates in $VOSO_4$ while water is being separated as flakes of ice. For temperatures below the eutectic point, only a bulky solidified mass crystallizes, consisting of a mixture of copperas, ice and crystals of vanadyl sulfate hexahydrate ($VOSO_4.6H_2O$).

In yet a further embodiment of the present disclosure, once the Fe(II) has been removed and the concentration of vanadyl sulfate in the solution is higher than 32.89 wt. % $VOSO_4$, upon chilling the solution below the temperature indicated by the freezing curve of the $H_2O$—$VOSO_4$ phase diagram (FIG. 14) but above the eutectic temperature, the crystallization yields pure crystals of vanadyl sulfate pentahydrate ($VOSO_4.5H_2O$) that are in equilibrium with a leaner solution whose composition can be calculated from the diagram using the lever-arm rule. Moreover, the increasing concentration of sulfuric acid that builds-up during the process also improves the crystallization yield by decreasing the solubility of $VOSO_4$. The crystals of vanadyl sulfate pentahydrate ($VOSO_4.5H_2O$) can be removed by solid-liquid separation techniques, washed with cold sulfuric acid and then used as precursors for the preparation of a vanadium electrolyte.

In yet a further embodiment of the present disclosure, the selective chemical precipitation of vanadium (IV) from the previous concentrated vanadium-rich solution is conducted by various precipitating agents such as but not restricted to ammonia, sodium bicarbonate, sodium carbonate, sodium hydroxide, and potassium hydroxide in order to produce a precipitate of hydrated vanadium (IV) oxide to be oxidized into hydrated vanadium pentoxide and then dissolved into fresh sulfuric acid for the preparation of vanadium electrolyte (VE).

In yet a further embodiment of the present disclosure, the selective chemical precipitation of vanadium (V) from the concentrated vanadium-rich solution is conducted by first oxidizing the vanadium (IV) into vanadium (V) by oxidizing agents such as but not restricted to ammonium or alkali-metal peroxodisulfates ($M_2S_2O_8$ with M=$NH_4^+$, $Li^+$, $Na^+$, $K^+$) in the presence of silver (II) cations, permonosulfuric acid (Caro's acid, $H_2SO_5$), peroxodisulfuric acid (Marshall's acid, $H_2S_2O_8$), hydrogen peroxide ($H_2O_2$), nitric acid ($HNO_3$), alkali-metal chlorates ($MClO_3$ with M=$NH_4^+$, $Li^+$, $Na^+$, $K^+$), chlorine gas, nascent oxygen gas, or ceric sulfate and then precipitated as hydrated vanadium (V) pentoxide and/or ammonium and alkali-metal hexavanadates ($M_2V_6O_{16}.H_2O$ M=$NH_4^+$, $Li^+$, $Na^+$, $K^+$) by using various precipitating agents such as but not restricted to ammonia, sodium bicarbonate, sodium carbonate, sodium hydroxide, potassium carbonate, potassium hydroxide in order to produce a precipitate to be dissolved into fresh sulfuric acid and then reduced chemically or electrochemically for the preparation of vanadium electrolyte (VE).

In a further embodiment of the present disclosure, the selective recovery of vanadium is done electrochemically by anodic oxidation.

In a further embodiment of the present disclosure, the selective electrochemical recovery of vanadium by anodic oxidation is performed inside an undivided electrolyzer.

In yet a further embodiment of the present disclosure, the anodic oxidation is performed inside a divided electrolyzer comprising a diaphragm or an ion exchange membrane with the vanadium-rich solution circulating inside the anodic compartment.

In a further embodiment of the present disclosure, the selective recovery of vanadium is obtained electrochemically by cathodic deposition at a pH favoring the electrodeposition or electro-precipitation of hydrated vanadium oxides at the cathode surface while preventing the co-deposition of reducible metals.

In yet a further embodiment of the present disclosure, the precipitated or electrodeposited vanadium pentoxide is dissolved in sulfuric acid to produce a vanadium electrolyte (VE).

In a further embodiment of the present disclosure, the concentration of vanadium in the vanadium-rich pregnant solution is further increased by directing the solution to the cake dissolution step and contacting the pregnant solution with the fresh sulfation cake in order to build up the vanadium, this loop can be performed several times until the desired concentration of vanadium is reached.

In a further embodiment of the present disclosure, the vanadium-rich solution is further purified in order to produce a vanadium electrolyte by technologies available commercially. For instance, technologies known in the prior art are ion exchange, solvent extraction and electrolysis.

EXPERIMENTAL

A number of non-limiting examples are provided hereinbelow, illustrating the preparation of a vanadium-rich solution or vanadium pentoxide in accordance with various embodiments of the process of the present disclosure.

Example 1: High Pressure Acid Leaching (HPAL) Experiments: Ten high pressure acid leaching (HPAL) tests were performed. The autoclaves were totally enclosed, avoiding losses of material by entrainment by gas evolution, splashing, and evaporation. The autoclaves allowed to operate above the boiling points of the aqueous solutions of sulfuric acid. The high pressure conditions in the autoclaves increased the rate of penetration of sulfuric acid inside the solid particles (i.e. within cracks). All the tests were conducted using specialized laboratory autoclaves, also called digestion reactors, such as Models #4748 and #4748A manufactured by Parr Instruments Company (Moline, Ill.). The autoclaves were constructed of a thick corrosion resistant shell made of austenitic stainless steel grade 304 with an inner PTFE cup closed by a tight lid, and equipped for safety with corrosion and rupture disks and tightened by Belleville springs. The practical volumes inside the cups were 125-mL and 200-mL respectively and a maximum space occupation of 40% was used to prevent overpressure. Usually argon was used in the headspace unless oxidizing conditions were investigated. Once assembled and filed with the solids and solution, the autoclaves were heated inside an oven with accurate temperature control. Once the tests were completed, the pregnant leach liquor was clarified by gravity settling and/or filtration while the filter cake containing the insoluble solids was washed with acidified water and oven dried.

The HPAL experiments were performed using a material sampled from a vanadiferous titanomagnetite (VTM) concentrate originating from the Lac Doré deposit and was denoted MRI-99. The average chemical composition of the material is reported as chemical element oxides (TABLE 5). The average particle size of the ground VTM concentrate was 44 µm (−325 mesh).

The HPAL experiments were performed at a constant temperature of 150° C. The maximum attainable recoveries of iron and vanadium were determined. The actual sulfuric acid consumption was measured and the effect of the concentration of sulfuric acid on the recovery of the iron and vanadium values was investigated. Moreover, the effect of the redox conditions along with the thermal pretreatment of the VTM feed material was investigated. Finally, the impact of the mass ratio of water-to-wet residue was investigated. The selected operating conditions are reported in TABLE 6.

TABLE 5

Chemical analysis of LAC DORE vanadiferous titanomagnetite concentrates.

| VTM | $Fe_2O_3$ (*) | $Fe_2O_3$ (**) | FeO (*) | $V_2O_5$ | $Cr_2O_5$ | $Al_2O_3$ | Mno | CaO | MgO | $Na_2O$ | $K_2O$ | $SiO_2$ | $TiO_2$ | ZnO | NiO | CoO | LOI |
|---|---|---|---|---|---|---|---|---|---|---|---|---|---|---|---|---|---|
| MRI-99 | 80.61 | 50.71 | 26.90 | 1.21 | 0.10 | 3.47 | 0.28 | 0.62 | 0.95 | 0.08 | 0.04 | 3.73 | 11.02 | 0.061 | 0.014 | 0.015 | −2.41 |
| IOS-SALA-991 | 87.70 | 55.18 | 29.60 | 1.27 | 0.16 | 1.50 | 0.19 | 0.27 | 0.47 | 0.01 | 0.00 | 1.70 | 8.80 | 0.048 | 0.032 | 0.016 | −3.00 |

Notes:
(*) Total Iron Reported as Iron Sesquioxide;
() and (*) Calculated Ferrous and Ferric Iron

TABLE 6

Operating conditions during high pressure acid leaching (HPAL) of vanadiferous titanomagnetite (VTM).

| Test No. | Material | Temperature and pressure | | Duration (h) | Atmosphere | Mixing | $H_2SO_4$ (wt. %) | Redox conditions | Pulp density (wt. %) | A-to-S (kg/kg) | L-to-S (kg/kg) | W-to-WR (kg/kg) |
|---|---|---|---|---|---|---|---|---|---|---|---|---|
| HPAL-01 | VTM-MRI-99 | 150° C. | 428 kPa | 4.0 | Argon | NO | 15.00 | neutral | 1.9 | 7.6 | 50.9 | 16.4 |

TABLE 6-continued

Operating conditions during high pressure acid leaching (HPAL) of vanadiferous titanomagnetite (VTM).

| Test No. | Material | Temperature and pressure | | Duration (h) | Atmosphere | Mixing | H$_2$SO$_4$ (wt. %) | Redox conditions | Pulp density (wt. %) | A-to-S (kg/kg) | L-to-S (kg/kg) | W-to-WR (kg/kg) |
|---|---|---|---|---|---|---|---|---|---|---|---|---|
| HPAL-02 | VTM-MRI-99 | 150° C. | 413 kPa | 4.0 | Argon | NO | 20.30 | neutral | 1.9 | 10.3 | 50.7 | 11.9 |
| HPAL-03 | VTM-MRI-99 | 150° C. | 392 kPa | 4.0 | Argon | NO | 25.04 | neutral | 2.1 | 12.0 | 47.7 | 17.9 |
| HPAL-04 | VTM-MRI-99 | 150° C. | 370 kPa | 4.0 | Argon | NO | 29.83 | neutral | 2.1 | 14.2 | 47.7 | 17.7 |
| HPAL-05 | VTM-MRI-99 | 150° C. | 370 kPa | 4.0 | Argon | NO | 30.40 | neutral | 13.8 | 1.90 | 6.2 | 4.5 |
| HPAL-06 | VTM-MRI-99 | 150° C. | 415 kPa | 4.0 | Argon | NO | 19.53 | neutral | 15.6 | 1.06 | 5.4 | 7.2 |
| HPAL-07 | VTM-MRI-99 | 150° C. | 370 kPa | 4.0 | Argon | NO | 30.54 | neutral | 9.1 | 3.05 | 10.0 | 6.7 |
| HPAL-08 | VTM-MRI-99 (roasted) | 150° C. | 370 kPa | 4.0 | Air | NO | 30.54 | aerated | 13.8 | 1.91 | 6.3 | 4.5 |
| HPAL-09 | VTM-MRI-99 (reduced) | 150° C. | 370 kPa | 4.0 | Argon | NO | 30.54 | reducing | 11.7 | 2.30 | 7.5 | 7.3 |
| HPAL-10 | VTM-MRI-99 (reduced) | 150° C. | 413 kPa | 4.0 | Argon | NO | 20.58 | reducing | 12.1 | 1.50 | 7.3 | 3.3 |

From the HPAL tests results illustrated in TABLE 7, the best recoveries for iron (87%) and vanadium (100%) were obtained during test run HPAL-04 with an aqueous solution of sulfuric acid having a mass percentage of 30 wt. % H$_2$SO$_4$ but at the expense of a large L-to-S mass ratio of 48 kg/kg which is equivalent to an acid number (A-to-S) of 14.2 kg/kg. The benefits of performing a pre-reduction for the recovery of iron and a pre-oxidation for the selective recovery of vanadium can be delineated from tests runs HPAL-08 and HPAL-09.

TABLE 7

Recoveries & yields obtained from high pressure acid leaching (HPAL) tests.

| Test No. | Fe(t) | Fe(II) | Fe(III) | V | Unused H$_2$SO$_4$ | H$_2$SO$_4$ consumed | Insoluble (wt.%) |
|---|---|---|---|---|---|---|---|
| HPAL-01 | 49% | 100% | 18% | 44% | | | 35% |
| HPAL-02 | 72% | 100% | 37% | 100% | 82% | 1.83 kg/kg | 28% |
| HPAL-03 | 86% | 100% | 101% | 100% | 88% | 1.38 kg/kg | 17% |
| HPAL-04 | 87% | 100% | 66% | 100% | 89% | 1.60 kg/kg | 12% |
| HPAL-05 | 53% | 40% | 21% | 43% | 62% | 0.72 kg/kg | 63% |
| HPAL-06 | 30% | 34% | 14% | 33% | 78% | 0.23 kg/kg | 76% |
| HPAL-07 | 36% | 19% | 13% | 57% | 82% | 0.55 kg/kg | 69% |
| HPAL-08 | 15% | 0% | 19% | 75% | 87% | 0.25 kg/kg | 85% |
| HPAL-09 | 58% | 54% | NR | 100% | 66% | 0.78 kg/kg | 58% |
| HPAL-10 | 38% | 56% | 11% | 60% | 70% | 0.44 kg/kg | 69% |

Example 2: Hot "Atmospheric" Acid Leaching (HAL) Experiments: Four hot atmospheric acid leaching (HAL) tests were performed inside a 250-mL round flask made of borosilicate glass (Pyrex®) and equipped with ground joints and a 15-inch Allihn condenser in order to operate under total reflux by means of the circulation of cold tap water. The flask was immersed inside a water bath consisting of a 600-mL beaker with thick walls filled with deionized water and covered with a ½-inch OD PP-ball to prevent losses by evaporation. The water temperature was maintained at the desired set point by means of a hot plate (CORNING®) equipped with a magnetic stirrer. The temperature was measured using a type J thermocouple probe and a reader (OMEGA®). The agitation inside the water bath was ensured by a large PTFE-coated magnetic bar at the bottom of the beaker and the mixing of the reactants inside the round flask was provided by a smaller PTFE-coated bar.

The HAL experiments were performed using a material sampled from a vanadiferous titanomagnetite (VTM) concentrate originating from the Lac Doré deposit and was denoted MRI-99. The average chemical composition of the material is reported as chemical element oxides (TABLE 5). The average particle size of the ground VTM concentrate was 44 μm (−325 mesh). Once the tests were completed, the pregnant leach liquor was clarified by gravity settling and/or filtration while the filter cake containing the insoluble solids was washed with acidified water and oven dried.

The maximum attainable recoveries of iron and vanadium were determined. The actual sulfuric acid consumption was measured and the effect of the concentration of sulfuric acid on the recovery of the iron and vanadium values was investigated. Moreover, the impact of the temperature and the effect of the reducing conditions prevailing during the tests, either by using pre-reduced VTM or by using scrap iron as the reducing agent was investigated. Finally, the impact of the mass ratio of water-to-wet residue was investigated. The selected operating conditions are reported in TABLE 8.

From the HAL tests results illustrated in TABLE 9, the recoveries for iron are much lower than for those obtained under pressure. The best recoveries for iron (55%) and vanadium (100%) were obtained during test run HAL-18, using a pre-reduced VTM, iron powder as the reducing agent and an aqueous solution of sulfuric acid having a mass percentage of 29.4 wt. % H$_2$SO$_4$. The L-to-S mass ratio of 7.3 kg/kg which is equivalent to an acid number (A-to-S) of 12 kg/kg was lower than that for the HPAL tests.

TABLE 8

Operating conditions during hot atmospheric acid leaching (HAL) of vanadiferous titanomagnetite (VTM).

| Test No. | Material | Temperature and pressure | Duration (h) | Atmosphere | Material | $H_2SO_4$ (wt. %) | Redox conditions | Additive | Pulp density (wt. %) | A-to-S (kg/kg) | L-to-S (kg/kg) | W-to-WR (kg/kg) |
|---|---|---|---|---|---|---|---|---|---|---|---|---|
| HAL-11 | VTM-MRI-99 | 75° C. 101 kPa | 4.0 | Air | yes | 20.58 | aerated | no | 10.6 | 1.74 | 8.4 | 17.5 |
| HAL-12 | VTM-MRI-99 | 80° C. 101 kPa | 4.0 | Air | yes | 25.20 | oxidizing | $H_2O_2$ | 7.5 | 2.97 | 11.8 | 13.2 |
| HAL-13 | VTM-MRI-99 (reduced) | 85° C. 101 kPa | 4.0 | Argon | yes | 25.20 | neutral | no | 10.7 | 2.11 | 8.4 | 7.0 |
| HAL-18 | VTM-MRI-99 (reduced) | 85° C. 101 kPa | 4.0 | Argon + $H_2$ | yes | 29.39 | reducing | iron powder | 11.9 | 2.16 | 7.3 | 2.8 |

TABLE 9

Recoveries & yields obtained from hot atmospheric acid leaching (HAL) tests.

| Test No. | Fe(t) | Fe(H) | Fe(III) | V | Unused $H_2SO_4$ | $H_2SO_4$ consumed | Insoluble (wt.%) |
|---|---|---|---|---|---|---|---|
| HAL-11 | 25% | 27% | 19% | 28% | 77% | 0.40 kg/kg | 50% |
| HAL-12 | 29% | 27% | 28% | 43% | 82% | 0.53 kg/kg | 33% |
| HAL-13 | 48% | 79% | 11% | 42% | 57% | 0.90 kg/kg | 56% |
| HAL-18 | 55% | 100% | 14% | 100% | 81% | 0.40 kg/kg | 47% |

Example 3: Sulfation Acid Baking (SAB) Experiments: Eight sulfuric acid digestion tests were performed using a set of digesters composed of four 2-L kettles with lids made of acid resistant borosilicate glass (Pyrex®). Each digester has the capacity to process up to 350 grams of VTM per batch. The SAB experiments were performed using either a material sampled from a vanadiferous titanomagnetite (VTM) concentrate originating from the Lac Doré deposit denoted MRI-99 or using a larger 20-kg batch denoted IOS-SALA-991 that was beneficiated by IOS SERVICES GEOSCIENTIFIQUES (Chicoutimi, QC). The average chemical composition of these materials are reported as chemical element oxides (TABLE 5). The average particle size of the ground VTM concentrate MRI-99 was 44 μm (−325 mesh) whereas 92.25% of the material originating from batch IOS-SALA-991 passed the 140 mesh (106 μm). All the SAB tests included intimately mixing inside the digesters a weighed mass of ground VTM concentrate with a weighed mass of concentrated sulfuric acid in order to obtain a homogeneous paste or slurry with a definite acid number. The mixture was then introduced into a pre-heated oven or kiln with a pre-set temperature ranging between 165° C. and 205° C. Once the mixture reached a temperature ranging between 60-80° C. the exothermic sulfation reaction started, reaching a peak temperature as high as 225° C. in certain cases, depending on the initial mass of the VTM feed and the acid mixture, the initial pre-set temperature inside the oven or kiln, and finally the selected acid number. Once the sulfation reaction started to subside, and the temperature decreased again, the temperature was kept constant at the original preset temperature and the sulfation cake formed inside the oven or kiln was maintained therein during several hours to perform the sulfation acid baking step. Upon cooling, the sulfation cake exhibited a dried cracked mud aspect with a bluish gray color. The cake's consistency varied from hard to brittle for an A-to-VTM ratio below 1.7. For A-to-VTM ratios above 2, the sulfation cake was soft and friable. The cake was then dissolved using slightly acidified water or weak sulfuric acid at a temperature ranging from 60° C. to 90° C. by means of a batch countercurrent mode with multiple contacts with four digesters arranged in a row during which the solid charge inside the digesters remained stationary while it undergoes multiple contacts with the solution that flows from digester to digester with the exhausted solids being in contact with the incoming fresh solution while the pregnant solution leaves after contacting the fresh cake. The dense pregnant leach liquor was then clarified by gravity settling and filtration while the filter cake containing the insoluble solids was washed with acidified water and oven dried.

The maximum attainable recoveries of iron and vanadium were determined. The actual sulfuric acid consumption was measured and the effect of the concentration of sulfuric acid on the recovery of the iron and vanadium values was investigated. Moreover, the impact of the baking temperature and baking time was investigated. Finally, the impact of the mass ratio of water-to-sulfation cake was investigated. The selected operating conditions are reported in TABLE 10.

TABLE 10

Operating conditions during sulfation acid baking (SAB) of vanadiferous titanomagnetite (VTM).

| Test No. | Material | Baking temp. | Peak temp. | Set-off temp. | Duration (h) | Atmosphere | Mixing | $H_2SO_4$ (wt. %) | Pulp density (wt. %) | A-to-S (kg/kg) | L-to-S (kg/kg) | W-to-B (kg/kg) | W-to-WR (kg/kg) |
|---|---|---|---|---|---|---|---|---|---|---|---|---|---|
| SAB-14 | VTM-MRI-99 | 180° C | 225° C. | 110° C. | 2.00 | Air | yes | 96.0 | 34.5% | 1.82 | 1.9 | 2.6 | 24.0 |
| SAB-15 | VTM-MRI-99 | 180° C | 225° C. | 110° C. | 2.00 | Air | yes | 96.0 | 31.5% | 2.08 | 2.2 | 3.9 | 6.7 |
| SAB-16 | VTM-MRI-99 | 180° C | 225° C. | 110° C. | 2.00 | Air | yes | 96.0 | 37.2% | 1.62 | 1.7 | 5.3 | 5.5 |
| SAB-17 | VTM-MRI-99 | 180° C | 225° C. | 110° C. | 2.00 | Air | yes | 79.6 | 30.1% | 1.85 | 2.3 | 6.9 | 1.9 |

TABLE 10-continued

Operating conditions during sulfation acid baking (SAB) of vanadiferous titanomagnetite (VTM).

| Test No. | Material | Baking temp. | Peak temp. | Set-off temp. | Duration (h) | Atmosphere | Mixing | $H_2SO_4$ (wt. %) | Pulp density (wt. %) | A-to-S (kg/kg) | L-to-S (kg/kg) | W-to-B (kg/kg) | W-to-WR (kg/kg) |
|---|---|---|---|---|---|---|---|---|---|---|---|---|---|
| SAB-19 | VTM-MRI-99 | 180° C | 225° C. | 110° C. | 1.00 | Air | yes | 96.0 | 34.2% | 1.84 | 1.9 | 5.0 | 12.7 |
| SAB-20 | VTM-MRI-99 | 180° C | 225° C. | 110° C. | 0.75 | Air | yes | 96.0 | 34.1% | 1.86 | 1.9 | 4.5 | 7.6 |
| SAB-21 | VTM-IOS-SALA-991 | 165° C | 214° C. | 108° C. | 2.00 | Air | yes | 96.0 | 34.2% | 1.85 | 1.93 | 5.0 | 1.0 |
| SAB-22 | VTM-IOS-SALA-991 | 180° C | 226° C. | 110° C. | 2.00 | Air | yes | 96.0 | 13.3% | 1.92 | 2.00 | 5.1 | 1.0 |

From the SAB tests results illustrated in TABLE 11, the best recoveries for iron (92%) and vanadium (100%) were obtained during test runs SAB-14 and SAB-15. Moreover, because concentrated sulfuric acid with a mass percentage of 96 wt. % $H_2SO_4$ was used together with a L-to-S mass ratios below 2.5 kg/kg, the resulting acid number (A-to-S) was always below 2.08 kg/kg, compatible with an industrial scale operation. Upon performing the subsequent hot dissolution of the sulfation cake using either acidified water or weak acid, by means of a countercurrent batch multiple contact, the observed consumption of water was as low as 2.2. kg/kg. The pregnant solution produced was therefore highly concentrated and close to saturation as regarding the ferrous sulfate which provides for optimal conditions for performing the subsequent crystallization and separation of copperas.

TABLE 11

Recoveries & yields obtained from sulfation acid baking (SAB) tests.

| Test No. | Fe(t) | Fe(II) | Fe(III) | V | Unused $H_2SO_4$ | $H_2SO_4$ consumed | Insoluble residue (wt. %) |
|---|---|---|---|---|---|---|---|
| SAB-14 | 83% | 96% | 91% | 80% | 47% | 0.96 kg/kg | 20% |
| SAB-15 | 87% | 100% | 85% | 85% | 48% | 1.08 kg/kg | 14% |
| SAB-16 | 81% | 91% | 62% | 76% | 29% | 1.14 kg/kg | 18% |
| SAB-17 | 69% | 77% | 64% | 100% | 65% | 0.64 kg/kg | 37% |
| SAB-19 | 79% | 91% | 71% | 100% | 87% | 0.23 kg/kg | 28% |
| SAB-20 | 64% | 90% | 49% | 100% | 84% | 0.29 kg/kg | 32% |
| SAB-21 | 55% | 71% | 38% | 49% | 62% | 0.70 kg/kg | 43% |
| SAB-22 | 85% | 100% | 72% | 82% | | | 16% |

Example 4: Sulfuric Acid Digestion—Prototype Experiments: Eight sulfuric acid digestion experiments were performed using prototype digesters with a 4.65 L brim capacity and entirely made of Teflon® PFA. The lid of the digesters was equipped with several ports as follows: (1) a bore-through compression fitting accepting a deep tube made either of ¼-in OD PTFE or tantalum for performing both gas sparging and water injection directly into the mixture; (2) a ⅜-in OD exhaust tube connected to a 4 L-scrubber containing internal polypropylene packing and with recirculating water for condensing and collecting the released steam and scrubbing acidic fumes; (3) a bore-through compression fitting accommodating a temperature probe; and (4) a check valve with a PTFE rupture disk to prevent pressure build-up. Each digester was designed to process up to 1.5 kg of VTM per batch. The VTM materials used for the prototype experiments and their preparation were identical to those disclosed in the previous examples. Each prototype experiment included intimately mixing inside the digesters a weighed mass of ground and dried VTM concentrate with a weighed mass of concentrated sulfuric acid in order to obtain a homogeneous dark paste or thixotropic slurry with a definite acid number. The lid was quickly installed and the complete digester was then introduced into a pre-heated oven or kiln with a pre-set temperature ranging between 125° C. to 150° C. while bubbling of an inert gas through the deep tube was performed to ensure mixing and preventing blockage of the tip. Once the mixture reached a temperature ranging from 60° C. to 90° C., the gas bubbling was stopped inside the deep tube and the flow passage was switched to a water injection system using a L/S MASTERFLEX® peristaltic pump connected to a water tank. The amount of water injected, denoted $m_w$, was calculated based on the initial mass of concentrated sulfuric acid, $m_A$, and its mass fraction, $w_a$, in order to reach a final sulfuric acid concentration, $w_c$, required during sulfation using the equation:

$$m_w = (w_a - w_c)/w_c \, m_A.$$

The water injection lasted less than 15 seconds. Upon injection, the sudden release of the hydration enthalpy of the sulfuric acid steeply raised the temperature of the mixture. Once the mixture reached the set-off point, at a temperature ranging between 105° C. to 115° C., the exothermic sulfation reaction started, reaching a peak temperature ranging from 205° C. to 215° C., depending on the initial mass of the VTM feed and the acid mixture, the initial pre-set temperature inside the oven or kiln, and finally the selected acid number. Once the sulfation reaction started to subside, and the temperature decreased again, the temperature was kept constant at around 180° C.-185° C. by resuming external heating for compensating heat losses and the sulfation cake formed inside the oven or kiln was maintained therein during several hours to perform the sulfation acid baking step. The plots illustrating the temperatures of the mixtures during the sulfuric digestion are illustrated in FIG. 5. Upon cooling, the sulfation cake exhibited a dried cracked mud aspect with a bluish gray color. The cake's consistency varied from hard to brittle for an A-to-VTM ratio below 1.7. For A-to-VTM ratios above 2, the sulfation cake was soft and friable. The cake was then dissolved using slightly acidified water or weak sulfuric acid at a temperature ranging from 60° C. to 90° C. by means of a batch countercurrent mode with multiple contacts with four digesters arranged in a row during which the solid charge inside the digesters remained stationary while it undergoes multiple contacts with the solution that flows from digester to digester with the exhausted solids being in contact with the incoming fresh solution while the pregnant solution leaves after contacting the fresh cake. The pregnant leach solution was then clarified by gravity settling and filtration while the filter cake containing the insoluble solids was washed with acidified water and oven dried. The selected operating conditions are reported in TABLE 12.

TABLE 12

Operating conditions during sulfation acid digestion of vanadiferous titanomagnetite (VTM) with prototype digesters.

| Test No. | Material | Baking temp. | Peak temp. | Set-off temp. | Water injection | Duration (h) | Atmos. | Mixing | H$_2$SO$_4$ (wt.%) | Pulp density (wt.%) | A-to-S (kg/kg) | L-to-S (kg/kg) | W-to-B (kg/kg) |
|---|---|---|---|---|---|---|---|---|---|---|---|---|---|
| PRO-01 | VTM-IOS-SALA-991 | 193° C. | 193° C. | 110° C. | none | 4.00 | Air | yes | 96.0 | 33.2% | 1.93 | 2.01 | 2.5 |
| PRO-02 | VTM-IOS-SALA-991 | 204° C. | 204° C. | 110° C. | none | 4.00 | Air | yes | 96.0 | 34.5% | 1.83 | 1.90 | 2.3 |
| PRO-03 | VTM-IOS-SALA-991 | 204° C. | 204° C. | 110° C. | none | 5.00 | Air | yes | 96.0 | 37.3% | 1.61 | 1.68 | 2.2 |
| PRO-04A | VTM-IOS-SALA-991 | 185° C. | 209° C. | 107° C. | 85° C. | 5.00 | Air | yes | 93.0 | 34.1% | 1.85 | 1.99 | 1.50 |
| PRO-04B | VTM-IOS-SALA-991 | 187° C. | 208° C. | 110° C. | 80° C. | 5.00 | Air | yes | 92.9 | 34.2% | 1.85 | 1.99 | 1.50 |
| PRO-04C | VTM-IOS-SALA-991 | 180° C. | 212° C. | 110° C. | 85° C. | 5.00 | Air | yes | 92.2 | 33.4% | 1.91 | 2.08 | 1.47 |
| PRO-04D | VTM-IOS-SALA-991 | 180° C. | 210° C. | 109° C. | 80° C. | 5.00 | Air | yes | 93.0 | 34.1% | 1.86 | 2.00 | 1.47 |
| PRO-04E | VTM-IOS-SALA-991 | 185° C. | 210° C. | 109° C. | 80° C. | 5.00 | Air | yes | 93.0 | 34.1% | 1.86 | 2.00 | 1.47 |

From the prototype test results illustrated in TABLE 13, performing the sulfuric acid digestion using a larger digester confirmed the excellent yields obtained during the laboratory screening tests with metal recoveries in excess of 95% for iron and 82% for vanadium. The results also indicate that the autogenous protocol by means of water injection with a final sulfuric acid mass percentage of only 93% is as efficient as the tests performed with 96% sulfuric acid and external heating. More importantly, excellent metal recoveries were obtained using a low acid number (A-to-S) of 1.85 kg/kg and a low consumption of water with 1.50 kg of water per kg of cake, compatible with an industrial scale operation.

TABLE 13

Recoveries & yields obtained from sulfation acid digestion prototype tests.

| Test No. | Fe(t) | Fe(II) | Fe(III) | V | Insoluble residue (wt. %) |
|---|---|---|---|---|---|
| PRO-01 | 96% | 100% | 100% | 91% | 7.3% |
| PRO-02 | 95% | 100% | 81% | 82% | 7.4% |
| PRO-03 | 96% | 96% | 97% | 77% | 10.1% |
| PRO-04A to B | 99% | 100% | 89% | 87% | 8.5% |
| PRO-04C to E | 95% | 100% | 83% | 83% | 8.5% |

The composition and physical properties of the produced pregnant solution are reported in TABLE 14. Indeed, the pregnant solution was highly concentrated and close to saturation as regarding the concentration of ferrous and ferric sulfates [50.2 g/L Fe(II) and 55.8 g/L Fe(III)] which provides for optimal conditions for performing the subsequent reduction and crystallization and separation of copperas.

TABLE 14

Chemical composition & properties of the pregnant solution obtained from run PRO-04AB.

| Chemical element | Concentration (g/L) |
|---|---|
| Fe(total) | 106.00 |
| Ti | 12.10 |
| Al | 2.640 |
| V | 1.120 |
| Mg | 1.100 |
| Ca | 0.426 |
| Mn | 0.362 |
| Cr | 0.143 |

TABLE 14-continued

Chemical composition & properties of the pregnant solution obtained from run PRO-04AB.

| Chemical element | Concentration (g/L) |
|---|---|
| Co | 0.024 |
| Ni | 0.030 |
| Zn | 0.005 |

Physical properties:
Mass density: 1,417 kg/m$^3$
Conductivity: 127 mS/cm
pH 0.66
ORP: +393 mV/AgCl Example 5: 15-Gallon Sulfation Digester: In order to perform the sulfuric acid digestion at a semi-pilot scale, a custom made digester was designed and built to mimic the industrial scale digesters. An illustration of a schematic drawing illustrating a custom made 15-gallon sulfation digester used for preforming the sulfuric acid digestion of various vanadiferous feedstocks is provided by FIG. 6. The digester body consists of a large 12-inch NPS×8-inch reducing tee (03) made of a steel shell (Schedule No. 40), lined internally with a ¼-inch thick PTFE liner (04) manufactured by Crane Resistoflex (Marion, N.C., USA) with ANSI Class 150 ductile cast iron bottom flanges (01) and a top lower flange (06). The PTFE thick lining mimics to some extent the brick lining typical of industrial scale digesters. The reducing tee was installed in the upright position onto a 2000-lb heavy duty cart (21) with the 12-in bottom flange sitting onto the skid frame while a 12-in top stainless steel flange (07) with an auxiliary 6-in flange (09) were constructed in order to accommodate several ports and measuring devices as follows: (a) a ¾-inch deep pipe connected to a gas line (15) and a water injection line (17) by means of a three-way valve (16); (b) a second ⅜-inch deep inlet pipe (10) for introducing the sulfuric acid feed connected a diaphragm pump; (c) a ¾-inch exhaust pipe (13) with a ball valve (14); (d) a pressure relieve toggle valve (11) and pressure gauge (19); (e) three Type K thermocouple probes (8, 12, and 18) with a protective PFA sheath; and (f) an auxiliary 6-inch NPS flange (09) for introducing the 4-inch diameter impeller shaft. The 8-inch side flange (20) was only used as manhole for accessing the inside of the vessel for maintenance and/or cleaning. Moreover, two 4-inch wide silicone band heaters (2 and 5) were installed on the digester's outer shell in order to supply a minimum amount of heat while a 2-inch thick thermal insulation (Kaowool®) was added to minimize heat losses during autogenous operation. A photograph illustrating the custom made 15-gallon sulfation digester of FIG. 6 is shown in FIG. 7.

Example 6: 15-Gallon Sulfation Digester—Complete Installation Setup: A schematic process flow diagram (PFD) illustrating the custom made 15-gallon sulfation digester of FIGS. 6 and 7 in operation in accordance with various embodiments of the present disclosure is shown in FIG. 8. Concentrated sulfuric acid was introduced into the 15-gallon digester by means of a diaphragm pump. In order to prevent blockage of the immersed tip of the water injection line, compressed air or inert gas was introduced through a three-way valve until the requirement for water injection into the system. The predetermined amount of water, contained in a small water tank, was injected into the mixture using a peristaltic pump or using compressed air. Eventually, any excessive pressure build-up was released by means of a toggle relieve valve connected to a demister. The fumes and steam produced during the digestion were extracted through the exhaust pipe using a blower and were scrubbed by spraying an alkaline solution over a tall column packed with internals. A coiled heat exchanger was also used to lower the temperature and condense the steam. The installation was capable of processing 10 kg of vanadiferous feedstock with up to 20 kg of concentrated sulfuric acid per batch. Once the sulfuric acid digestion was completed and the temperature inside the digester decreased down to 80° C. (following several hours of digestion), the digester was filled with up to 45 kg of warm acidified water. After a 4-inch impeller was introduced and the in-situ dissolution of the sulfation cake was completed followed gravity settling of the solids (FIG. 9), the digester was emptied by pumping out the pregnant solution.

Figure 1A:
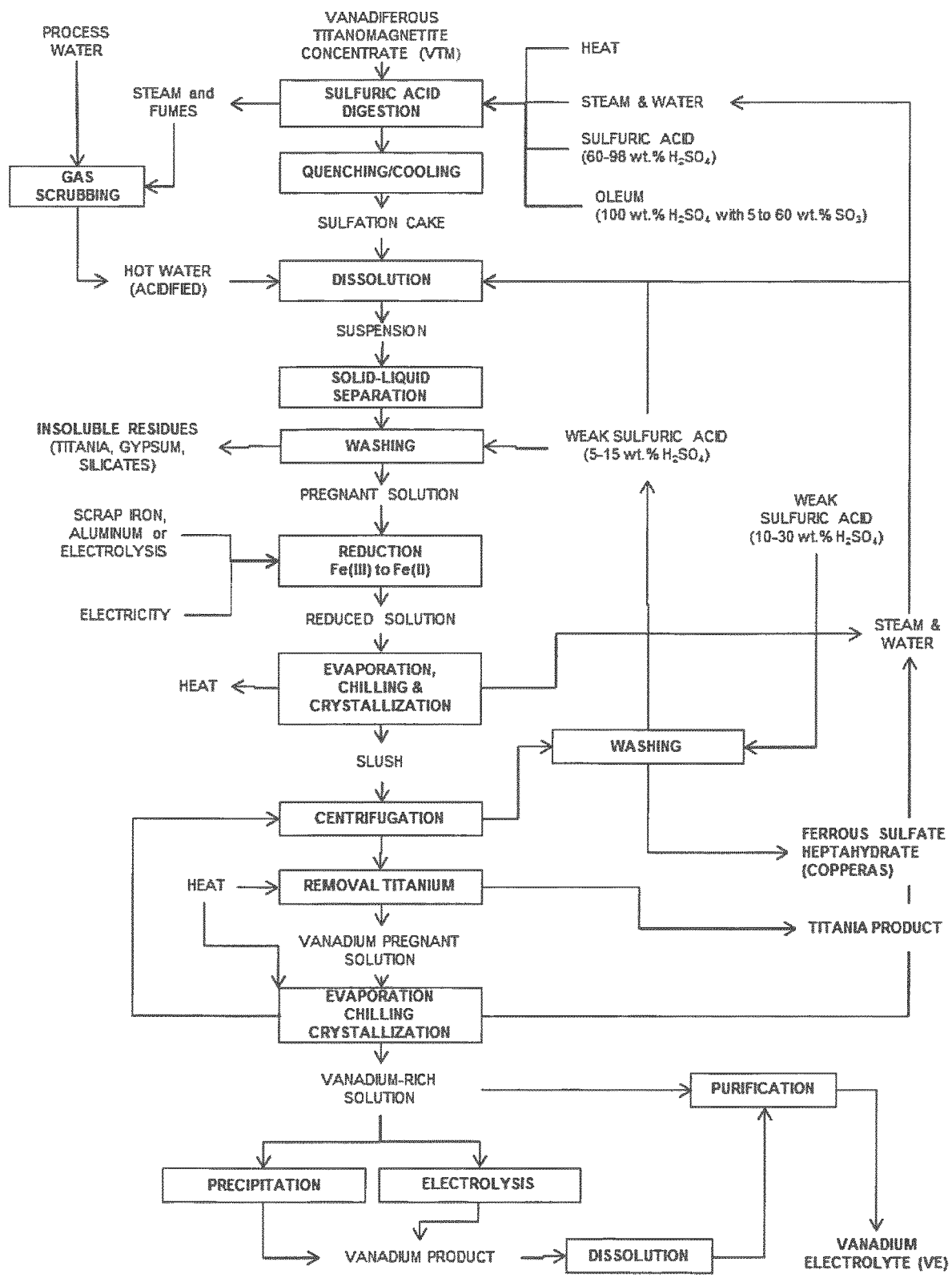
FIG. 1A is an illustration of a flowchart illustrating the process for recovering vanadium, iron, titanium and silica values from vanadiferous feedstocks, in accordance with an embodiment of the present disclosure.
Figure 1B:
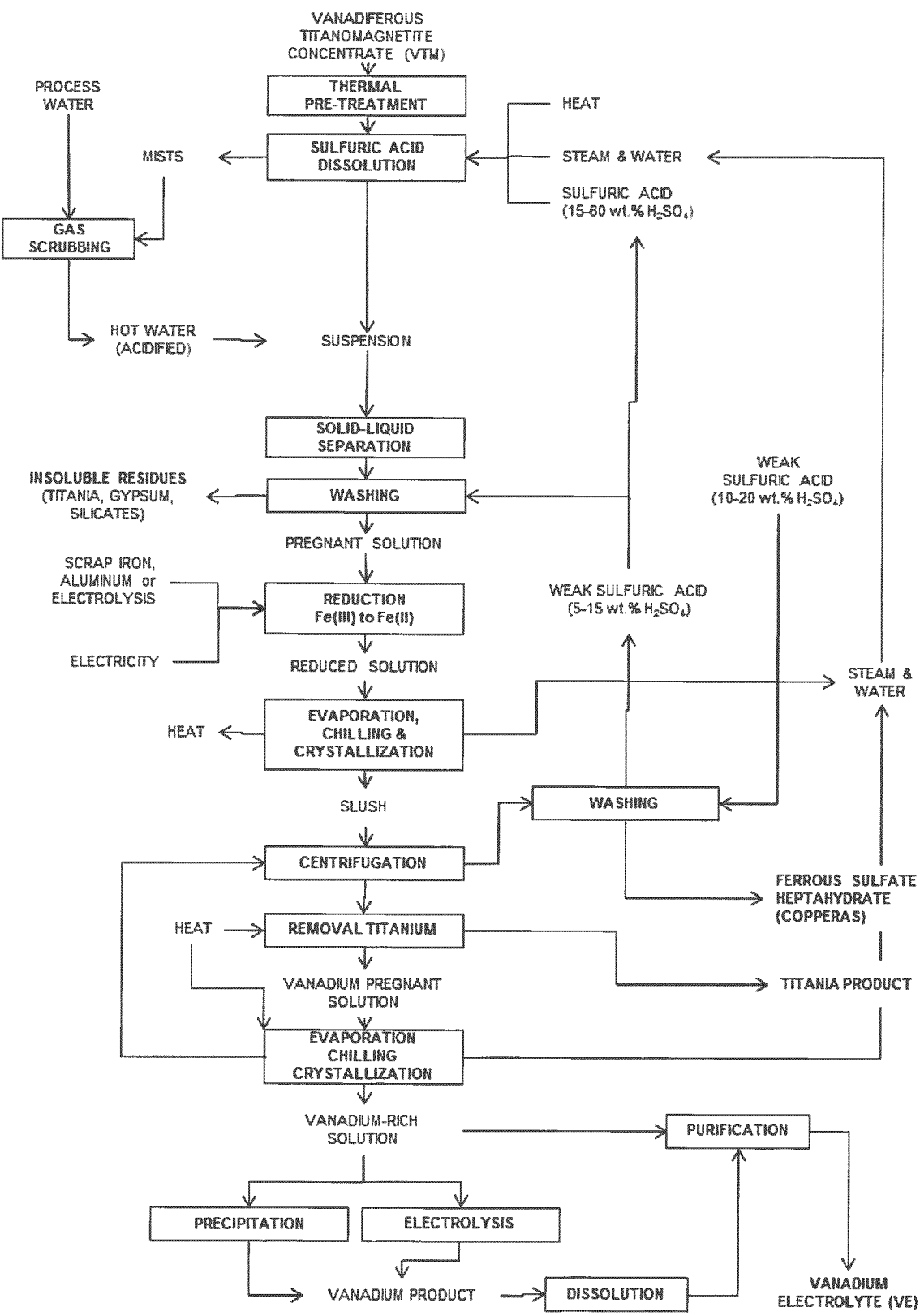
FIG. 1B is an illustration of a flowchart illustrating the process for recovering vanadium, iron, titanium and silica values from vanadiferous feedstocks, in accordance with an embodiment of the present disclosure.
Figure 2:
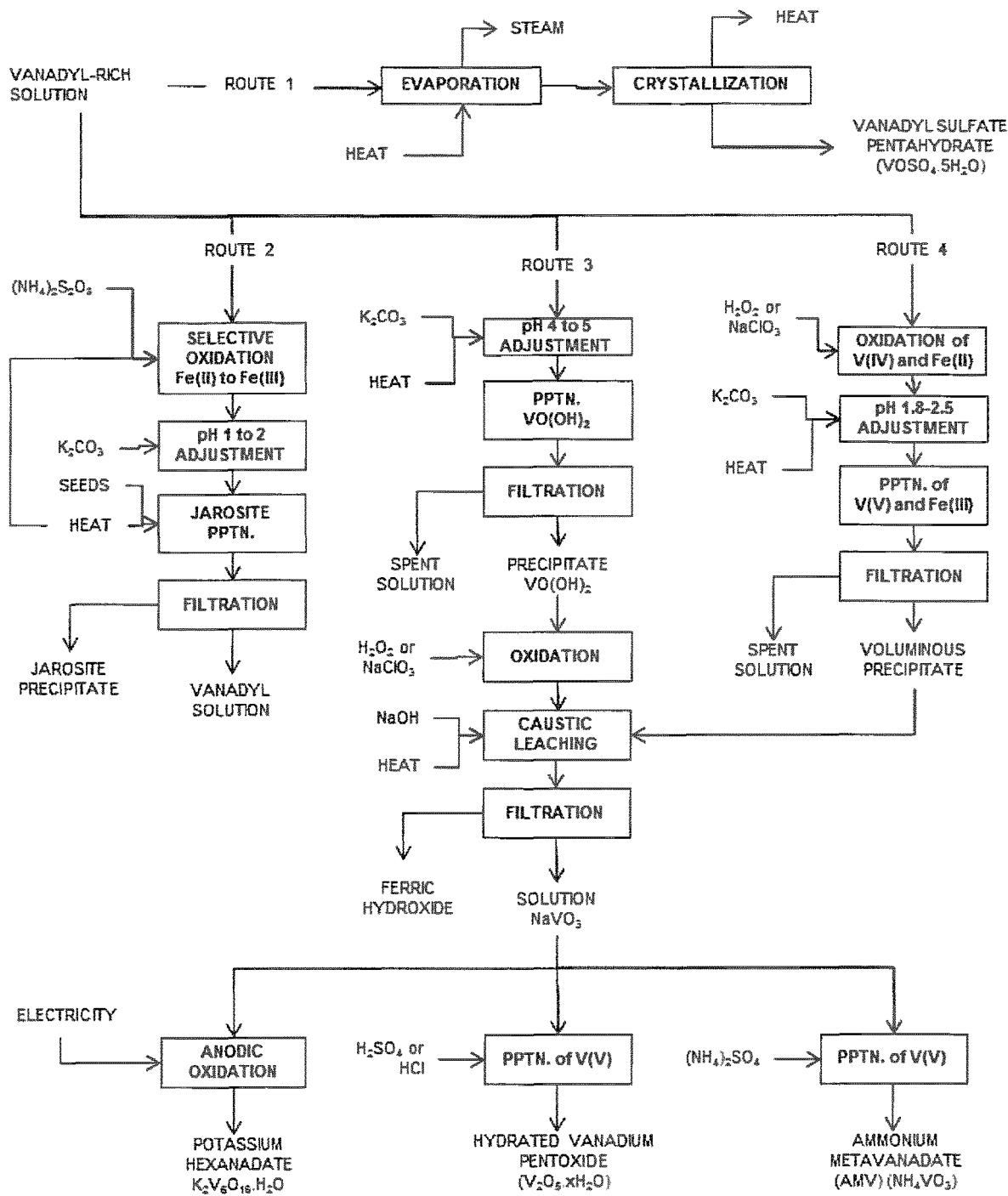
FIG. 2 is an illustration of a flowchart illustrating the process for recovering vanadium from a vanadyl-rich solution in the forms of vanadyl sulfate pentahydrate, vanadium (IV) hydroxide, vanadium pentoxide and ammonium metavanadate (AMV), in accordance with various embodiments of the present disclosure.
Figure 3:
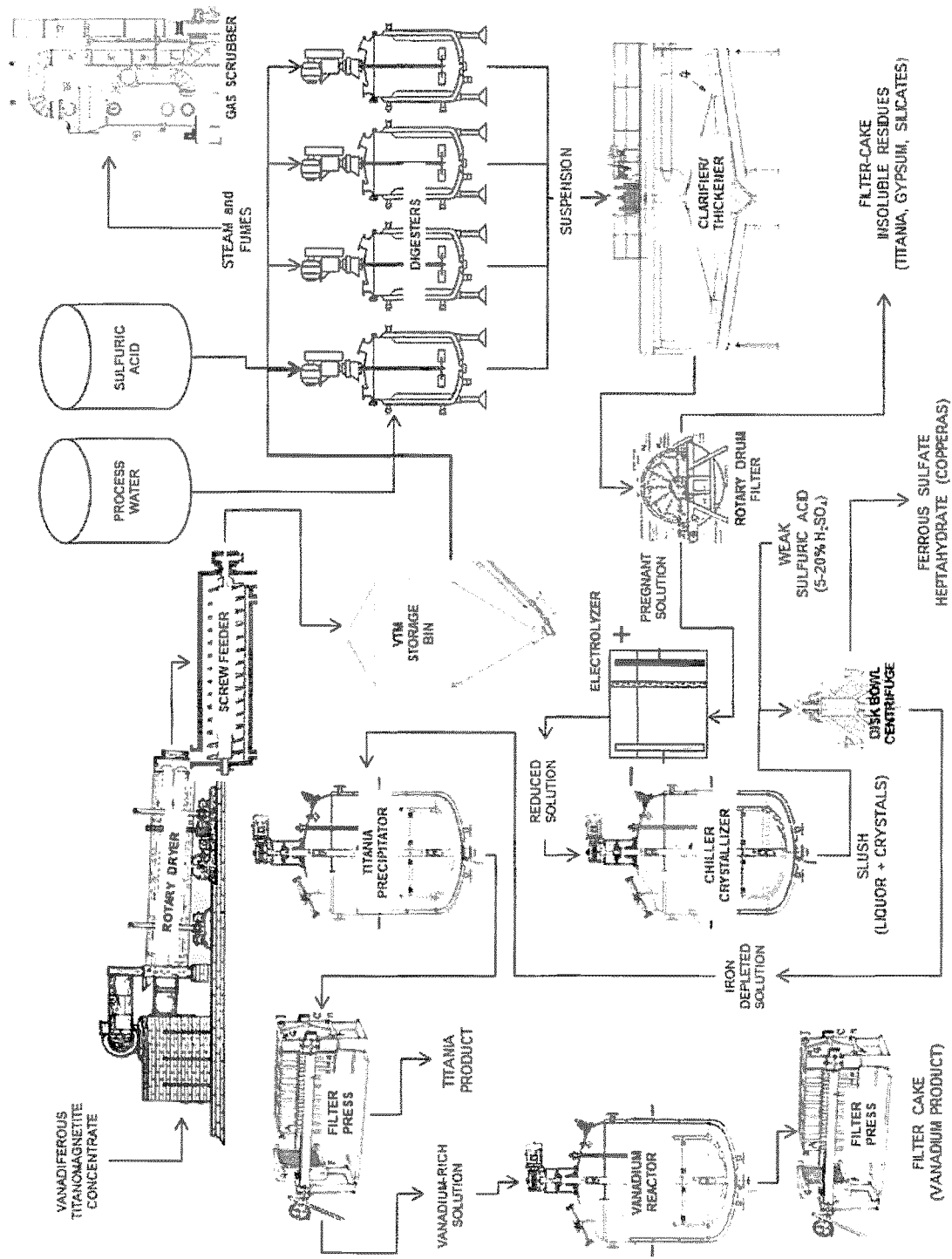
FIG. 3 is an illustration of a schematic plant layout including various operation units for recovering vanadium, iron, titanium and silica values from vanadiferous feedstocks, in accordance with an embodiment of the present disclosure.
Figure 4:
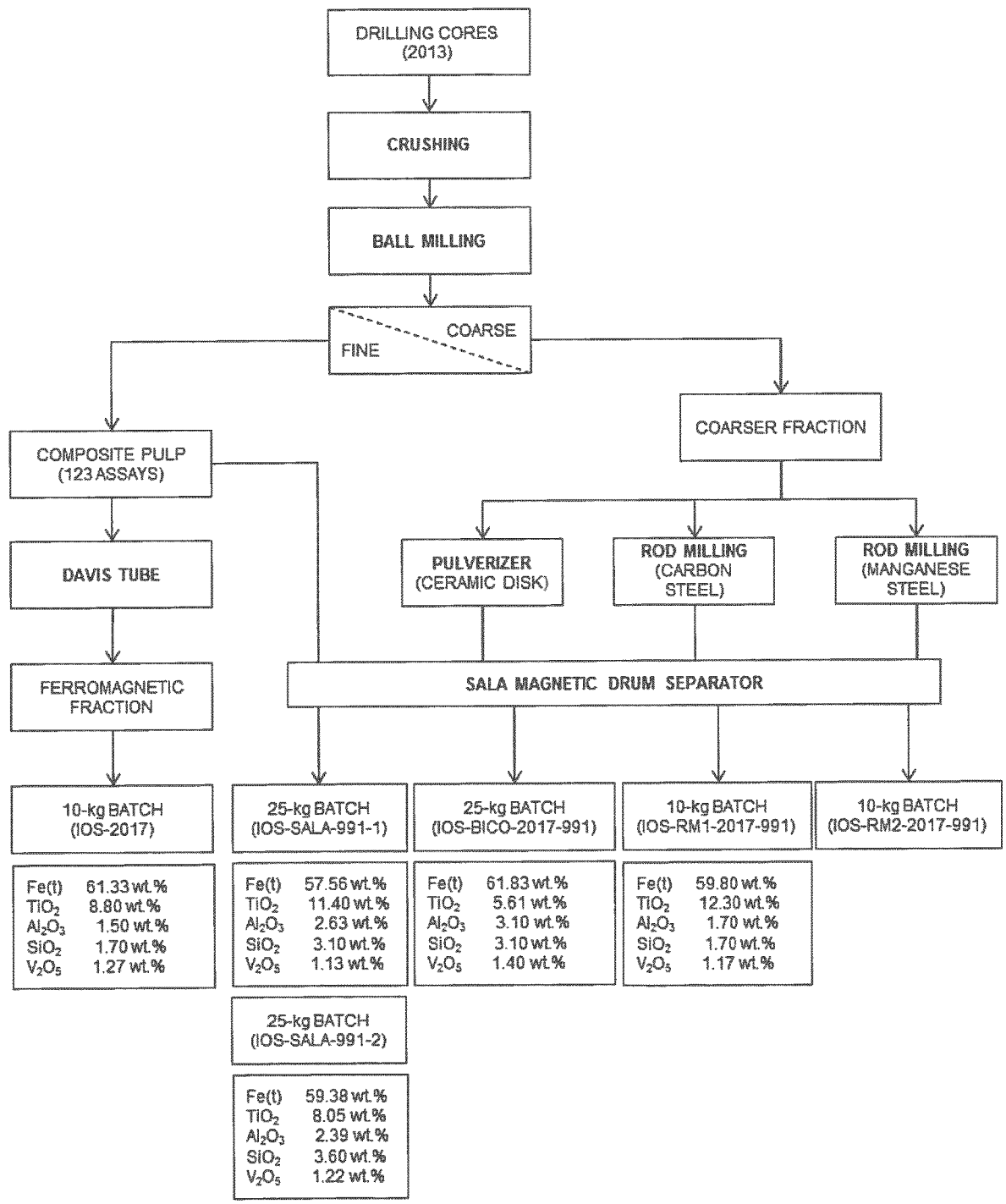
FIG. 4 is an illustration of a schematic flow diagram illustrating the preparation of various VTM concentrates (IOS GEOSERVICES (Chicoutimi, QC, Canada)) used as feedstocks in the exemplary embodiments of the present disclosure.

Example 7: Preparation of the VTM concentrate used during the semi-pilot test work: The raw material used during the semi-pilot tests was sorted, prepared and supplied by IOS SERVICES GEOSCIENTIFIQUES (Chicoutimi, QC). All the ore originated from drilling cores obtained during the 2013 diamond drilling campaign performed on the Lac Doré layered igneous complex located in the Chibougamau district. A first 10-kg batch bulk sample of vanadiferous titanomagnetite concentrate was prepared using small scale laboratory equipment to better control each of the process parameters by crushing and grinding the drilling cores yielding a finely ground concentrate (−325 mesh) from which the silicate gangue minerals were removed magnetically (i.e. from a water suspension of the ground concentrate) using a Davis tube. The clean pulp freed of silicates was then oven dried. A second 25-kg batch bulk sample was prepared with larger scale equipment to mimic the industrial operation of a beneficiation plant. A total of 123 composite pulp samples originating from the 2013 diamond drilling campaign were processed. Once crushed and ground, the material underwent a magnetic separation using a magnetic drum separator manufactured by SALA. A third 25-kg batch bulk sample was prepared using the leftover coarser materials from the 2013 diamond drilling cores. The material was then split into three lots: (1) the first lot was crushed using a laboratory disk mill, also called pulverizer, using ceramic disks (from BICO Inc.); (2) the second lot was ground using a small custom built laboratory rod mill equipped with carbon steel rods; and finally (3) the third lot was ground using a small custom built laboratory rod mill equipped with manganese steel rods. A schematic flow diagram illustrating the preparation of the various batches of VTM concentrates is shown in FIG. 4. The impact of the grinding method (e.g., milling, pulverizing) and the grinding medium (e.g., ceramic, carbon steel, manganese steel) on the amount of tramp metallic iron produced was subsequently assessed. Moreover, in order to mitigate the evolution of hydrogen gas inside industrial scale digesters during the sulfation step, due to the presence of trace amounts of metallic iron, the minimum threshold for the mass percentage of metallic iron in the VTM concentrates should be lower than 0.4 wt. % Fe.

Example 8: Electrochemical setup and mode of operation for performing the electro-reduction of the pregnant solution using a membrane: The electrochemical reduction of the pregnant solution obtained following the dissolution of the sulfation cake was performed in order to reduce all the Fe(III) into Fe(II) and also to reduce some of the titanium (IV) and vanadium (IV) values into Ti(III) and V(III) respectively. The electrochemical reduction was performed using two commercial divided electrolyzers manufactured by Electrochem Technologies & Materials Inc. (Montreal, QC, Canada): (1) the PROTOTYPE II plate and frame divided electrolyzer; and (2) the ELECTRO-UNIT TX, a cylindrical type divided electrolyzer with a tubular anode compartment. The technical specifications of both electrolyzers are reported in TABLE 15.

TABLE 15

Technical specifications of the PROTOTYPE II and ELECTRO-UNIT TX electrolyzers.

| ELECTROLYSER | PROTOTYPE II | ELECTRO-UNIT TX |
|---|---|---|
| Cathode shape | Rectangular or square plates | Cylindrical |
| Cathode dimensions and geometric surface area (maximum) | 12-in width × 12- in tall 144 in$^2$ (0.093 m$^2$) | 24-in tall × 10-in ID 754 in$^2$ (0.486 m$^2$) |
| Volume of cathode compartment | 0168 in$^3$ (2.753 dm$^3$) | 10 gallons (US) (37.854 dm$^3$) |
| Inter-electrodes gap (minimum) | 1 in (2.54 cm) | 1 to 5 in (2.54 to 11.52 cm) |
| Membrane shape | Square sheet | Tubular |
| Membrane dimensions and geometric surface area (maximum) | 10-in width × 10-in tall 100 in$^2$ (0.065 m$^2$) | 24-in height × 4-in OD 301.59 in$^2$ (0.195 m$^2$) |
| Anode shape | Rectangular or square plate | Rod, mesh or tube |
| Anode dimensions and geometric surface area (maximum) | 12-in width × 12- in tall 144 in$^2$ (0.093 m$^2$) | 24-in tall × 3-in OD 226 in$^2$ (0.146 m$^2$) |
| Maximum current per unit cell | 75 A | 150 A |

A schematic process flow diagram (PFD) illustrating the electrochemical setup for reducing the pregnant solution, using a divided electrolyzer in accordance with an embodiment of the present disclosure, is shown in FIG. 10. The two compartments were separated by an anion exchange membrane, a non-limiting example of which includes grade AEM-UIL-TBI-2017. The cathode compartment was equipped with cathodes made of either mild steel grade AISI 1018; or austenitic stainless steel grade AISI 304 or 316 L; or pure electrolytic copper C110 or chemically pure (C.P.) titanium Grade 2; or pure chemical lead ("corroding lead"). Moreover, in order to significantly increase the actual cathode surface area and to promote the mass transfer, three-dimensional cathodes were utilized by simply packing the cathode compartment of the PROTOTYPE II electrolyzer with additional metallic wool, or stacking metallic meshes and sheets of expanded metal of the same cathode material. In the case of the ELECTRO-UNIT TX, spirally wound metallic meshes, connected electrically by bolting or spot welding to the inner cylindrical cathode for the same purpose, were used. In both cases, the anode compartment was equipped with a mixed metal oxide (MMO) anode of the type $Ti/Ta_2O_5$—$IrO_2$ (designated EMMO-IRO-TI2-MS) manufactured by Electrochem Technologies & Materials Inc. (Montreal, QC, Canada). The anolyte consisted of an aqueous solution of sulfuric acid used with or without an additional anode depolarizer. The electrode-membrane and the inter-electrode gaps for each electrolyzer configuration are reported in TABLE 15. Each electrolyzer compartment was connected to the related catholyte (resp. anolyte) storage tank with a capacity up to 5 gallons (18.9 L) for PROTOTYPE II or 30 gallons (113 L) for ELECTRO-UNIT TX, through piping and tubing. The circulation of the catholyte (resp. catholyte) was ensured by either peristaltic pumps or air operated diaphragm pumps depending on the volume flow rate ranging from 0.53 gal/min (2 L/min) up to 3 gal/min (11.4 L/min). Because of the important oxygen gas evolution occurring inside the anode compartment and in a lesser extend the hydrogen gas evolution occurring in the cathode compartment, each of the lines were equipped with a tall disengagement vessel filled with internal packings such as plastic balls or Tellerettes® in order to perform the liquid/gas separation (FIG. 10).

The electrolysis was performed under a batch mode with recirculation. An industrial DC power supply was used to perform the electrolysis under a constant current operation (galvanostatic mode). When performing the electrolysis at high current, the Joule's heating of the electrolytes was carefully controlled by installing a heat exchanger on the catholyte line in order to not surpass the maximum operating temperature of 65° C. for preventing any premature hydrolysis of the Ti(IV) values. Prior to performing each electrochemical reduction, the pregnant solution was chemically analyzed to assess the concentrations of Fe(III) and Fe(II) by redox titration using Ce(IV), with potentiometric determination of the end-point or using o-phenanthroline as redox indicator. The assessment of the Ti(III) concentration was performed by redox titration using ferric sulfate, with potentiometric determination of the end-point or using potassium thiocyanate (KSCN) as redox indicator. The assessment of the V(IV) concentration was performed by UV-Vis spectrophotometry. Finally, the concentration of free sulfuric acid was determined by gas volumetry analysis using a precision gas burette, since the hydrolysis and precipitation of metal hydroxide prevents the use of acid-base titrations. Moreover, the polarization plot (E vs. j) for the pregnant solution was recorded in order to assess the actual Tafel's parameters (a and b) for the cathode material under the targeted operating conditions. This allows for the determination of the minimum cathode current density (CCD) required for an efficient reduction while minimizing any parasitic evolution of nascent hydrogen gas. Several operating parameters were recorded as a function of time, such as the current intensity (I), the overall cell voltage ($U_{cell}$), the cathode potential ($E_{cath}$) vs. a mercury-mercurous sulfate reference electrode, the pH, the oxidation-reduction potential (ORP vs. Ag/AgCl), the electrical conductivity ($\kappa$), the temperature (T), the electric charge circulated (Q), and the volume flow rate ($Q_v$). Among the operating parameters, the cathode potential and the ORP are particularly important to the reduction process as they are indicative of the progression of the reduction reaction. The experimental plot illustration the oxidation-reduction potential (ORP) measured in the cathode compartment of a PROTYPE II divided electrolyzer during the electrochemical reduction of the pregnant solution is shown in FIG. 11. The experimental plot of the ORP vs. the electric charge circulated exhibits a shape typical of most potentiometric redox titration curves, with the ORP dropping off near the end point, prior to completion, from +230 mV/AgCl down to −230 mV/AgCl in a matter of few minutes. The theoretical electric charge, denoted Q* and expressed in Ah, that is required for completing the stoichiometric reduction, can be calculated knowing the initial concentrations of electroactive species such as Fe(III), Ti(IV), and V(IV) in g/L (TABLE 4) and the volume of the pregnant solution $V_{SOLN}$ in m$^3$, according to the equation:

$$Q^*(Ah) = V_{SOLN}[480\ C_{Fe(III)} + 560\ C_{Ti(IV)} + 526\ C_{V(IV)}]$$

Moreover, the actual electric charge Q, expressed in Ah, that is required to reach a minimum ORP value established for instance at −160 mV/AgCl, corresponding to a desired concentration of Ti(III) ranging from 1 to 3 g/L, can be extrapolated from the experimental plot (FIG. 11). This concentration of Ti(III) ensures that all of the iron was fully reduced and stabilizes the solution towards air oxidation, providing for its safe storage over a period of several weeks.

Example 9: Cathode current efficiency vs. cathode materials: The electrochemical reduction of several identical batches originating from the two pregnant solutions PRO-04AE L1A and L1B was conducted to determine the behavior and performances of various commercial cathode materials namely: mild steel grade AISI 1018; austenitic stainless steel grade AISI 304 or 316 L; pure electrolytic copper C110; or chemically pure (C.P.) titanium Grade 2; and pure chemical lead ("corroding lead"). The electrolysis was conducted under the same operating conditions as described in Example 8 (i.e., cathode current density, temperature, current, etc.) using a RECTLAB V plate and frame type electrolyzer from Electrochem Technologies & Materials Inc. (Montreal, QC), divided by an anion exchange membrane and using an aqueous solution of sulfuric acid as the anolyte. For each electrolysis experiment, for a given cathode material tested, the plot of the redox potential (ORP) vs. the electric charge consumed was recorded along with the overall cell voltage and cathode polarization vs. a reference electrode. Moreover, in order to compare the performances of the cathode materials, various normalized plots illustrating the oxidation-reduction potential (ORP) vs. the specific charge consumed (Q/m) (i.e., the electric charge consumed per unit mass of solution electrolyzed) were constructed (FIG. 12). These plots provide for the determination of the specific charge required for completing the electrochemical reduction and to reach a final ORP established at for example −160 mV/AgCl. The cathode current efficiency (CCE) was calculated as the dimensionless ratio of the actual charge consumed in order to reach the minimum ORP threshold over the theoretical electric charge calculated for the solution: CCE=Q/Q*. Based on the overall cell voltage, $U_{cell}$ in V, and the specific electric charge circulated, it was then possible to calculate, for each cathode material, the specific energy consumption per unit mass of pregnant solution according to the equation:

$$e_m = (Q/m) \times U_{cell} = (Q \times U_{cell})/\rho_{SOLN} V_{SOLN}$$

where Q is the total electric charge consumed in Ah in order to reach a pre-defined ORP cut-off, $U_{cell}$ is the weighted average overall cell voltage in V, $\rho$ is the mass density of the solution in kg/m$^3$, and V is the volume of the solution electro reduced in mL. The performance of each of the cathode materials tested is reported in TABLE 16.

TABLE 16

Performance of cathode materials tested.

| Cathode material | Specific charge consumed (Ah/kg) | Cathode polarization (V/SHE) | Overall cell voltage (U/V) | Specific energy consumption ($e_m$/kWh · kg$^{-1}$) | Cathode current efficiency (CCE) |
|---|---|---|---|---|---|
| Pure lead | 29.8 | −1.090 | 7.88 | 0.234 | 124% |
| Pure electrolytic copper | 34.3 | −0.040 | 5.12 | 0.176 | 143% |
| Stainless steel 304 | 47.8 | −0.060 | 5.08 | 0.243 | 199% |
| Mild steel 1018 | 50.9 | −0.140 | 5.18 | 0.264 | 212% |
| Stainless steel 316L | 54.3 | −0.240 | 4.92 | 0.267 | 226% |
| Titanium grade 2 | 57.9 | −0.570 | 5.47 | 0.317 | 241% |

OPERATING CONDITIONS:
Electrolyzer: RECTLAB V;
Catholyte: Pregnant solutions PRO 04AE L1A and L1B;
Theoretical charge required (Q*): 24 Ah/kg;
Average cathode current density (CCD) −1260 A/m$^2$,
Anolyte composition: sulfuric acid 13 wt. % H$_2$SO$_4$,
Average temperature 40° C.,
Catholyte volume flow rate: 170 mL/min;
pH = 0.80

From the test results reported in TABLE 16, lead and copper represent the most efficient cathode materials with a specific electric charge of 29.8 and 34.3 Ah/kg of solution respectively. However, the copper cathode exhibits the lowest specific energy consumption (0.176 kWh/kg), compatible with an industrial scale operation. Because of the acidic conditions that were imposed (pH=0.80) in order to prevent the hydrolysis and precipitation of metal hydroxides and the electrodeposition of reducible metals, the obtained cathode current efficiencies were always above 100% and even up to 241%. This departure from stoichiometry was always related to the concurrent evolution of hydrogen gas which consumes extra current that is not used for the reduction of Fe(III). Other experiments performed at a temperature of 65° C. allowed to significantly reduce the specific energy consumptions.

Example 10: Electrochemical reduction of the pregnant solution using a sacrificial steel anode inside an open electrolyzer: The electrochemical reduction of the pregnant solution PRO 04AE L1B was performed using the ELECTRO-UNIT TX manufactured by Electrochem Technologies & Materials Inc. (Montreal, QC, Canada) without a membrane and using a copper cathode and a sacrificial anode made of mild steel. The benefit of using a sacrificial anode resides in a significant lowering of the overall cell voltage down to 2.0 V. This is a direct result of: (1) the anion exchange membrane having been removed, the ohmic drop related to the separator vanished; (2) the anodic dissolution of iron according to Fe(s)=Fe$^{2+}$+2e− exhibits a lower standard electrode potential (E°=+0.77 V/SHE) compared to the evolution of oxygen gas (E°=+1.23 V/SHE); and (3) because of the acidic conditions preventing its passivation, there was no anode overvoltage during the dissolution of the steel anode resulting in the overall specific energy consumption dropping to only 0.070 kWh per kg of solution electrolyzed. This presents an interesting operational mode, specifically in locations were large amounts of iron and steel scrap are available, providing for a sustainable recycling option while reducing the energy demand.

Example 11: Crystallization of ferrous sulfate heptahydrate (copperas): The fully reduced, acidic, warm and dark solution obtained following electro-reduction of the pregnant solution, was cooled down to room temperature to remove a first batch of copperas crystals followed by chilling below 0° C. for several hours to trigger the crystallization of the remaining copperas. The cold supernatant solution depleted in iron was then separated from the coarse and well defined ferrous sulfate heptahydrate (copperas) crystals by decanting and then stored under an inert argon atmosphere while the copperas crystals were thoroughly washed with cold 30 wt. % sulfuric acid. The acid was subsequently reused upstream in the process. The presence of a significant concentration of sulfuric acid and other sulfate had the beneficial effect of promoting the crystallization of ferrous sulfate heptahydrate with a final concentration in the supernatant solution well below that indicated by the binary phase diagram of the FeSO$_4$—H$_2$O system (FIG. 13). The chemical composition and physical properties of the reduced solution, following removal of copperas are reported in TABLE 17.

TABLE 17

Chemical composition and properties of the reduced and iron depleted pregnant solution obtained following electroreduction & crystallization of copperas.

| Chemical element | Concentration (g/L) |
|---|---|
| Fe(total) | 22.200 |
| Ti | 14.500 |
| Al | 3.310 |
| V | 1.380 |
| Mg | 0.692 |
| Ca | 0.641 |
| Mn | 0.247 |
| Cr | 0.259 |

TABLE 17-continued

Chemical composition and properties of the reduced
and iron depleted pregnant solution obtained following
electroreduction & crystallization of copperas.

| Chemical element | Concentration (g/L) |
|---|---|
| Co | 0.011 |
| Ni | 0.058 |
| Zn | 0.054 |

Physical properties:
Mass density: 1,247 kg/m³
Conductivity: 263 mS/cm
pH 0.89
ORP: −185 mV/AgCl Example 12: Separation of titanium (III) from the reduced and iron depleted pregnant solution: The selective removal of titanium was conducted directly on the reduced and iron-depleted pregnant solution. The solution was first heated up to a temperature of 60-75° C. followed by adjusting the pH to a maximum of 2.00 by means of incremental additions of a saturated solution of either sodium or potassium carbonate. The initial black solution turned emerald green around pH 1.5 and then bluish green at pH 1.85 and above. A few minutes after reaching the maximum pH of 2.0, a pinkish tan precipitate formed that settled rapidly. The precipitation could also be induced by the addition of a seed material composed of jarosite. The titanium (III) precipitate is believed to be a titanium (III) jarosite-type phase [$MTi_3(SO_4)_2(OH)_6$ with $M=NH_4^+$, $H^+$, $Na^+$, $K^+$] material as projected in accordance with the following chemical reaction:

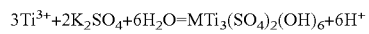

$$3Ti^{3+}+2K_2SO_4+6H_2O=MTi_3(SO_4)_2(OH)_6+6H^+$$

The pinkish tan jarosite precipitate settled quickly and was readily separated by cross flow filtration. The titanium bearing-jarosite material was subsequently thoroughly washed with acidic water, oven-dried, air-oxidized and then dissolved in fresh sulfuric acid for the preparation of a cleaner titania product while also regenerating alkali-metal or ammonium sulfate. The bluish to green solution was depleted in iron and its titanium content dropped from 14.5 g/L down to 2.11 g/L. Moreover, the solutions contained all the initial vanadium values. The chemical composition and physical properties of the iron and titanium depleted solution are reported in TABLE 18. Moreover, the chemical composition of various titanium (III) precipitates are reported in TABLE 19.

TABLE 18

Chemical composition and properties of the
iron and titanium depleted solution.

| Chemical element | Concentration (g/L) |
|---|---|
| Fe(total) | 18.500 |
| Ti | 2.110 |
| Al | 1.660 |
| V | 1.500 |
| Mg | 0.545 |
| Ca | 0.404 |
| Mn | 0.156 |
| Cr | 0.140 |
| Co | 0.008 |
| Ni | 0.021 |
| Zn | 0.054 |

Physical properties:
Mass density: 1,225 kg/m³
Conductivity: 138 mS/cm
pH 1.56
ORP: −284 mV/AgCl

TABLE 19

Chemical composition of various titanium (III) precipitates.

| Oxide | Mass percentage (wt. %) | | |
|---|---|---|---|
| $Fe_2O_3$ | 0.10 | 0.47 | 0.10 |
| $V_2O_5$ | 0.07 | 0.04 | 0.22 |
| $Cr_2O_3$ | 0.36 | 0.24 | 0.01 |
| $Al_2O_3$ | 0.20 | 0.63 | 0.53 |
| MnO | 0.01 | 0.01 | 0.01 |
| CaO | 0.01 | 0.01 | 0.01 |
| MgO | 0.04 | 0.04 | 0.04 |
| $Na_2O$ | 0.10 | 0.10 | 0.10 |
| $K_2O$ | 0.25 | 1.47 | 0.01 |
| $SiO_2$ | 0.50 | 2.90 | 2.40 |
| $TiO_2$ | 65.90 | 66.10 | 65.30 |
| $P_2O_5$ | 0.05 | 0.09 | 0.02 |
| L.O.I. | 31.90 | 28.60 | 31.80 |

Example 13: Removal of traces of titanium and concentration of vanadium values by thermal evaporation: The selective removal of the residual concentration of titanium was conducted directly on the previously obtained iron and titanium depleted solution. The solution was first heated up to a temperature of 95° C. then the ORP was adjusted to reach a final value of +185 mV/AgCl in order to selectively oxidize the residual Ti(III) into Ti(IV) while the V(IV) values remained substantially unaffected. This was accomplished by the careful and incremental additions of a saturated solution of ammonium persulfate [$(NH_4)_2S_2O_8$]. The first traces of Fe(III) produced indicate the completion of the selective oxidation. For industrial scale operations, peroxodisulfuric acid (Marshall's acid) or peroxomonosulfuric acid (Caro's acid) can replace the ammonium persulfate providing for substantially similar results at lower operating costs. Once oxidized, the remaining Ti(IV) was hydrolyzed yielding a dense hydrated titania precipitate. The solution was subsequently concentrated by thermal evaporation by increasing its temperature to its boiling point. Upon cooling and settling, a deep blue to green vanadium-rich solution was obtained from which the titanium concentrate could be easily separated by filtration. The vanadium-rich solution was subsequently chilled to remove any alkali-metal sulfates and ferrous sulfate. The resulting vanadium-rich solution was then ready for the recovery of vanadium or the preparation of a vanadium electrolyte by various purification techniques. The chemical composition and physical properties of the vanadium-rich solution are reported in TABLE 20.

TABLE 20

Chemical composition and properties
of the vanadium-rich solution.

| Chemical element | Concentration (g/L) |
|---|---|
| Fe(total) | 38.700 |
| Ti | 1.260 |
| Al | 0.378 |
| V | 4.670 |
| Mg | 0.652 |
| Ca | 0.288 |
| Mn | 0.497 |
| Cr | 0.200 |
| Co | 0.010 |
| Ni | 0.022 |
| Zn | 0.060 |

Physical properties:
Mass density: 1,211 kg/m$^3$
Conductivity: 127 mS/cm
pH 1.62
ORP: +182 mV/AgCl Example 14: Concentration of vanadium (IV) as vanadyl sulfate by evaporation, chilling and crystallization: A batch of 18.185 kg (14.82 L) of the acidic and reduced vanadium-bearing solution (LSUR-03) containing 3.49 g/L V(IV) and 61.3 g/L Fe(II), at a pH=1.68 and an ORP=+224 mV/AgCl, was concentrated by evaporation. Steam was produced and the mass of the batch was reduced down to 12.129 kg. The warm and concentrated solution was then allowed to cool to room temperature where it was kept for 6 hours and then chilled at 0° C. for several hours yielding ferrous sulfate heptahydrate crystals in accordance with the binary phase diagram of the FeSO$_4$—H$_2$O system (FIG. 13). This first step yielded 2.6 kg of ferrous sulfate heptahydrate (copperas) crystals that were readily separated from the supernatant blue solution (LSUR-04) (9.529 kg; 7.33 L) containing 6.26 g/L V(IV) and 64.1 g/L Fe(II). The supernatant solution was subsequently acidified by adding 0.365 kg of 96 wt. % H$_2$SO$_4$ followed by chilled down to –12° C. for 12 hours. Further increasing the concentration of free sulfuric acid, also build-up during the evaporation step, significantly reduced the solubility of the ferrous sulfate, improving it crystallization by salting-out. The salting out allowed to more quickly reduce the concentration of Fe(II) than predicted by the phase diagram of the FeSO$_4$—H$_2$O system. Moreover, the chilling temperature remained above the eutectic point (–16.3° C.). For aqueous solutions having a concentration of vanadyl sulfate lower than the composition of the cryohydrate and being at temperatures above the eutectic point of the binary phase diagram of the H$_2$O—VOSO$_4$ system (FIG. 13), only ice and copperas crystallized during chilling. Therefore, as long as the temperature of the mixture was maintained above –16.3° C., the solution becomes more concentrated in VOSO$_4$ while water separated as flakes of ice. If the temperature of the mixture were below –16.3° C., only a bulky solidified mass consisting of a mixture of copperas, ice and crystals of vanadyl sulfate hexahydrate (VOSO$_4$.6H$_2$O) would have been obtained. From the resulting bluish slush, 3.4 kg of ice flakes were recovered by dripping together with 0.505 kg of bluish green crystals that settled at the bottom of the solution. Moreover, 5.989 kg (4.846 L) of a deep blue solution (LSUR-05) was obtained containing 7.98 g/L V(IV) and 18.9 g/l Fe(II). A second evaporation was performed and the warm concentrated solution allowed to cool to room temperature and then chilled down to –12° C. for 12 hours, yielding 0.500 kg of flaky ice crystals and 0.593 kg of coarse pale bluish green crystals at the bottom of the crystallizer. Moreover, 3.417 kg (2.585 L) of a deep blue solution (LSUR-06) containing 15.6 g/L V(IV) and 13.4 g/l Fe(II) was obtained. A third evaporation, cooling and chilling sequence was conducted, yielding 0.700 kg of flaky ice crystals and 70 g of coarse pale bluish green crystals at the bottom of the crystallizer. Moreover, 1.65 kg (1.139 L) of deep blue solution (LSUR-07) containing 23.6 g/L V(IV) and 13.1 g/l Fe(II) was obtained. The results are reported in TABLE 21.

TABLE 21

Evolution of the composition of the vanadium rich solution following each evaporation/chilling/crystallization cycle.

| | INPUT | | | 96% H$_2$SO$_4$ ADDED (kg) | OUTPUT | | | |
|---|---|---|---|---|---|---|---|---|
| SOLUTION | Fe(II) g/L | V(IV) g/L | LIQUID (kg) | | LIQUID (kg) | CRYSTALS (kg) | ICE (kg) | STEAM (kg) |
| LSUR-03 | 61.3 | 3.49 | 18.185 | — | 9.529 | 2.600 | — | 6.056 |
| LSUR-04 | 64.1 | 6.26 | 9.529 | 0.365 | 5.989 | 0.505 | 3.400 | - |
| LSUR-05 | 18.9 | 7.98 | 5.989 | — | 3.417 | 0.593 | 0.500 | 1.479 |
| LSUR-06 | 15.6 | 13.4 | 3.417 | — | 1.650 | 0.070 | 0.700 | 0.997 |
| LSUR-07 | 13.1 | 23.6 | 1.650 | — | | | | |
| TOTAL | | | 18.185 | 0.365 | 1.650 | 3.768 | 4.600 | 8.532 |

One of the advantages of this approach, besides concentrating vanadium and removing ferrous cations, was the concurrent water removal in three different ways: (1) as steam during evaporation; (2) as hydration molecules during the crystallization of copperas; and (3) as flakes of ice.

Example 15: Precipitation of vanadium (IV) hydroxide from the vanadyl sulfate solution: One liter of a dark blue acidic solution of vanadyl sulfate (VOSO$_4$) containing 23.6 g/L V(IV) and 13.1 g/L Fe(II), at a pH=0.30 and an ORP=+282 V/AgCl was heated on a hot stirring plate until reaching a temperature of 60° C. A saturated aqueous solution of potassium carbonate (50 wt. % K$_2$CO$_3$) was then injected by incremental volumes using a MASTERFLEX L/S peristaltic pump through a deep PTFE tube having its tip immersed well below the liquid surface. The effervescence, due to the evolution carbon dioxide gas, allowed to maintain an inert atmosphere above the liquid surface at all times, thus preventing the air-oxidation of Fe(II). As a result of the potassium carbonate addition, the temperature of the vanadyl sulfate solution increased to 90° C. At a pH of about 2.0, the formation of grayish brown flocs consisting of $VO(OH)_2$ was observed. The addition of potassium carbonate was carried-on until the pH reached a value ranging between 4.5 and 5.5, while the ORP dropped significantly down to +65 mV/AgCl. The hot solution was cooled overnight allowing the grayish brown flocs to settle. The suspension was subsequently filtered on WHATMAN filter paper No. 43 and carefully washed with boiled deionized water. A fraction of the light brown wet filter cake was then oven-dried at 90° C. while the rest of the precipitate was re-pulped with boiling water and oxidized using a solution of sodium chlorate to convert all the V(IV) to V(V). The resulting reddish brown mass was subsequently leached with a hot caustic solution of 20 wt. % NaOH to yield, after filtration, a solution of sodium vanadate ($NaVO_3$) leaving behind traces of ferric hydroxide. A first fraction of the sodium vanadate solution was incrementally acidified with sulfuric acid. The initial pale yellow solution (pH 14), upon acidification became reddish orange when reaching pH 10 as a result of the formation of $HVO_4^-$; upon reaching pH 7.5, a bright orange pulp formed ($H_2VO_4^-$); upon reaching pH 3, a clear orange red solution ($V_{10}O_{28}^{6-}$) was obtained; while when reaching a pH of about to 2.0, a voluminous reddish-brown precipitate of hydrated vanadium pentoxide ($V_2O_5.250H_2O$) was obtained. Ammonium sulfate was added to a second fraction yielding a white precipitate of ammonium metavanadate ($NH_4VO_3$). After washing with aqueous ammonia, the ammonium metavanadate precipitate was calcined to yield pure vanadium pentoxide ($V_2O_5$) with the evolution of fumes of ammonia gas and steam.

Example 16: Precipitation of vanadium (IV) hydroxide from the vanadyl sulfate solution after removal of iron as K-jarosite: Six liters of a dark blue acidic solution of vanadyl sulfate ($VOSO_4$) containing 30 g/L V(IV) and 15 g/L Fe(II), at a pH=0.30 and an ORP=+282 V/AgCl were heated on a hot stirring plate until reaching a temperature of 60° C. The selective oxidation of Fe(II) to Fe(III) was performed by injecting incremental volumes of a saturated aqueous solution of ammonium persulfate by means of a MASTERFLEX US peristaltic pump through a deep PTFE tube having its tip immersed well below the liquid surface. The persulfate anion selectively oxidized Fe(II) into Fe(III) while the vanadyl cations remained unaffected. The oxidation was continued until the ORP reached +500 mV/AgCl and a deep emerald green solution was obtained. Incremental volumes of a saturated solution of potassium carbonate (50 wt. % $K_2CO_3$) were then added to the hot solution until reaching a pH ranging from 1.5 to 1.8, while the temperature of the solution increased to 98° C. Seeds of jarosite were subsequently added to trigger the precipitation of a jarosite-type compound $MFe_3(SO_4)_2(OH)_6$ with $M=NH_4^+$ and/or $K^+$. After 4 hours, the jarosite precipitate was filtered, providing a clear dark blue solution that was further concentrated in vanadyl sulfate. The V(IV) was either recovered as vanadyl sulfate pentahydrate or precipitated as indicated in Example 15.

Example 17: Oxidation of the vanadyl sulfate solution, with co-precipitation of vanadium (V) and iron (III) and hot caustic leaching to yield sodium vanadate: Ten liters of a dark blue acidic solution of vanadyl sulfate ($VOSO_4$) containing 28 g/L V(IV) and 14 g/L Fe(II), at a pH=1.0 and an ORP=+260 V/AgCl were heated on a hot stirring plate until reaching a temperature of 60° C. The oxidation of Fe(II) and V(IV) to Fe(III) and V(V) was performed by injecting incremental volumes of an aqueous solution of sodium chlorate by means of a MASTERFLEX L/S peristaltic pump through a deep PTFE tube having its tip immersed well below the liquid surface. The oxidation was continued until the ORP reached +980 mV/AgCl and a deep emerald green solution was obtained. Incremental volumes of a saturated solution of aqueous ammonia (28 wt. % $NH_4OH$) were then added to the hot solution until reaching a pH ranging from 1.9 to 2.5, while the temperature of the solution increased to 98° C. The resulting voluminous reddish-brown flocs were composed of hydrated vanadium pentoxide ($V_2O_5.250H_2O$) and ferric hydroxide [$Fe(OH)_3$]. After filtration, the reddish brown filter cake was leached with a hot caustic solution of 20 wt. % NaOH to yield, after filtration, a solution of sodium vanadate ($NaVO_3$) leaving behind traces of ferric hydroxide as an insoluble residue. Vanadium (V) was recovered from the sodium vanadate solution by the addition of ammonium sulfate, yielding a white precipitate of ammonium metavanadate ($NH_4VO_3$). After washing with aqueous ammonia, the ammonium metavanadate precipitate was oven-dried and calcined at 400° C. to yield pure vanadium pentoxide ($V_2O_5$) with the evolution of fumes of ammonia gas and steam.

Example 18: Electrochemical preparation of vanadium pentoxide by anodic oxidation: An aqueous solution of sodium vanadate (5 wt. % $NaVO_3$) maintained at a pH=6.5 and containing 50 g/L of potassium sulfate ($K_2SO_4$) as the supporting electrolyte was circulated inside the anode compartment of a RECTLAB V divided electrolyzer from Electrochem Technologies & Materials Inc. (Montreal, QC, Canada) using a MASTERFLEX® L/S peristaltic pump. The separator consisted of a NAFION® N424 cation exchange membrane and the catholyte consisted of a dilute solution of 5 wt. % sodium hydroxide. The anode consisted of a mixed metal oxides expanded metal titanium anode coated with a layer of $PbO_2$ (EMMO-PBO-IRO-TI2-LS) manufactured by Electrochem Technologies & Materials Inc. (Montreal, QC, Canada). This type of coating was used in view of its high overpotential for the evolution of oxygen gas. The cathode consisted of austenitic stainless steel grade 304 L that was electropolished to obtain a mirror surface. The electrolysis was performed at constant current (galvanostatic mode) and the temperature of both electrolytes was maintained at 50° C. The maximum anode current density (ACD) used was +70 A/m$^2$ in order to minimize the oxygen gas evolution interfering with the anodic deposition. A thick reddish orange deposit was formed, triggered by the significant decrease of the anolyte pH down to 2-3 and the electrophoretic effect acting onto the suspended or colloidal particles. The deposit consisted of an impure hydrated vanadium pentoxide possibly including hydrated potassium hexavanadate ($K_2V_6O_{16}.H_2O$). The coated anode mesh was harvested and the deposit obtained carefully scrapped, thoroughly washed with slightly acidified water to remove potassium cations and then calcined at 400° C. to yield crude vanadium pentoxide ($V_2O_5$).

Example 19: Preparation of a pure vanadyl sulfate solution: An aqueous solution of vanadyl sulfate, devoid of deleterious impurities, and usable as a precursor for the preparation of a vanadium electrolyte (VE) can be prepared from: (i) the dissolution of pure crystals of vanadium pentahydrate ($VOSO_4.5H_2O$), as obtained in accordance Example 14, in sulfuric acid; and (ii) the pulping of pure vanadium pentoxide powder as obtained in accordance with Examples 15, 17 and 18, in hot sulfuric acid followed by cathodic reduction inside the cathode compartment of a divided electrolyzer equipped with a cathode composed of chemically pure titanium grade 2.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

The invention claimed is:

1. A process for recovering vanadium, iron, titanium and silica values from vanadiferous feedstocks, the process comprising:
    digesting the vanadiferous feedstocks into sulfuric acid thereby producing a sulfation cake;
    dissolving the sulfation cake and separating insoluble solids thereby producing a pregnant solution;
    reducing the pregnant solution thereby producing a reduced pregnant solution;
    crystallizing ferrous sulfate hydrates from the reduced pregnant solution, producing an iron depleted reduced solution; and
    removing titanium compounds from the iron depleted reduced solution thereby producing a vanadium-rich pregnant solution.

2. The process of claim 1, further comprising treating the vanadium-rich pregnant solution to recover vanadium products and/or a vanadium electrolyte.

3. The process of claim 1, wherein the vanadiferous feedstocks comprise materials containing vanadium in various oxidation states.

4. The process of claim 1, wherein the vanadiferous feedstocks comprise vanadiferous titanomagnetite, iron ores, industrial wastes and/or industrial by-products.

5. The process of claim 1, wherein the sulfuric acid digestion comprises using an aqueous solution of sulfuric acid having a mass percentage from about 5 wt. % $H_2SO_4$ to about 100 wt. % $H_2SO_4$, or from about 15 wt. % $H_2SO_4$ to about 99 wt. % $H_2SO_4$ or from about 30 wt. % $H_2SO_4$ to about 98 wt. % $H_2SO_4$.

6. The process of claim 1, wherein the sulfuric acid digestion further comprises the use of oleum.

7. The process of claim 6, wherein the oleum comprises substantially 100 wt. % $H_2SO_4$ and an excess of up to 65 wt. % of dissolved $SO_3$.

8. The process of claim 1, wherein the vanadiferous feedstocks are ground to a particle size of less than about 0.500 millimeter or to a particle size of less than about 0.125 millimeter or to a particle size of less than about 0.050 millimeter.

9. The process of claim 1, wherein the vanadiferous feedstocks are oven dried prior to being processed to remove residual moisture, and wherein
    a) the vanadiferous feedstocks are fed into the sulfuric acid at a temperature ranging from 20° C. to 400° C. and stirred; or
    b) wherein the vanadiferous feedstocks are mixed with the sulfuric acid to produce a suspension, a slurry or a paste and heating the suspension, slurry or paste to a temperature ranging from 50° C. to 250° C.; or
    c) wherein the vanadiferous feedstocks are mixed with the sulfuric acid to produce a suspension, a slurry or a paste and water and/or steam are injected into the suspension, slurry or paste to raise the temperature of the suspension, slurry or paste to a temperature ranging from 50° C. to 250° C.

10. The process of claim 1, wherein the vanadiferous feedstocks are ground to a particle size of less than about 0.050 millimeter and wherein the vanadiferous feedstocks comprise a moisture content from about 0.5 wt. % up to about 60 wt. %.

11. The process of claim 10, wherein the vanadiferous feedstocks are fed into the sulfuric acid and stirred.

12. The process of claim 1, wherein the sulfuric acid digestion is performed at temperatures ranging from about 20° C. to about 400° C. or at temperatures ranging from about 50° C. to about 300° C. or at temperatures from about 75° C. to about 250° C.

13. The process of claim 1, wherein the vanadiferous feedstocks are pre-reduced using a thermal reduction process prior to the sulfuric acid digestion or wherein the vanadiferous feedstocks are pre-oxidized or roasted using a thermal process prior to the sulfuric acid digestion, or wherein the sulfuric acid digestion is performed with a solution of sulfuric acid (L) and a mass of vanadiferous feedstocks (S) having a mass ratio (L-to-S) not exceeding twenty to one (20:1 or 20 kg/kg).

14. The process of claim 13, wherein the mass ratio (L-to-S) is not exceeding ten to one (10:1 or 10 kg/kg), or wherein the mass ratio (L-to-S) is not exceeding five to one (5:1 or 5 kg/kg) or wherein the mass ratio (L-to-S) is not exceeding two to one (2:1 or 2 kg/kg).

15. The process of claim 1, wherein the sulfuric acid digestion is performed with a mass of pure sulfuric acid (100 wt. % $H_2SO_4$) (A) and a mass of vanadiferous feedstocks (S) having a mass ratio (A-to-S) not exceeding twenty to one (20:1 or 20 kg/kg).

16. The process of claim 15, wherein the mass ratio (A-to-S) is not exceeding five to one (5:1 or 5 kg/kg) or wherein the mass ratio (A-to-S) is not exceeding three to one (3:1 or 3 kg/kg) or wherein the mass ratio (A-to-S) is not exceeding two to one (2:1 or 2 kg/kg).

17. The process of claim 1, wherein the sulfuric acid digestion is performed with pure sulfuric acid (100 wt. % $H_2SO_4$) (A) and a mass of vanadiferous feedstocks (S) having a mass ratio (A-to-S) of two to one (2:1 or 2 kg/kg).

18. The process of claim 1, wherein the sulfuric acid digestion is performed over a period ranging from about five (5) minutes up to about twenty-four (24) hours, or wherein the sulfuric acid digestion is performed over a period ranging from about ten (10) minutes up to about fifteen (15) hours or wherein the sulfuric acid digestion is performed over a period ranging from about fifteen (15) minutes up to about ten (10) hours, or wherein the sulfuric acid digestion is performed over a period ranging from about thirty (30) minutes up to about six (6) hours.

19. The process of claim 1, wherein the sulfuric acid digestion is performed either at atmospheric pressure or under pressure.

20. The process of claim 1, wherein the sulfuric acid digestion is performed batch wise and wherein the sulfuric acid digestion is performed using a brick-lined digester or a corrosion resistant vessel.

21. The process of claim 1, wherein the sulfuric acid digestion is performed at temperatures ranging from about 20° C. to about 400° C. and wherein
    a) external heating is provided; or
    b) internal heating is provided; or
    c) the sulfuric acid digestion is performed autogenously by injecting water or steam into a mixture comprising the sulfuric acid and the vanadiferous feedstocks pre-heated at a temperature ranging from about 40° C. to about 110° C.

22. The process of claim 1, wherein the sulfation cake is dissolved into at least one of water, acidified water or weak sulfuric acid.

23. The process of claim 22, wherein the weak sulfuric acid comprises from about 1 g/L to about 300 g/L of $H_2SO_4$, or wherein the weak sulfuric acid comprises from about 5 g/L to about 150 g/L of $H_2SO_4$, or wherein the dissolution of the sulfation cake is performed at a temperature ranging from about 20° C. to about 100° C.

24. The process of claim 1, wherein the pregnant solution is at a pH below 2.0 or wherein the pregnant solution is kept at a temperature ranging from about 20° C. to about 80° C.

25. The process of claim 22, wherein the dissolution of the sulfation cake is performed with a mass of the at least one of water, acidified water or weak sulfuric acid (W) and a mass of sulfation cake (B) having a mass ratio (W-to-B) not exceeding twenty to one (20:1 or 20 kg/kg), or wherein the mass ratio (W-to-B) is not exceeding ten to one (10:1 or 10 kg/kg), or wherein the mass ratio (W-to-B) is not exceeding five to one (5:1 or 5 kg/kg), or wherein the mass ratio (W-to-B) is not exceeding two to one (2:1 or 2 kg/kg).

26. The process of claim 1, wherein the insoluble residues are separated from the pregnant solution by solid-liquid separation techniques producing a filter cake.

27. The process of claim 26, further comprising recovering silica and/or titanium dioxide values from the filter cake.

28. The process of claim 1, wherein reducing the pregnant solution comprises reacting the pregnant solution with at least one of metallic iron, aluminum, magnesium, zinc or alloys thereof, or wherein reducing the pregnant solution comprises reacting the pregnant solution with sulfur dioxide gas, or wherein reducing the pregnant solution comprises electrochemically reducing the pregnant solution.

29. The process of claim 1, further comprising concentrating the reduced pregnant solution.

30. The process of claim 29, further comprising cooling the concentrated pregnant solution to a temperature not exceeding about 10° C., or not exceeding about 5° C., or not exceeding about 0° C., producing the crystallized ferrous sulfate hydrates.

31. The process of claim 1, further comprising:
   a) removing any residual titanium values from the vanadium-rich pregnant solution; or
   b) recovering vanadium values from the vanadium-rich pregnant solution.

32. The process of claim 31, wherein the residual titanium values are removed by boiling and hydrolysis.

33. The process of claim 31, wherein the vanadium values are recovered by crystallization, or by chemical precipitation of vanadium compounds, or by electrolysis.

* * * * *

UNITED STATES PATENT AND TRADEMARK OFFICE
CERTIFICATE OF CORRECTION

| | | |
|---|---|---|
| PATENT NO. | : 10,947,630 B2 | Page 1 of 1 |
| APPLICATION NO. | : 16/322642 | |
| DATED | : March 16, 2021 | |
| INVENTOR(S) | : François Cardarelli et al. | |

It is certified that error appears in the above-identified patent and that said Letters Patent is hereby corrected as shown below:

On the Title Page

Item (71), change "Vanadiumcorp Resources Inc." to --Vanadiumcorp Resource Inc.--

Signed and Sealed this
Twenty-fourth Day of December, 2024

Derrick Brent
*Acting Director of the United States Patent and Trademark Office*